US012556597B2

United States Patent
Misra et al.

(10) Patent No.: US 12,556,597 B2
(45) Date of Patent: Feb. 17, 2026

(54) SYSTEMS, APPARATUS, AND METHODS TO IMPROVE WEBSERVERS USING DYNAMIC LOAD BALANCERS

(71) Applicant: Intel Corporation, Santa Clara, CA (US)

(72) Inventors: Amruta Misra, Bangalore (IN); Niall McDonnell, Limerick (IE); Mrittika Ganguli, Tempe, AZ (US); Edwin Verplanke, Chandler, AZ (US); Stephen Palermo, Chandler, AZ (US); Rahul Shah, Chandler, AZ (US); Pushpendra Kumar, Agra (IN); Vrinda Khirwadkar, Bengaluru (IN); Valerie Parker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 18/393,236

(22) Filed: Dec. 21, 2023

(65) Prior Publication Data
US 2024/0129353 A1 Apr. 18, 2024

Related U.S. Application Data

(63) Continuation of application No. PCT/US2022/042791, filed on Sep. 7, 2022.
(Continued)

(51) Int. Cl.
*H04L 65/612* (2022.01)
*H04L 67/02* (2022.01)
*H04L 67/60* (2022.01)

(52) U.S. Cl.
CPC ............ *H04L 65/612* (2022.05); *H04L 67/02* (2013.01); *H04L 67/60* (2022.05)

(58) Field of Classification Search
CPC ....... H04L 65/612; H04L 67/02; H04L 67/60; H04L 47/6215; H04L 67/1001; G06F 2209/548; G06F 9/4881; G06F 9/546
(Continued)

(56) References Cited

U.S. PATENT DOCUMENTS

| 2003/0105865 A1* | 6/2003 | McCanne ............... H04L 12/18 709/225 |
| 2004/0044760 A1 | 3/2004 | Deily et al. |

(Continued)

FOREIGN PATENT DOCUMENTS

WO        2023038994 A1    3/2023

OTHER PUBLICATIONS

Patent Cooperation Treaty, "International Search Report," issued in connection with International Patent Application No. PCT/US2022/042791, mailed on Dec. 23, 2022, 4 pages.
(Continued)

*Primary Examiner* — Tan Doan
(74) *Attorney, Agent, or Firm* — Hanley, Flight & Zimmerman, LLC

(57) ABSTRACT

Methods, apparatus, systems, and articles of manufacture are disclosed to improve webservers using dynamic load balancers. An example method includes identifying a first and second data object type associated with media and with first and second data objects of the media. The example method also includes enqueuing first and second event data associated with the first and second data object in a first and second queue in first circuitry in a die of programmable circuitry. The example method further includes dequeuing the first and second event data into a third and fourth queue associated with a first and second core of the programmable circuitry, the first circuitry separate from the first core and the second core. The example method additionally includes
(Continued)

causing the first and second core to execute a first and second computing operation based on the first and second event data in the third and fourth queues.

20 Claims, 46 Drawing Sheets

Related U.S. Application Data

(60) Provisional application No. 63/241,900, filed on Sep. 8, 2021.

(58) Field of Classification Search
USPC .......................................... 709/231
See application file for complete search history.

(56) References Cited

U.S. PATENT DOCUMENTS

| | | | |
|---|---|---|---|
| 2011/0153723 A1* | 6/2011 | Mutnuru | H04L 69/16 |
| | | | 711/E12.017 |
| 2015/0055457 A1* | 2/2015 | Agarwal | H04L 49/30 |
| | | | 370/230 |
| 2015/0347192 A1* | 12/2015 | Blaine | G06F 9/4881 |
| | | | 718/103 |
| 2017/0245177 A1 | 8/2017 | Yadav et al. | |
| 2018/0129533 A1 | 5/2018 | Pashov | |
| 2019/0138638 A1 | 5/2019 | Pal et al. | |
| 2019/0342226 A1 | 11/2019 | Montcalm | |
| 2021/0075730 A1* | 3/2021 | Palermo | H04L 47/62 |
| 2021/0144517 A1 | 5/2021 | Guim Bernat et al. | |

OTHER PUBLICATIONS

Patent Cooperation Treaty, "Written Opinion of the International Searching Authority," issued in connection with International Patent Application No. PCT/US2022/042791, mailed on Dec. 23, 2022, 5 pages.

Netherlands Patent Office, "Decision regarding formal defects," issued in connection with Netherlands Patent Application No. 2032986, dated Sep. 14, 2022, 4 Pages. [English language machine translation included.].

International Searching Authority, "International Preliminary Report on Patentability," issued in connection with PCT Patent Application No. PCT/US2022/042791, mailed on Mar. 5, 2024, 6 pages.

Netherlands Patent Office, "Search Report and Written Opinion," issued in connection with Netherlands Patent Application No. 2032986, dated Apr. 21, 2023, 9 Pages. [English language machine translation included.].

Netherlands Patent Office, "Certificate of Grant," issued in connection with Netherlands Patent Application No. 2032986, dated Jul. 21, 2023, 2 Pages. [English language machine translation included.].

* cited by examiner

ONE EDGE CONVERGED, SELF-MANAGED AND SELF-ORCHESTRATED ARCHITECTURE

ROUTING PROCESSED ON GROUND

SYSTEMS, APPARATUS, AND METHODS TO IMPROVE WEBSERVERS USING DYNAMIC LOAD BALANCERS

RELATED APPLICATIONS

This patent arises from a continuation of International Patent Application No. PCT/US22/42791, which is titled "SYSTEMS, APPARATUS, AND METHODS TO IMPROVE WEBSERVERS USING DYNAMIC LOAD BALANCERS," and which was filed on Sep. 7, 2022, which claims the benefit of U.S. Provisional Patent Application No. 63/241,900, which was filed on Sep. 8, 2021. International Patent Application No. PCT/US22/42791 and U.S. Provisional Patent Application No. 63/241,900 are hereby incorporated herein by reference in their respective entireties. Priority to International Patent Application No. PCT/US22/42791 and U.S. Provisional Patent Application No. 63/241,900 is hereby claimed.

FIELD OF THE DISCLOSURE

This disclosure relates generally to webservers and, more particularly, to systems, apparatus, and methods to improve webservers using dynamic load balancers.

BACKGROUND

Hypertext Transfer Protocol (HTTP) is a generic, stateless, object-oriented application-level protocol that can be used for many tasks, such as name servers and distributed object management systems, through extension of its request methods (i.e., commands). A feature of HTTP is the typing of data representation (e.g., object types, data object types, etc.) that allow systems to be built independently of the data being transferred. Some commercial webservers use HTTP to execute webserver requests from client devices (e.g., Internet-enabled smartphones, tablets, laptop computers, desktop computers, Internet of Things (IoT) devices, edge devices, etc.). Some such webserver requests are for media, such as audio, video, and/or text-based media. Hypertext Transfer Protocol Secure (HTTPS) is the secure version of the HTTP protocol that uses the Secure Sockets Layer (SSL)/Transport Layer Security (TLS) protocol for encryption and authentication.

DETAILED DESCRIPTION

Figure 1:
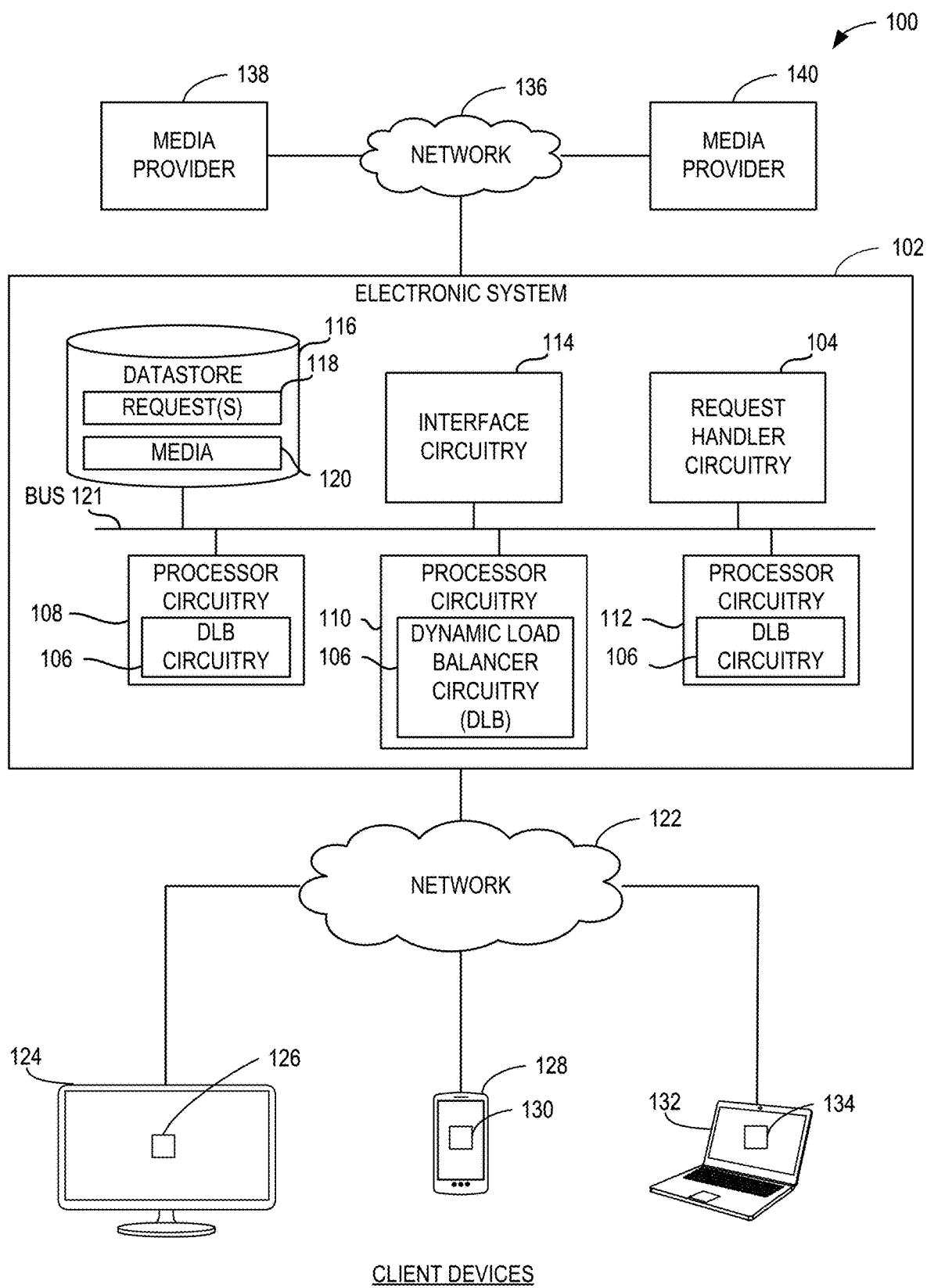
FIG. 1 is a block diagram of an example computing environment including example request handler circuitry and example dynamic load balancer (DLB) circuitry to facilitate webserver requests based on example data object types.

In general, the same reference numbers will be used throughout the drawing(s) and accompanying written description to refer to the same or like parts. The figures are not to scale.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" and "substantially real-time" refer to occurrence in a near instantaneous manner recognizing there may be real-world delays for computing time, transmission, etc. Thus, unless otherwise specified, "substantially real time" and "substantially real-time" refer to being within a 1-second time frame of real time. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Hypertext Transfer Protocol (HTTP) is a generic, stateless, object-oriented application-level protocol that can be used for many tasks, such as name servers and distributed object management systems, through extension of its request methods (i.e., commands). A feature of HTTP is the typing of data representation (e.g., data types, object types, data object types, sub-object types, data sub-object types, etc.) that allow systems (e.g., computing and/or electronic systems) to be built independently of the data being transferred. Some commercial webservers use HTTP to execute webserver requests from client devices (e.g., Internet-enabled smartphones, tablets, laptop computers, desktop computers, Internet of Things (IoT) devices, edge devices, etc.). For example, a webserver request may include a request for media (e.g., Internet media such as web pages, audio, video, text, images or pictures, etc.). In some examples, Internet media is media and/or multimedia that is accessible and/or retrievable via the Internet. In some examples, Internet media is media and/or multimedia that is stored via the Internet.

The terms "media data" and "media" as used herein refer to data that is accessible, whether over-the-air, or via cable, satellite, network, internetwork (including the Internet), print, displayed, distributed on storage media, or by any other technique that is humanly perceptible, without regard to the form or content of such data, and include but are not limited to audio, video, audio/video, text, images, advertisements, animations, databases, broadcasts, content, displays (including but not limited to video displays, posters and billboards), signs, signals, web pages, print media, streaming media data, etc. For example, "media data" and "media" can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices or playback devices (e.g., a monitor, a display panel, a television, a display wall, a touchscreen, a wearable device, a printer, a plotter, a speaker, a projector, headphones (e.g., wireless or wired headphones), an audio amplifier, a stereo, etc.).

As used herein, "multimedia" refers to two or more types of media combined in order to convey information. For example, a video can be multimedia by including audio, text, and/or video data in the video. In some examples, a request for media can be a request for multimedia. For example, a request for a website can be a multimedia request, which can include requesting a video and/or an accompanying video advertisement, each of which can include more than one type of media such as audio, text, and/or video. For example, "multimedia" can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices or playback devices (e.g., a monitor, a display panel, a television, a display wall, a touchscreen, a wearable device, a printer, a plotter, a speaker, a projector, headphones (e.g., wireless or wired headphones), an audio amplifier, a stereo, etc.).

Some commercial webservers process webserver requests using HTTP1 (also referred to as HTTP/1.0) or HTTP1.1 (also referred to as HTTP/1.1) whereas some commercial webservers are transitioning from HTTP1 to newer versions of HTTP such as HTTP2 (also referred to as HTTP/2), HTTP3 (also referred to as HTTP/3), HTTP Secure (HTTPS) Attestation (also referred to as HTTPA), etc. Unlike HTTP1, newer versions of HTTP are binary protocols. For example, HTTP2, HTTP3, etc., handle messages that include binary commands in the form of 0s and 1s to be transmitted over a communication channel or medium. The binary framing layer divides the messages into frames, which are partitioned based on their type, such as header frames or data frames. In HTTP2, HTTP3, etc., the data frames may include different types of data such as audio data, video data, text data, etc. For example, HTTP2, HTTP3, etc., supports multiple data types (e.g., audio, video, text, etc.) in a single request. In some examples, a client device (e.g., a device operating as a client in client-server communication) may transmit a request for multiple individual objects such as audio, video, text, etc.

In some HTTP2/HTTP3 commercial webservers, multi-object requests create uneven core utilization (e.g., processor core utilization) at the server side. For example, a first worker core (e.g., a first worker core of multi-core processor circuitry of a server) may be overutilized when serving a multi-object request while other worker cores (e.g., second worker cores of multi-core processor circuitry of a server) are underutilized. In some examples, the uneven core utilization may lead to a performance degradation of the server. Some HTTP2/HTTP3 commercial webservers use software load balancers to address the uneven core utilization. However, software load balancers are inefficient when processing HTTP2/HTTP3 requests that include multiple, different object types. For example, different object types need different amounts of hardware resources (e.g., different numbers of cores of processor circuitry, memory, mass storage, etc.) in order to be processed. Some such software load balancers do not distribute workloads to cores in view of the aforementioned considerations.

Examples disclosed herein include dynamic load balancer (DLB) circuitry to implement queue management (e.g., hardware-based queue management) of webserver requests in hardware to improve performance and throughput and reduce latency when processing webserver requests in computing and/or electronic systems that include multi-core processor circuitry. In some disclosed examples, the DLB circuitry can be implemented by one or more Dynamic Load Balancers provided by Intel® Corporation of Santa Clara, California. In some disclosed examples, the DLB circuitry can be implemented as a hardware-managed system of queue circuitry and arbiter circuitry that link producer cores (e.g., producer compute cores, producer processor cores, etc.) and consumer cores (e.g., consumer compute cores, consumer processor cores, etc.). In some disclosed examples, the DLB circuitry can effectuate and/or implement pipelined packet processing techniques for load balancing and packet (e.g., HTTP packet (e.g., HTTP1.1, HTTP2, etc.), HTTPS packet, HTTPA packet, etc.) queueing. In some disclosed examples, the DLB circuitry can effectuate and/or implement enqueuing of data (e.g., pointers that point to and/or reference data) from software and dequeuing the data (e.g., pointers that point to and/or reference the data) to consumer cores to perform computing operations and/or otherwise process the data.

Prior techniques can allocate incoming data to be processed to a core (e.g., a compute or processor circuitry core) that is experiencing a heavy computing workload thereby generating a bottleneck in processing the incoming data due to an unavailability of processing ability or bandwidth by the core. In some disclosed examples, the incoming data can correspond to an elephant or fat flow. For example, a core can be assigned to a network interface controller (NIC) to receive data packets of the elephant flow from the NIC. The NIC can spray packets randomly via receive side scaling (RSS) thereby reducing bandwidth associated with the core and/or, more generally, a processor that includes the core. As used herein, an "elephant flow" or "fat flow" is a single session, relatively long running network connection that consumes a large or disproportionate amount of bandwidth of a core and/or, more generally, processor circuitry that includes the core. The elephant or fat flow can be extremely large (in total bytes) or high in traffic volume and extremely long in time or duration. In some examples, the DLB circuitry and/or processor circuitry that includes the DLB circuitry can determine that a packet flow is an elephant flow based on a determination that the packet flow is a single session associated with a network connection that runs for a time period that satisfies a threshold. As used herein "threshold" is expressed as data such as a numerical value represented in any form, that may be used by processor circuitry as a reference for a comparison operation. In some examples, the DLB circuitry and/or processor circuitry that includes the DLB circuitry can determine that a packet flow is an elephant flow based on a determination that a bandwidth associated with the processor decreases below a threshold. In some examples, the DLB circuitry and/or processor circuitry that includes the DLB circuitry can determine that a packet flow is an elephant flow based on a determination that the packet flow has a number of bytes that satisfies a threshold.

Queue management as disclosed herein can achieve efficiencies in a network by reducing a time that a core of processor circuitry spends marshalling pointers to data structures, data packets, etc., between cores of the processor circuitry. For example, the DLB circuitry disclosed herein, which can implement hardware or hardware-based queue management, can improve system performance (e.g., network system performance, webserver system performance, etc.) related to handling network data across processor circuitry cores by foregoing overhead of passing data structures and pointers from one processor circuitry core to another.

Queue management as disclosed herein can be implemented with queue management circuitry of the DLB circuitry to improve execution of webserver requests. For example, the DLB circuitry can implement, effectuate, and/or otherwise execute dynamic load balancing functions, computing or processing operations, tasks, workloads, etc., in hardware. In some disclosed examples, the DLB circuitry can enable pipelined packet processing and support hundreds of millions or billions of queue management and load balancing operations per second for run-to-completion and pipelined network processing approaches. Hardware-based queue management provided by the DLB circuitry as disclosed herein can replace software queues (e.g., queues associated with software or software-based queue management), especially software queues associated with multiple producer processor circuitry cores and/or multiple consumer processor circuitry cores. As used herein, the terms "producer core," "producer compute core," "producer processor circuitry core," and the like are used interchangeably and refer to a core that creates and/or otherwise generates data (e.g., a data element, a queue element, etc.) to be enqueued to and/or by the DLB circuitry. As used herein, the terms "consumer core," "consumer compute core," "consumer processor circuitry core," and the like are used interchangeably and refer to a core that acts and/or is invoked to act on the result of a dequeue (e.g., a dequeue operation) from the DLB circuitry.

Applications, services, etc., that use the example DLB circuitry as disclosed herein can benefit from an enhanced overall system performance via efficient workload distribution compared to software queue management, in which one of the most typical usages of software queueing is load balancing. Typical queueing schemes can use cores of processor circuitry (e.g., multi-core processor circuitry) to schedule and/or distribute workloads, which burdens the cores with queueing and reordering tasks. Advantageously, the DLB circuitry disclosed herein increases the availability of the cores for high-value add worker core processing by effectuating hardware-based queue management built-in load balancing functionality. For example, the cores can offload workload scheduling and/or distribution tasks to the DLB circuitry to free the cores to carry out high-value add worker core processing, such as Artificial Intelligence/Machine Learning (AI/ML) workloads, image processing workloads, etc. The example DLB circuitry as disclosed herein can remove direct core-to-core interactions and effectuate the load balancing in hardware.

Examples disclosed herein include the DLB circuitry to improve load balancing and workload distribution in computer network architectures, such as webserver architectures. Examples disclosed herein reduce and/or otherwise eliminate spinlock penalties. In some disclosed examples, the DLB circuitry enables pipelined processing of data (e.g., HTTP data packets in an Internet-based network) between multiple producers (e.g., producer cores) and multiple consumers (e.g., consumer cores). A producer core can offload scheduling of compute or computing tasks to the example DLB circuitry to allocate a workload by the producer core to an available consumer core of a plurality of consumer cores. By offloading the scheduling to the example DLB circuitry, the producer core can become available to execute high-value added core processing tasks. Advantageously, the example DLB circuitry can remove direct core-to-core interactions, which can increase latency of one or both cores, and execute scheduling and corresponding load balancing tasks in hardware.

In some disclosed examples, the DLB circuitry implements a load balancer to improve load balancing and workload distribution in computer network architectures, such as commercial webservers. In some disclosed examples, the DLB circuitry can scale (e.g., dynamically scale) up a quantity of consumer cores used to facilitate a distribution, transmission, and/or processing of multi-object HTTP requests to optimize and/or otherwise improve a throughput, a line rate, a bandwidth, etc., associated with the multi-object HTTP requests. For example, the DLB circuitry can parse an HTTP request into multiple object types and distribute data associated with the multiple object types to one or more consumer cores for processing. In some disclosed examples, the DLB circuitry can re-order and/or otherwise aggregate the processed data in preparation for distribution and/or transmission to different hardware, a different logic entity, etc., such as a client device that transmitted the HTTP request.

The following disclosure also addresses various aspects of connectivity and edge computing, relevant in a non-terrestrial network (e.g., low earth orbit (LEO), medium earth orbit (MEO) or intermediate circular orbit (ICO), or very low earth orbit (VLEO) satellite constellation) network, which can benefit from the DLB circuitry as disclosed herein. In various sets of examples, this is provided through new approaches to terrestrial- and satellite-enabled edge architectures, edge connectors for satellite architectures, quality of service management for satellite-based edges, satellite-based geofencing schemes, content caching architectures, Internet-of-Things (IoT) sensor and device architectures connected to satellite-based edge deployments, orchestration operations in satellite-based edge deployments, among other related improvements and designs.

One of the technical problems addressed herein includes the consideration of edge "Multi-Access" connectivity, involving the many permutations of network connectivity provided among satellites, ground wireless networks, and UEs (including for UEs which have direct satellite network access). For example, scenarios may involve coordination among different types of available satellite-UE connections, whether in the form of non-geostationary satellite systems (NGSO), medium orbit or intermediate circular orbit satellite systems, geostationary satellite systems (GEO), terrestrial networks (e.g., 4G LTE/5G/6G networks), and direct UE Access, considering propagation delays, frequency interference, exclusion zones, satellite beam landing rights, and capability of ground (or in-orbit) routing protocols, among other issues. Likewise, such scenarios also involve the consideration of multi-access satellite connectivity when performing discovery and routing, including how to route data in multi-access satellite links based on service level objectives (SLOs), security, regulations, and the like.

Another technical problem addressed herein includes coordination between edge compute capabilities offered at non-terrestrial (satellite vehicle) and terrestrial (base station, core network) locations. From a simple perspective, this may include a determination of whether compute operations should be performed, for example, on the ground, on-board a satellite, or at connected user equipment devices, at a base station, at a satellite-connected cloud or core network, or at remote locations. Compute operations could range from establishing the entire network routing paths among terrestrial and non-terrestrial network nodes (involving almost every node in the network infrastructure) to performing individual edge or node updates (that could involve just one node or satellite).

To perform this determination, a system may evaluate what type of operation is to be performed and where to perform the compute operations or to obtain data, considering intermittent or interrupted satellite connectivity, movement and variable beam footprints of individual satellite vehicles and the satellite constellation, satellite interference or exclusion areas, limited transmission throughput, latency, cost, legal or geographic restrictions, service level agreement (SLA) requirements, security, and other factors. As used herein, reference to an "exclusion zone" or "exclusion area" may include restrictions for satellite broadcasts or usage, such as defined in standards promulgated by Alliance for Telecommunications Industry Solutions (ATIS) or other standards bodies or jurisdictions.

A related technical problem addressed herein includes orchestration and quality of service for satellite connections and edge compute operations offered via such satellite connections. In particular, based on the latency, throughput capabilities and requirements, type of data, and cost considerations for satellite connections, services can be orchestrated and guaranteed for reliability, while applying different considerations and priorities applicable for cloud service providers (providing best-effort services) versus telecommunication companies/communication service providers (providing guaranteed services). The evaluation of such factors may include considerations of risks, use cases for an as-available service, use cases for satellite networks as a connectivity "bent pipe", conditions or restrictions on how and when data can be accessed and processed, different types of backhaul available via satellite data communications, and further aspects of taxes, privacy, and security occurring for multi-jurisdictional satellite data communications.

Another technical problem addressed herein is directed to adaptation of edge compute and data services in satellite connectivity environments. One aspect of this includes the implementation of software defined network (SDN) and virtual radio access network (RAN) concepts including terrestrial and non-terrestrial network nodes connected to orbiting satellite constellations. Another aspect is how to coordinate data processing with IoT architectures inclusive of sensors that monitor environmental telemetry within terrestrial boundaries (e.g., ship containers, drones) with intermittent connectivity (e.g., last known status, connections via drones in remote locations, etc.). Other aspects relating to content data networking (CDN), geofencing and geographic restrictions, service orchestration, connectivity and data handover, communication paths and routing, and security and privacy considerations, are also addressed in various use cases.

In various sets of examples, satellite connectivity and coordination is provided through new approaches to terrestrial and satellite enabled edge architectures, including the use of "edge connectors" and connection logic within a computing system. Such edge connectors are used to assemble and organize communication streams via a satellite network, and establish virtual channels to edge compute or remote service locations despite the intermittent and unpredictable nature of LEO satellite network connections.

In further examples, satellite connectivity and coordination is provided through quality of service and orchestration management operations in satellite-based or satellite-assisted edge computing deployments. Such management operations may consider the varying types of latency needed for network backhaul via a satellite network and the varying conditions of congestion and resource usage. These management operations may allow an effective merger of ground-based and satellite-based edge computing operations and all of the resource properties associated with a relevant network or computing service.

In further examples, connectivity and workload coordination is provided for satellite-based edge computing nodes and terrestrial-based edge computing nodes that provide content to end users (such as from a content delivery network (CDN)). This connectivity and workload coordination may use content caching architectures adapted for satellite communications, to decrease latency and increase efficiency of content retrieval and delivery. Such connectivity and workload coordination may also use satellite-based geofencing schemes in order to ensure compliance with content provider or geo-political regulations and requirements (often, defined on the basis of geographic areas).

FIG. 1 is a block diagram of an example computing environment 100 including an example electronic system 102, which includes example request handler circuitry 104 and example dynamic load balancer (DLB) circuitry 106, to facilitate webserver requests based on data object types. The electronic system 102 includes first example processor circuitry 108, second example processor circuitry 110, third example processor circuitry 112, and each of which include the DLB circuitry 106. Alternatively, one or more of the first processor circuitry 108, the second processor circuitry 110, and/or the third processor circuitry 112 may not include the DLB circuitry 106. The electronic system 102 of the illustrated example includes example interface circuitry 114 and an example datastore 116, which includes example request(s) 118 and example media 120.

In the illustrated example, the request handler circuitry 104, the DLB circuitry 106, the first processor circuitry 108, the second processor circuitry 110, the third processor circuitry 112, the interface circuitry 114, and/or the datastore 116, are in communication with one(s) of each other via an example bus 121. For example, the bus 121 can be implemented by at least one of an Inter-Integrated Circuit (I2C) bus, a Serial Peripheral Interface (SPI) bus, a Peripheral Component Interconnect (PCI) bus, or a Peripheral Component Interconnect express (PCIe) bus. Additionally or alternatively, the bus 121 may be implemented with any other type of computing or electrical bus. Further depicted in the computing environment 100 is a first example network 122, a first example client device 124 that executes a first example web application 126, a second example client device 128 that executes a second example web application 130, and a third example client device 132 that executes a third example web application 134. Further depicted in the computing environment 100 is a second example network 136, a first example media provider 138, and a second example media provider 140.

In the illustrated example, the client devices 124, 128, 132 can be and/or implement media devices that request media (e.g., Internet-based media, digital media, electronic media, multimedia, etc.) from the media providers 138, 140 for presentation on the client devices 124, 128, 132. For example, the media 120 can be multimedia. In some examples, the first media provider 138 is a first multimedia provider because it can store and/or provide multimedia. In some examples, the second media provider 140 is a second multimedia provider because it can store and/or provide multimedia.

By way of example, the client devices 124, 128, 132 can request media via the respective web applications 126, 130, 134. In some examples, one(s) of the web applications 126, 130, 134 can be implemented by a user interface (e.g., a graphical user interface (GUI)), an Internet web browser, a streaming media application, or any other software application that is capable of requesting media from the media providers 138, 140 and/or, more generally, from the Internet. In some examples, the client devices 124, 128, 132 are capable of directly presenting media (e.g., via a display, a touchscreen display, etc.) while, in some other examples, the client devices 124, 128, 132 can present the media on separate media presentation equipment (e.g., speakers, a separate display via screen casting and/or screen mirroring, etc.). For example, the first client device 124 of the illustrated example is an Internet enabled television, and thus, is capable of requesting media via the first web application 126 and presenting the requested media (e.g., via an integrated display and speakers). The second client device 128 of the illustrated example is a handset (e.g., a cellular or Internet-enabled smartphone), and thus, is capable of requesting media via the second web application 130 and presenting the requested media (e.g., via an integrated display and/or speakers). The third client device 132 of the illustrated example is a laptop computer, and thus, is capable of requesting media via the third web application 134 and presenting the requested media (e.g., via an integrated display and speakers).

While, in the illustrated example, an Internet enabled television, a handset, and a laptop computer are shown, any other type(s) and/or number(s) of media presentation device(s) may additionally or alternatively be used. For example, tablets (e.g., tablet computers), Internet-of-Things (IoT) devices, gaming consoles, streaming media devices (e.g., a Google Chromecast™ device, an Apple TV®, etc.), digital media players (e.g., a Roku® media player, a Slingbox®, etc.), etc., may additionally or alternatively be used. Further, while in the illustrated example three client devices are shown, any number of client devices may be used.

The first media provider 138 and/or the second media provider 140 of the illustrated example correspond(s) to any one or more media provider(s) capable of providing media for presentation via the client devices 124, 128, 132. In some examples, the first media provider 138 can be implemented by one or more servers (e.g., computer and/or electronic servers, edge servers, content delivery network (CDN) servers, rack-mounted servers, etc.). In some examples, the second media provider 140 can be implemented by one or more servers (e.g., computer and/or electronic servers, edge servers, CDN servers, rack-mounted servers, etc.). The media provided by the first media provider 138 and/or the second media provider 140 can provide any type(s) of media, such as audio, image, video, multimedia, etc. Additionally, the media can be live media, streaming media, broadcast media, stored media, on-demand content, etc., or any other type of media.

The first network 122 and/or the second network 136 of the illustrated example is/are the Internet. However, the first network 122 and/or the second network 136 can be implemented using any suitable wired and/or wireless network(s) including, for example, one or more data buses, one or more Local Area Networks (LANs), one or more wireless LANs (WLANs), one or more cellular networks, one or more private networks, one or more public networks, one or more optical networks, etc. In some examples, the first network 122 enables the electronic system 102 to be in communication with one(s) of the client devices 124, 128, 132. In some examples, the second network 136 enables the electronic system 102 to be in communication with one(s) of the media providers 138, 140.

The electronic system 102 receives webserver requests (e.g., requests for media from one(s) of the media providers 138, 140) by using the interface circuitry 114 via the first network 122. The electronic system 102 processes the webserver requests utilizing the DLB circuitry 106 and provides the webserver requests to the one(s) of the media provides 138, 140 by using the interface circuitry 114 via the second network 136. The interface circuitry 114 of the illustrated example is hardware that can implement one or more interfaces (e.g., computing interfaces, network interfaces, etc.). For example, the interface circuitry 114 can be hardware, software, and/or firmware that implements a communication device (e.g., a network interface card (NIC), a smart NIC, a gateway, a switch, an Infrastructure Processor Unit (IPU), etc.) such as a transmitter, a receiver, a transceiver, a modem, a residential gateway, a wireless access point, and/or a network interface to facilitate an exchange of data with external machines (e.g., computing and/or electronic devices of any kind) via the first network 122 and/or the second network 136. In some examples, the interface circuitry 114 effectuates the communication by a Bluetooth® connection, an Ethernet connection, a digital subscriber line (DSL) connection, a wireless fidelity (Wi-Fi) connection, a telephone line connection, a coaxial cable system, a satellite system, a line-of-site wireless system, a cellular telephone system, an optical connection (e.g., a fiber-optic connection), etc. For example, the interface circuitry 114 can be implemented by any type of interface standard, such as a Bluetooth® interface, an Ethernet interface, a Wi-Fi interface, a universal serial bus (USB), a near field communication (NFC) interface, a PCI interface, and/or a PCIe interface.

In some examples, the interface circuitry 114 obtains information from and/or transmits information to the networks 122, 136. In some examples, the interface circuitry 114 can implement a web server that receives the request(s) 118, or portion(s) thereof, from the client devices 124, 128, 132 (e.g., via the first network 122). In some examples, the interface circuitry 114 can implement a web server that transmits the request(s), or portion(s) thereof, to first media provider 138 and/or the second media provider 140 (e.g., via the second network 136). In some examples, in response to the request(s) 118, the interface circuitry 114 can implement a web server that receives the media 120 from the first media provider 138 and/or the second media provider 140 (e.g., via the second network 136). In some examples, after receiving the media 120, the interface circuitry 114 can implement a web server that transmits the media 120 to one(s) of the client devices 124, 128, 132 that requested the media 120 (e.g., via the first network 122).

In some examples, the request(s) 118 from the client devices 124, 128, 132, the request(s) 118 to the media providers 138, 140, etc., is/are formatted as HTTP message(s) (e.g., HTTP2 messages, HTTP3 messages, etc.). However, any other message format and/or protocol may additionally or alternatively be used such as, for example, a file transfer protocol (FTP), a simple message transfer protocol (SMTP), an HTTP secure (HTTPS) protocol, HTTP Secure (HTTPS) Attestation (also referred to as HTTPA), etc.

In some examples, the media providers 138, 140 transmit the media 120 to the electronic system 102 as HTTP message(s) (e.g., HTTP1.1 messages, HTTP2 messages, HTTP3 messages, etc.). However, any other message format and/or protocol may additionally or alternatively be used such as, for example, an FTP, an SMTP, an HTTPS protocol, an HTTPA protocol, etc. In some examples, the electronic system 102 transmits the media 120 to one(s) of the client devices 124, 128, 132 as HTTP message(s) (e.g., HTTP1.1 messages, HTTP2 messages, HTTP3 messages, etc.). However, any other message format and/or protocol may additionally or alternatively be used such as, for example, an FTP, an SMTP, an HTTPS protocol, an HTTPA protocol, etc.

The electronic system 102 of the illustrated example includes the datastore 116 to record data (e.g., the request(s) 118, the media 120, etc.). The datastore 116 of this example can be implemented by a volatile memory and/or a non-volatile memory (e.g., flash memory). The datastore 116 may additionally or alternatively be implemented by one or more double data rate (DDR) memories, such as DDR, DDR2, DDR3, DDR4, DDR5, mobile DDR (mDDR), etc. The datastore 116 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 116 is illustrated as a single datastore, the datastore 116 may be implemented by any number and/or type(s) of datastores. Furthermore, the data stored in the datastore 116 may be in any data format such as, for example, binary data, comma delimited data, tab delimited data, structured query language (SQL) structures, an executable (e.g., an executable binary, a configuration image, etc.), etc. In some examples, the datastore 116 can implement one or more databased. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a media file, an audio file, an image file, a video file, a list, or in any other form.

The request handler circuitry 104 of the illustrated example is hardware that can improve the processing of HTTP requests (or any other request based on HTTP such as HTTPS or HTTPA) by the processor circuitry 108, 110, 112. In some examples, the request handler circuitry 104 is implemented by and/or included in at least one of the first processor circuitry 108, the second processor circuitry 110, or the third processor circuitry 112. In some examples, the request handler circuitry 104 can receive a request for media (e.g., one of the request(s) 118) from one of the client devices 124, 128, 132; and store the request, or portion(s) thereof, in the datastore as one of the request(s) 118. In some examples, the request handler circuitry 104 can parse the request into partitionable workloads that can be executed by the processor circuitry 108, 110, 112. For example, the request handler circuitry 104 can parse the request based on a header, a payload, etc., of the request. In some examples, the request handler circuitry 104 can identify an object type (e.g., an audio, text, or video object type) of data included in the request based on the header, the payload, etc. In some examples, the request handler circuitry 104 can identify and/or determine a priority at which data associated with the object types may be processed by the processor circuitry 108, 110, 112.

In some examples, different types of video objects include different types of video data. For example, a video object can be an MP4 video object (e.g., video data in an MP4 or MPEG-4 Part 14 video format), a MOV video object (e.g., video data in a MOV video format), a WMV video object (e.g., video data in a WMV video format), an AVI video object (e.g., video data in an AVI video format), etc. In some examples, the video object can be video data in any other video format such as AVCHD, FLV, F4V, SWF, etc.

In some examples, different types of audio objects include different types of audio data. For example, an audio object can be an MP3 audio object (e.g., audio data in an MP3 or MPEG-1 Audio Layer 3 audio format), an AAC audio object (e.g., audio data in an AAC audio format), a FLAC audio object (e.g., audio data in a FLAC audio format), an ALAC audio object (e.g., audio data in an ALAC audio format), etc. In some examples, the audio object can be audio data in any other audio format such as Ogg Vorbis, WAV, AIFF, DSD, etc.

In some examples, different types of text objects include different types of text data. For example, a text object can be a character or CHAR text object (e.g., text data in character text format), a string or STR text object (e.g., text data in string text format), an ASCII text object (e.g., text data in ASCII text format), etc. In some examples, the text object can be text data in any other text format such as DAT, TXT, CSV, etc.

In some examples, the request handler circuitry 104 can generate a response to requesting one(s) of the client devices 124, 128, 132 for the media 120 based on the request. For example, the request handler circuitry 104 can obtain the media 120 from one(s) of the media providers 138, 140. In some examples, the request handler circuitry 104 can compile, package, aggregate, and/or otherwise assemble the media 120 into one or more HTTP messages, which can implement the response to the request. In some examples, the request handler circuitry 104 can transmit the response (e.g., data representative of the response) to the requesting one(s) of the client devices 124, 128, 132. For example, the request handler circuitry 104 can generate a response that includes multimedia (e.g., multimedia data).

The first processor circuitry 108, the second processor circuitry 110, and/or the third processor circuitry 112 is/are multi-core hardware, such as multi-core processor circuitry or multi-core programmable circuitry. For example, one or more of the first processor circuitry 108, the second processor circuitry 110, and/or the third processor circuitry 112 can be programmed microprocessors, Field Programmable Gate Arrays (FPGAs) that may instantiate instructions, Central Processor Units (CPUs), Graphics Processor Units (GPUs), Digital Signal Processors (DSPs), XPUs, Artificial Intelligence (AI) accelerators (e.g., vision processor units (VPUs), neural network processors, machine learning processors, etc.), or microcontrollers and integrated circuits such as Application Specific Integrated Circuits (ASICs).

The processor circuitry 108, 110, 112 include respective instances of the DLB circuitry 106 to improve the processing of HTTP requests among cores of the processor circuitry 108, 110, 112. For example, a first core (e.g., a primary core, a control core, etc.) of the first processor circuitry 108 can receive an indication of a workload (e.g., one or more pointers referencing data associated with the request(s) 118) to be executed. In some examples, the first core can receive the indication from the request handler circuitry 104. In some examples, the indication of the workload can identify and/or reference one or more types of objects of an HTTP request to process, which can include an audio object (e.g., audio data), a video object (e.g., video data), and/or a text object (e.g., text data). In some examples, the DLB circuitry 106 of the first processor circuitry 108 can effectuate distribution of workload(s) corresponding to multi-object traffic from the HTTP request among other cores (e.g., worker cores) of the first processor circuitry 108. For example, the DLB circuitry 106 can receive a first indication from the request handler circuitry 104 that corresponds to a first workload to process an audio object of an HTTP request, and distribute the first workload to one or more first worker cores. In some examples, the DLB circuitry 106 can receive a second indication from the request handler circuitry 104 that corresponds to a second workload to process a video object of the HTTP request, and distribute the second workload to one or more second worker cores. In some examples, the DLB circuitry 106 can receive a third indication from the request handler circuitry 104 that corresponds to a third workload to process a text object of the HTTP request, and distribute the third workload to one or more third worker cores. Advantageously, the DLB circuitry 106 can achieve improved processing of webserver requests that correspond to multi-object traffic (e.g., multi-object web or Internet traffic) by (i) enqueuing workloads based on an object type; and (ii) dequeuing the workloads to worker cores of the processor circuitry 108, 110, 112 based on the object type. In some examples, the DLB circuitry 106 can be implemented by a Dynamic Load Balancer provided by Intel® Corporation of Santa Clara, California.

In some examples, indications, such as the above-referenced first through third indications, can implement events (e.g., queue events, hardware queue events, workload events, workload queue events, etc.). For example, the request handler circuitry 104 can generate a first event, which can include a data pointer referencing data stored in memory, a priority (e.g., a value indicative of the priority) of the data, etc. In some examples, the event can be representative of, indicative of, and/or otherwise representative of workload(s) to be distributed and/or facilitated by the DLB circuitry 106. For example, the event can be an indication of data to be enqueued to the DLB circuitry 106.

In some examples, an event, such as the first event, can be implemented by an interrupt (e.g., a hardware, software, and/or firmware interrupt) that, when generated and/or otherwise invoked, can indicate (e.g., via an indication) to the DLB circuitry 106 that there is/are workload(s) associated with an HTTP request to process. In some examples, in response to and/or after the event, the DLB circuitry 106 can determine whether the DLB circuitry 106 is available to enqueue the first event. For example, the DLB circuitry 106 can determine that the DLB circuitry 106 has available bandwidth to enqueue the data pointer, the priority, etc., into first queue(s) (e.g., producer queue(s)) of the DLB circuitry 106. In some examples, the DLB circuitry 106 can enqueue the event by including, inserting, and/or enqueuing the data pointer, the priority, etc., into the first queue(s). In some examples, the DLB circuitry 106 can dequeue the event by dequeuing and/or otherwise removing the data pointer, the priority, etc., from the first queue(s) and adding the data pointer, the priority, etc., into second queue(s) (e.g., consumer queue(s)) that may be accessed by consumer or worker cores for subsequent processing. In some examples, a worker core can write data to the event. For example, in response to dequeuing the event from the DLB circuitry 106 and completing a computation operation on the data stored referenced by the data pointer, the worker core can write a completion bit, byte, etc., into the event, and enqueue the event back to the DLB circuitry 106. In some examples, the DLB circuitry 106 can determine that the computation operation has been completed by identifying the completion bit, byte, etc., in the event.

Figure 2:
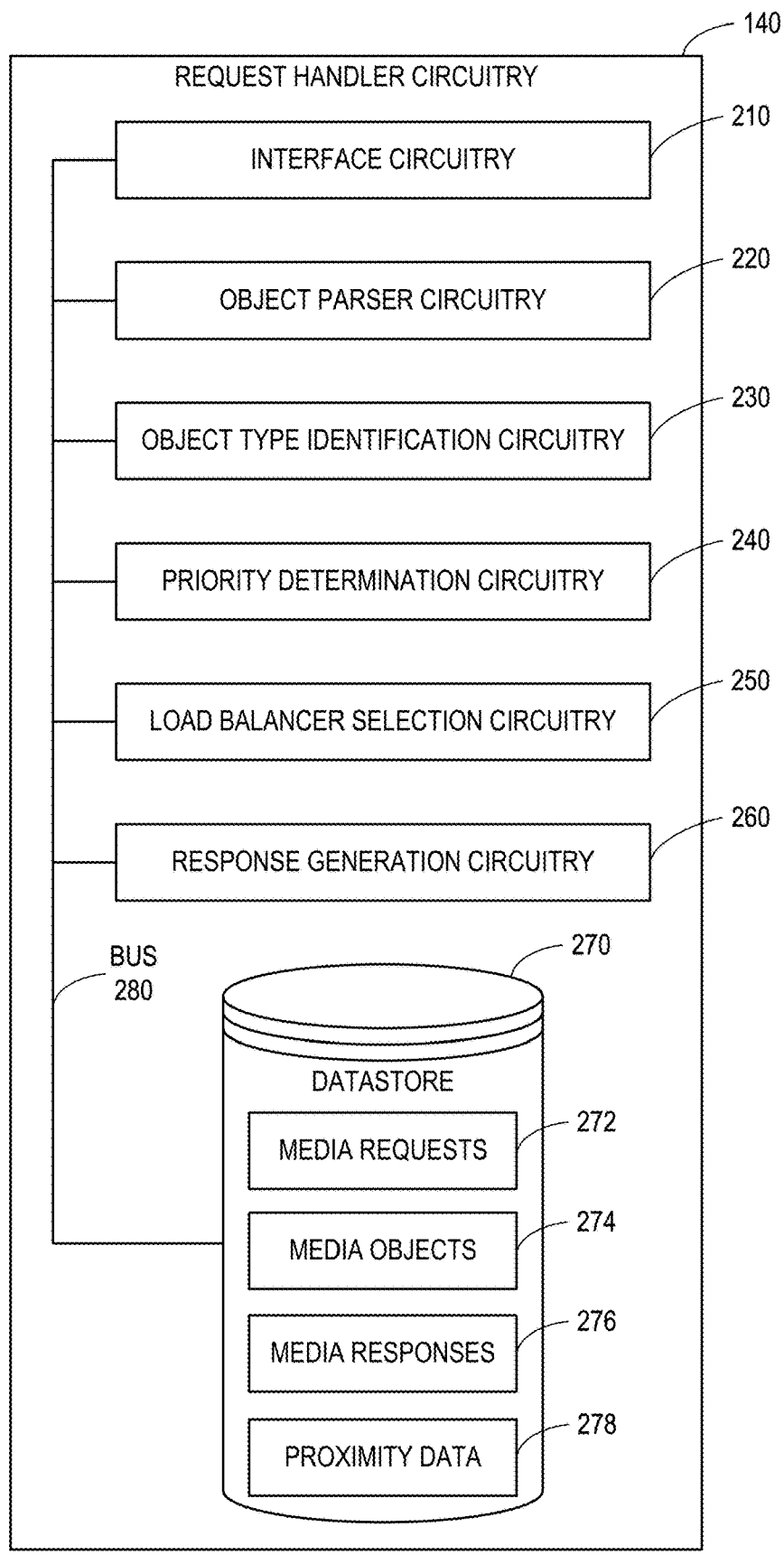
FIG. 2 is a block diagram of an example implementation of the example request handler circuitry of FIG. 1.

FIG. 2 is a block diagram of an example implementation of the request handler circuitry 104 of FIG. 1 to improve server processing of requests for media (e.g., media accessible via a network, such as the Internet, multimedia, etc.). The request handler circuitry 104 of FIGS. 1 and/or 2 may be instantiated (e.g., creating an instance of, bring into being for any length of time, materialize, implement, etc.) by processor circuitry such as a central processing unit executing instructions. Additionally or alternatively, the request handler circuitry 104 of FIGS. 1 and/or 2 may be instantiated (e.g., creating an instance of, bring into being for any length of time, materialize, implement, etc.) by an ASIC or an FPGA structured to perform operations corresponding to the instructions. It should be understood that some or all of the request handler circuitry 104 of FIGS. 1 and/or 2 may, thus, be instantiated at the same or different times. Some or all of the request handler circuitry 104 of FIGS. 1 and/or 2 may be instantiated, for example, in one or more threads executing concurrently on hardware and/or in series on hardware. Moreover, in some examples, some or all of the request handler circuitry 104 of FIGS. 1 and/or 2 may be implemented by microprocessor circuitry executing instructions to implement one or more virtual machines and/or containers.

The request handler circuitry 104 of the illustrated example includes example interface circuitry 210, example object parser circuitry 220, example object type identification circuitry 230, example priority determination circuitry 240, example load balancer selection circuitry 250, example response generation circuitry 260, an example datastore 270, and an example bus 280. The datastore 270 of the illustrated example includes example media requests 272, example media objects 274, example media responses 276, and example proximity data 278.

In the illustrated example, the interface circuitry 210, the object parser circuitry 220, the object type identification circuitry 230, the priority determination circuitry 240, the load balancer selection circuitry 250, the response generation circuitry 260, and/or the datastore 270 is/are in communication with one(s) of each other via the bus 280. For example, the bus 280 can be implemented with at least one of an I2C bus, a SPI bus, a PCI bus, or a PCIe bus. Additionally or alternatively, the bus 280 may be implemented with any other type of computing or electrical bus.

The request handler circuitry 104 of the illustrated example includes the interface circuitry 210 to receive a request such as an HTTP request (e.g., an HTTP2 request, an HTTP3 request, etc.) that includes one or more different types of data objects, such as an audio object, a video object, or a text object. An object (e.g., a data object, a media object, etc.), such as an audio object, an image object, a text object, a video object, etc., can be information in any form (e.g., alphanumeric characters, bits, bytes, etc.) that can be ingested, processed, interpreted and/or otherwise manipulated by processor circuitry to produce a result. The produced result may itself be data. In some examples, the result can be the presentation of audio, image, text, and/or video data on one or more display devices of an electronic and/or computing system.

In some examples, the interface circuitry 210 can receive the request(s) 118 from one(s) of the client devices 124, 128, 132. In some examples, the interface circuitry 210 can store the request(s) 118 in the datastore 270 as the media requests 272. In some examples, the request(s) 118 can be multimedia request(s) or request(s) for multimedia. In some examples, the interface circuitry 210 can determine whether there is/are additional request(s) for media to process. In some examples, the interface circuitry 210 is instantiated by processor circuitry executing interface instructions and/or configured to perform operations such as those represented by one(s) of the data flow diagrams of FIGS. 13 and/or 14 and/or one(s) of the flowcharts of FIGS. 30, 31, 32, 33, and/or 34.

In some examples, the media is based on one or more formats, protocols, etc. For example, the media can be based on HTTPS (or an HTTPS format), JavaScript Object Notation (JSON) (or a JSON format), an Abstract Syntax Notation One (ASN.1) (or an ASN.1 format), eXtensible Markup Language (XML) (or XML format), etc., and/or any combination(s) thereof. In some examples, an audio object, a video object, and/or a text object of the media can be based on one or more formats, protocols, etc. For example, an audio object of media can be based on HTTPS, JSON, ASN.1, and/or XML. In some examples, an audio object, a video object, and/or a text object of the media can be based on different formats, protocols, etc. For example, an audio object of media can be based on HTTPS, a video object can be based on JSON, and a text object can be based on XML. In some examples, an audio object and a text object of media can be based on HTTPS and a video object of the media can be based on ASN.1. Any other combinations are contemplated.

In some examples, the interface circuitry 210 establishes a connection with a client device. For example, the interface circuitry 210 can create and/or instantiate a socket (e.g., a data socket, a network socket, a web socket etc.); bind a port (e.g., an application and/or service port, a data port, a network port, a web port, etc.) to the socket; and listen for new requests to be received via the socket. In some examples, the interface circuitry 210 can create and/or instantiate a socket by assigning and/or associating an Internet Protocol (IP) address to the socket. For example, a socket can be implemented by an IP address and/or a port number. In some examples, a socket can identify a computing and/or electronic device and/or an application, a program, etc., executed and/or instantiated by the computing and/or electronic device. In some examples, a port can specify a number that is used by a computing and/or electronic device and/or an application, a program, etc., executed and/or instantiated by the computing and/or electronic device. For example, different computing and/or electronic devices can have the same port. In some examples, different computing and/or electronic devices can have a different port.

In some examples, the interface circuitry 210 can accept new connections after a determination that new request(s) is/are identified and/or received. In some examples, the socket and/or the port can return a file descriptor. For example, the socket can return a non-negative file descriptor number after a successful establishment of the socket. In some examples, the socket can return a negative file descriptor number (e.g., −1, −2, etc.) after a failed establishment of the socket.

The request handler circuitry 104 of the illustrated example includes the interface circuitry 210 to transmit the request(s) 118 for the media 120 to the media providers 138, 140. In some examples, the interface circuitry 210 can transmit the response to the requesting one(s) of the client devices 124, 128, 132. For example, the interface circuitry 210 can transmit a response generated by the response generation circuitry 260, such as the media 120 and/or associated data, to the requesting one(s) of the client devices 124, 128, 132.

In some examples, the interface circuitry 210 can close a connection with a client device. For example, the interface circuitry 210 can close a file descriptor from accept to close an HTTP connection with a device. In some examples, the interface circuitry 210 can close a primary or main socket file descriptor to cease receiving data from and/or transmitting data to a client device.

In some examples, the interface circuitry 210 can determine that media associated with one of the media requests 272 is an elephant flow or a fat flow. For example, the interface circuitry 210 can determine that the media (and/or multimedia) is an elephant flow based on a determination that the media is a single session associated with a network connection that runs for a time period that satisfies a threshold. In some examples, the media can include and/or be associated with a packet flow or a flow of data packets that can have elephant or fat flow characteristics. In some examples, the interface circuitry 210 can determine that the media is an elephant flow based on a determination that a bandwidth associated with the processor circuitry 106, 110, 112 decreases below a threshold (e.g., a bandwidth threshold). In some examples, the interface circuitry 210 can determine that the media is an elephant flow based on a determination that the media has and/or is associated with a number of bytes (e.g., data bytes) that satisfies a threshold (e.g., a data byte threshold, a size threshold, a data size threshold, etc.).

The request handler circuitry 104 of the illustrated example includes the object parser circuitry 220 to parse the request(s) 118 of FIG. 1 and/or the media requests 272 of FIG. 2 into one or more objects (e.g., data objects, media data objects, web objects such as HTTP or HTTPA web objects, sub-objects, etc.), portions (e.g., data portions, media data portions, media web portions such as HTTP or HTTPA web portions, sub-portions, etc.), segments (e.g., data segments, media data segments, media web segments such as HTTP or HTTPA web segments, sub-segments, etc.), partitions (e.g., data partitions, media data partitions, media web partitions such as HTTP or HTTPA web partitions, sub-partitions, etc.), etc. For example, the object parser circuitry 220 can divide, partition, separate, slice, split, and/or otherwise parse the request(s) 118 and/or the media requests 272 into one or more headers (e.g., HTTP headers, HTTPS headers, HTTPA headers, data headers, packet headers, etc.), one or more payloads (e.g., HTTP payloads, HTTPS payloads, HTTPA payloads, data payloads, packet payloads, etc.), etc. In some examples, the object parser circuitry 220 can store the one or more objects associated with a request in the datastore 270 as one(s) of the media objects 274. For example, the media objects 274 can include audio objects, image objects, text objects, video objects, etc., and/or any combination(s) thereof. In some examples, the media objects 274 are objects of multimedia. For example, multimedia can include two or more different types of the media objects 274, such as an audio object type and a video object type. In some examples, the object parser circuitry 220 is instantiated by processor circuitry executing object parser instructions and/or configured to perform operations such as those represented by one(s) of the data flow diagrams of FIGS. 13 and/or 14 and/or one(s) of the flowcharts of FIGS. 30, 31, 32, 33, and/or 34.

The request handler circuitry 104 of the illustrated example includes the object type identification circuitry 230 to identify an object type of data included in a request. For example, the object type identification circuitry 230 can determine that an HTTP request includes a request for an audio object, a text object, and/or a video object. In some examples, the object type identification circuitry 230 is instantiated by processor circuitry executing object type identification instructions and/or configured to perform operations such as those represented by one(s) of the data flow diagrams of FIGS. 13 and/or 14 and/or one(s) of the flowcharts of FIGS. 30, 31, 32, 33, and/or 34.

In some examples, the object type identification circuitry 230 can identify the object(s) based on the one or more headers, the one or more payloads, etc., parsed by the object parser circuitry 220. For example, the object type identification circuitry 230 can identify a first data object type and a second data object type associated with media based on data included in the one or more headers, the one or more payloads, etc., of the request for the media. In some examples, a first one of the media requests 272 can include a header, which can include first data representative of a request for media having one or more audio objects, text objects, and/or video objects. In some examples, the first one of the media requests 272 can include a payload, which can include second data representative of a request for media having one or more audio objects, text objects, and/or video objects.

The request handler circuitry 104 of the illustrated example includes the priority determination circuitry 240 to identify a priority at which data associated with object types of a request for media can be processed by the DLB circuitry 106 and/or, more generally, the processor circuitry 108, 110, 112 of FIG. 1. In some examples, the priority determination circuitry 240 is instantiated by processor circuitry executing priority determination instructions and/or configured to perform operations such as those represented by one(s) of the data flow diagrams of FIGS. 13 and/or 14 and/or one(s) of the flowcharts of FIGS. 30, 31, 32, 33, and/or 34.

In some examples, the priority determination circuitry 240 can determine that a first one of the media requests 272 is associated with a first priority (e.g., a first data priority, a first data processing priority, a first data handling priority, etc.) and a second one of the media requests is associated with a second priority lower than the first priority. For example, the priority determination circuitry 240 can determine the priority based on a device that generated and/or otherwise originated the request. By way of example, the first one of the media requests 272 can originate from the first client device 124 and the second one of the media requests 272 can originate from the second client 128. The priority determination circuitry 240 can determine based on a policy (e.g., a service level agreement (SLA), an Internet usage policy, a user-configured policy, etc.) that the requests from the first client device 124 are to have the first priority and the requests from the second client device 128 are to have the second priority. In some examples, the priority determination circuitry 240 can determine a priority of the media requests 272 based on data included in the media requests 272, such as the media requests 272 including a priority data field filled with a number corresponding to the priority.

In some examples, the priority determination circuitry 240 can determine that objects within a media request are to have different priorities. For example, the priority determination circuitry 240 can determine that one of the media requests 272 includes a video object and a text object. In some examples, the priority determination circuitry 240 can determine that the video object is to be processed with a higher priority than the text object because the video object can require increased processing time and/or a greater number of resources (e.g., hardware, software, and/or firmware resources) than the text object. In some examples, the priority determination circuitry 240 can determine that a first object has a higher priority than a second object based on user-defined preferences, a policy, etc., and/or any combination(s) thereof.

In some examples, after a determination of priority of a request and/or object(s) within the request, the priority determination circuitry 240 can enqueue event data into the DLB circuitry 106 of FIG. 1. For example, the priority determination circuitry 240 can enqueue first event data associated with a first data object in a first queue and second event data associated with a second data object in a second queue. In some examples, the first queue can be a first producer queue and/or the second queue can be a second producer queue associated with the DLB circuitry 106. For example, the priority determination circuitry 240 can add, insert, include, store, and/or otherwise enqueue first data associated with a text object into a first producer queue associated with the DLB circuitry 106.

The request handler circuitry 104 of the illustrated example includes the load balancer selection circuitry 250 to select DLB circuitry to queue event(s) to execute one(s) of the media requests 272. In some examples, the load balancer selection circuitry 250 is instantiated by processor circuitry executing load balancer selection instructions and/or configured to perform operations such as those represented by one(s) of the data flow diagrams of FIGS. 13 and/or 14 and/or one(s) of the flowcharts of FIGS. 30, 31, 32, 33, and/or 34.

In some examples, the load balancer selection circuitry 250 can select the DLB circuitry 106 of FIG. 1 based on an order of proximity. For example, the load balancer selection circuitry 250 can determine an order of proximity of DLB circuitry with respect to a primary core or a control core. In some examples, the load balancer selection circuitry 250 can determine the order of proximity based on data included in a proximity table, which can be implemented by a look-up table or any other data structure. In some examples, the load balancer selection circuitry 250 can store the proximity table, the look-up table, and/or, more generally, data representative of the order of proximity, in the datastore 270 as the proximity data 278.

In some examples, the load balancer selection circuitry 250 can identify first DLB circuitry that has a first proximity based on a proximity order. For example, the load balancer selection circuitry 250 can identify the DLB circuitry 106 of the first processor circuitry 108 as being first in the proximity order. In some examples, the load balancer selection circuitry 250 can query the DLB circuitry 106 of the first processor circuitry 108 for availability to enqueue event(s). In some examples, the load balancer selection circuitry 250 can determine that the DLB circuitry 106 of the first processor circuitry 108 is busy and/or otherwise is not available to enqueue the event(s). For example, the load balancer selection circuitry 250 can determine that the DLB circuitry 106 of the first processor circuitry 108 is busy based on not receiving a reply to the query from the DLB circuitry 106. In some examples, the load balancer selection circuitry 250 can determine that the DLB circuitry 106 of the first processor circuitry 108 is busy based on a reply from the DLB circuitry 106 that indicates that the DLB circuitry 106 is busy and/or otherwise is executing a workload.

In some examples, the load balancer selection circuitry 250 can identify the next DLB circuitry in the proximity order that has a subsequent or less proximity based on the proximity order. For example, based on a determination that the DLB circuitry 106 of the first processor circuitry 108 is unavailable for enqueueing the event(s), the load balancer selection circuitry 250 can query another instance of the DLB circuitry 106 of the first processor circuitry 108 or the DLB circuitry 106 of the second processor circuitry 110. In some examples, the load balancer selection circuitry 250 can determine that the another instance of the DLB circuitry 106 of the first processor circuitry 108 can be the next lowest DLB circuitry in the order proximity. In some examples, the load balancer selection circuitry 250 can identify (e.g., iteratively identify) subsequent DLB circuitry in the order proximity until the load balancer selection circuitry 250 identifies DLB circuitry that is available to enqueue event(s) associated with the media requests 272. After an identification of available DLB circuitry, the load balancer selection circuitry 250 can select the available DLB circuitry to enqueue the event(s). For example, the priority determination circuitry 240 can enqueue the event(s) to the available DLB circuitry based on the identification. In some examples, the load balancer selection circuitry 250 can adjust, change, modify, and/or update the proximity order of the proximity table based on the identification. For example, the load balancer selection circuitry 250 can lower the available DLB circuitry in the proximity order and raise other DLB circuitry in the proximity order to achieve reduced processing time associated with future queries for available DLB circuitry.

The request handler circuitry 104 of the illustrated example includes the response generation circuitry 260 to generate a response to requesting one(s) of the client devices 124, 128, 132 for the media 120 based on the request. For example, the interface circuitry 210 can obtain the media 120 from one(s) of the media providers 138, 140. In some examples, the response generation circuitry 260 can compile, package, aggregate, and/or otherwise assemble the media 120 into one or more HTTP messages (or HTTPS or HTTPA messages), which can implement the response. In some examples, the response generation circuitry 260 can store the response in the datastore 270 as one(s) of the media responses 276. In some examples, the response generation circuitry 260 is instantiated by processor circuitry executing response generation instructions and/or configured to perform operations such as those represented by one(s) of the data flow diagrams of FIGS. 13 and/or 14 and/or one(s) of the flowcharts of FIGS. 30, 31, 32, 33, and/or 34.

The request handler circuitry 104 of the illustrated example includes the datastore 270 to record data. For example, the datastore 270 can record and/or store the request(s) 118, the media 120 (e.g., advertisements, content, multimedia, SMS messages, Apple® iMessages, etc.), etc., of FIG. 1. In some examples, the datastore 270 is instantiated by processor circuitry executing datastore instructions and/or configured to perform operations such as those represented by one(s) of the data flow diagrams of FIGS. 13 and/or 14 and/or one(s) of the flowcharts of FIGS. 30, 31, 32, 33, and/or 34.

In some examples, the datastore 270 can record and/or store the media requests 272, the media objects 274, the media responses 276, and the proximity data 278 of FIG. 2. The datastore 270 of this example may be implemented by a volatile memory and/or a non-volatile memory (e.g., flash memory). The datastore 270 may additionally or alternatively be implemented by one or more DDR memories, such as DDR, DDR2, DDR3, DDR4, DDR5, mDDR, etc. The datastore 270 may additionally or alternatively be implemented by one or more mass storage devices such as HDD(s), CD drive(s), DVD drive(s), SSD drive(s), etc. While in the illustrated example the datastore 270 is illustrated as a single datastore, the datastore 270 may be implemented by any number and/or type(s) of datastores. Furthermore, the data stored in the datastore 270 may be in any data format such as, for example, binary data, comma delimited data, tab delimited data, structured query language (SQL) structures, an executable (e.g., an executable binary, a configuration image, etc.), etc. In some examples, the datastore 270 can include and/or implement one or more databases. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list or in any other form.

In some examples, the request handler circuitry 140 includes means for receiving and/or transmitting data. For example, the means for receiving and/or transmitting may be implemented by the interface circuitry 210. In some examples, the interface circuitry 210 may be instantiated by processor circuitry such as the example processor circuitry 3512 of FIG. 35. For instance, the interface circuitry 210 may be instantiated by the example microprocessor 3600 of FIG. 36 executing machine executable instructions such as those implemented by one or more blocks of FIGS. 30, 31, 32, 33, and/or 34. In some examples, the interface circuitry 210 may be instantiated by hardware logic circuitry, which may be implemented by an ASIC, XPU, or the FPGA circuitry 3700 of FIG. 37 structured to perform operations corresponding to the machine readable instructions. Additionally or alternatively, the interface circuitry 210 may be instantiated by any other combination of hardware, software, and/or firmware. For example, the interface circuitry 210 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for parsing a request for media, which can be multimedia. For example, the means for parsing may be implemented by the object parser circuitry 220. In some examples, the object parser circuitry 220 may be instantiated by processor circuitry such as the example processor circuitry 3512 of FIG. 35. For instance, the object parser circuitry 220 may be instantiated by the example microprocessor 3600 of FIG. 36 executing machine executable instructions such as those implemented by one or more blocks of FIGS. 30, 31, 32, 33, and/or 34. In some examples, the object parser circuitry 220 may be instantiated by hardware logic circuitry, which may be implemented by an ASIC, XPU, or the FPGA circuitry 3700 of FIG. 37 structured to perform operations corresponding to the machine readable instructions. Additionally or alternatively, the object parser circuitry 220 may be instantiated by any other combination of hardware, software, and/or firmware. For example, the object parser circuitry 220 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for identifying an object type. For example, the means for identifying may be implemented by the object type identification circuitry 230. In some examples, the object type identification circuitry 230 may be instantiated by processor circuitry such as the example processor circuitry 3512 of FIG. 35. For instance, the object type identification circuitry 230 may be instantiated by the example microprocessor 3600 of FIG. 36 executing machine executable instructions such as those implemented by one or more blocks of FIGS. 30, 31, 32, 33, and/or 34. In some examples, the object type identification circuitry 230 may be instantiated by hardware logic circuitry, which may be implemented by an ASIC, XPU, or the FPGA circuitry 3700 of FIG. 37 structured to perform operations corresponding to the machine readable instructions. Additionally or alternatively, the object type identification circuitry 230 may be instantiated by any other combination of hardware, software, and/or firmware. For example, the object type identification circuitry 230 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for determining a priority of data. For example, the means for determining may be implemented by the priority determination circuitry 240. In some examples, the priority determination circuitry 240 may be instantiated by processor circuitry such as the example processor circuitry 3512 of FIG. 35. For instance, the priority determination circuitry 240 may be instantiated by the example microprocessor 3600 of FIG. 36 executing machine executable instructions such as those implemented by one or more blocks of FIGS. 30, 31, 32, 33, and/or 34. In some examples, the priority determination circuitry 240 may be instantiated by hardware logic circuitry, which may be implemented by an ASIC, XPU, or the FPGA circuitry 3700 of FIG. 37 structured to perform operations corresponding to the machine readable instructions. Additionally or alternatively, the priority determination circuitry 240 may be instantiated by any other combination of hardware, software, and/or firmware. For example, the priority determination circuitry 240 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for selecting a load balancer and/or load balancer circuitry. For example, the means for selecting may be implemented by the load balancer selection circuitry 250. In some examples, the load balancer selection circuitry 250 may be instantiated by processor circuitry such as the example processor circuitry 3512 of FIG. 35. For instance, the load balancer selection circuitry 250 may be instantiated by the example microprocessor 3600 of FIG. 36 executing machine executable instructions such as those implemented by one or more blocks of FIGS. 30, 31, 32, 33, and/or 34. In some examples, the load balancer selection circuitry 250 may be instantiated by hardware logic circuitry, which may be implemented by an ASIC, XPU, or the FPGA circuitry 3700 of FIG. 37 structured to perform operations corresponding to the machine readable instructions. Additionally or alternatively, the load balancer selection circuitry 250 may be instantiated by any other combination of hardware, software, and/or firmware. For example, the load balancer selection circuitry 250 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for generating a response to a request for media. For example, the means for generating may be implemented by the response generation circuitry 260. In some examples, the response generation circuitry 260 may be instantiated by processor circuitry such as the example processor circuitry 3512 of FIG. 35. For instance, the response generation circuitry 260 may be instantiated by the example microprocessor 3600 of FIG. 36 executing machine executable instructions such as those implemented by one or more blocks of FIGS. 30, 31, 32, 33, and/or 34. In some examples, the response generation circuitry 260 may be instantiated by hardware logic circuitry, which may be implemented by an ASIC, XPU, or the FPGA circuitry 3700 of FIG. 37 structured to perform operations corresponding to the machine readable instructions. Additionally or alternatively, the response generation circuitry 260 may be instantiated by any other combination of hardware, software, and/or firmware. For example, the response generation circuitry 260 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the request handler circuitry 140 includes means for storing data. For example, the means for storing may be implemented by the datastore 270. In some examples, the datastore 270 may be instantiated by processor circuitry such as the example processor circuitry 3512 of FIG. 35. For instance, the datastore 270 may be instantiated by the example microprocessor 3600 of FIG. 36 executing machine executable instructions such as those implemented by one or more blocks of FIGS. 30, 31, 32, 33, and/or 34. In some examples, the datastore 270 may be instantiated by hardware logic circuitry, which may be implemented by an ASIC, XPU, or the FPGA circuitry 3700 of FIG. 37 structured to perform operations corresponding to the machine readable instructions. Additionally or alternatively, the datastore 270 may be instantiated by any other combination of hardware, software, and/or firmware. For example, the datastore 270 may be implemented by at least one or more hardware circuits (e.g., processor circuitry, discrete and/or integrated analog and/or digital circuitry, an FPGA, an ASIC, an XPU, an IPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the request handler circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the interface circuitry 210, the object parser circuitry 220, the object type identification circuitry 230, the priority determination circuitry 240, the load balancer selection circuitry 250, the response generation circuitry 260, the datastore 270, and/or, more generally, the example request handler circuitry 104 of FIG. 1, may be implemented by hardware alone or by hardware in combination with software and/or firmware. Thus, for example, any of the interface circuitry 210, the object parser circuitry 220, the object type identification circuitry 230, the priority determination circuitry 240, the load balancer selection circuitry 250, the response generation circuitry 260, the datastore 270, and/or, more generally, the example request handler circuitry 104, could be implemented by processor circuitry, analog circuit(s), digital circuit(s), logic circuit(s), programmable processor(s), programmable microcontroller(s), GPU(s), DSP(s), ASIC(s), programmable logic device(s) (PLD(s)), and/or field programmable logic device(s) (FPLD(s)) such as FPGAs. Further still, the example request handler circuitry 104 of FIG. 1 may include one or more elements, processes, and/or devices in addition to, or instead of, those illustrated in FIG. 2, and/or may include more than one of any or all of the illustrated elements, processes and devices.

Figure 3:
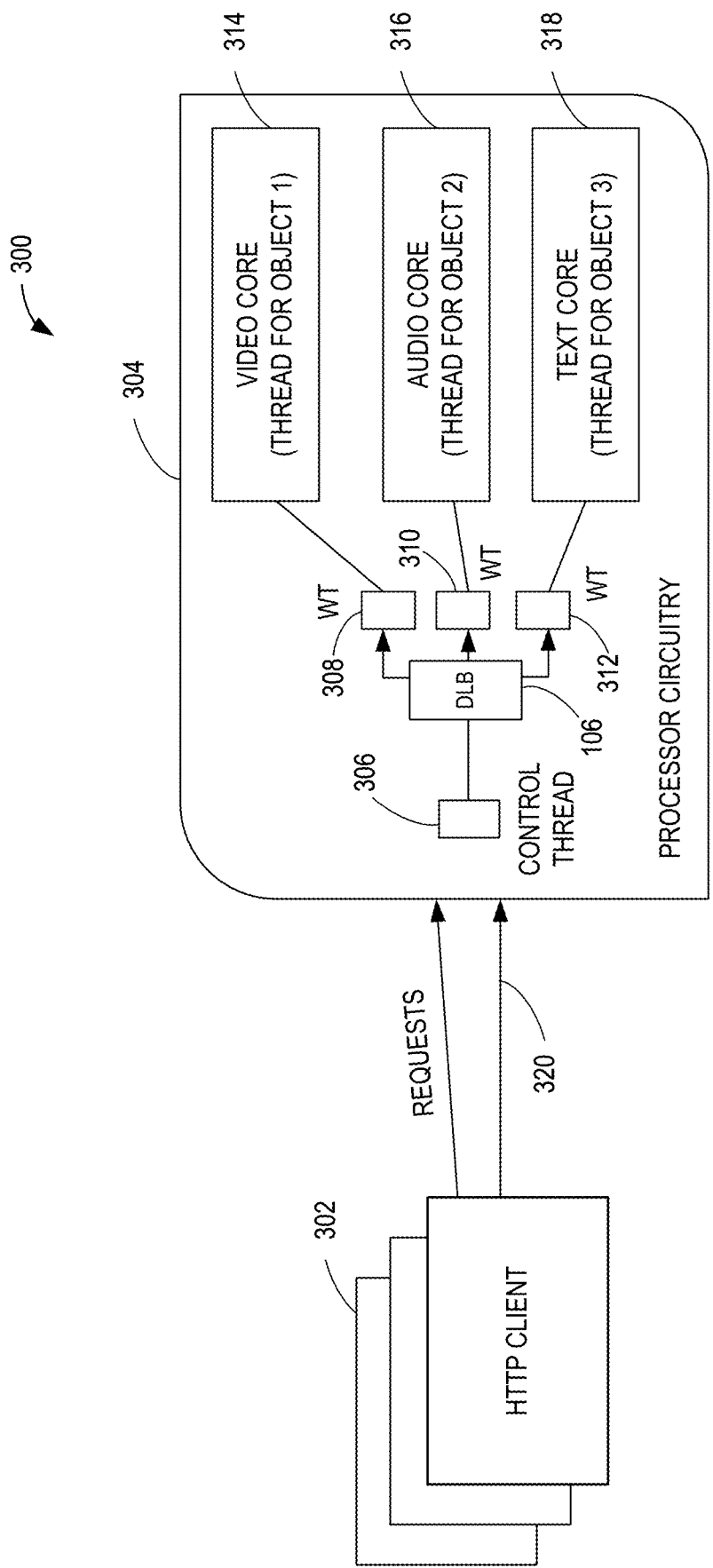
FIG. 3 is a block diagram of the example request handler circuitry of FIGS. 1 and/or 2 and/or the example DLB circuitry of FIG. 1 facilitating example webserver requests.

FIG. 3 is a block diagram of a first example webserver request processing system 300 including example HTTP clients 302 and example processor circuitry 304. In some examples, the HTTP clients 302 can be terrestrial or non-terrestrial HTTP clients (e.g., satellite-based HTTP clients, beyond-line-of-sight (BLOS) HTTP clients, line-of-sight (LOS) HTTP clients, etc.). For example, the HTTP clients 302 can be implemented by non-terrestrial HTTP clients such as one or more satellite vehicles as disclosed herein. In some examples, the HTTP clients 302 can be terrestrial HTTP clients such as one or more ground stations, distributed units, centralized units, core servers, Infrastructure Processing Units (IPUs), etc., as disclosed herein. Additionally or alternatively, one(s) of the HTTP clients 302 may be any other type of client, such as an HTTPS or HTTPA client (e.g., satellite-based HTTPS/HTTPA clients, BLOS HTTPS/HTTPA clients, LOS HTTPS/HTTPA clients, etc.).

The processor circuitry 304 of the illustrated example includes an example control thread 306 (identified by CT), the DLB circuitry 106 of FIG. 1, example worker threads 308, 310, 312 (identified by WT), and example cores 314, 316, 318. In some examples, the worker threads 308, 310, 312 are available to receive new workloads to process. For example, the worker threads 308, 310, 312 can be passive, idle, and/or otherwise not executing a workload and thereby available to receive new workloads. In some examples, the worker threads 308, 310, 312 can be active because they are in progress of executing a workload. In some examples, the worker threads 308, 310, 312 can be active and may be available to receive new workloads by a time the new workloads are ready to be enqueued. In some examples, the worker threads 308, 310, 312 are worker threads because they are working and/or otherwise in process of executing compute workloads.

The worker threads 308, 310, 312 of the illustrated example include a first example worker thread 308, a second example worker thread 310, and a third example worker thread 312. The cores 314, 316, 318 include a first example core 314 (identified by VIDEO CORE), a second example core 316 (identified by AUDIO CORE), and a third example core 318 (identified by TEXT CORE). The control thread 306 and the worker threads 308, 310, 312 are processor threads (e.g., threads of processor circuitry, such as a CPU). For example, the control thread 306 and/or one(s) of the worker threads 308, 310, 312 can be implemented as virtual threads of the processor circuitry 304. For example, one(s) of the threads 306, 308, 310, 312 can be virtual components or codes, which divide hardware core(s) of the processor circuitry 304 into virtual multiple cores to increase performance of the processor circuitry 304.

In some examples, the HTTP clients 302 can be implemented by the web applications 126, 130, 134 of FIG. 1, and/or, more generally, the client devices 124, 128, 132 of FIG. 1. In some examples, the processor circuitry 304 of FIG. 3 can correspond to and/or be implemented by the first processor circuitry 108, the second processor circuitry 110, and/or the third processor circuitry 112 of FIG. 1. In some examples, the request handler circuitry 104 of FIGS. 1 and/or 2 can include and/or implement the control thread 306, and/or, other components of the processor circuitry 304 of FIG. 3. In some examples, another core of the processor circuitry 304 can implement the control thread 306.

The processor circuitry 304 of FIG. 3 is multi-core hardware, such as multi-core processor circuitry. The processor circuitry 304 of the illustrated example includes the cores 314, 316, 318 to execute and/or facilitate example webserver requests 320. In some examples, the webserver requests 320 are implemented by at least one of HTTP/1.1, HTTP/2, HTTP/3, HTTPS, or HTTPA requests. In some examples, the webserver requests 320 can be implemented by the request(s) 118 of FIG. 1 and/or the media requests 272 of FIG. 2.

In example operation, the processor circuitry 304 can obtain the webserver requests 320 from the HTTP clients 302. For example, the interface circuitry 114 can receive a first webserver request of the webserver requests 320 via the first network 122 of FIG. 1. In some examples, the first webserver request can be a request for the media 120 of FIG. 1. In some examples, the request handler circuitry 104 of FIG. 1 can determine that the first webserver request includes a video object, an audio object, and/or a text object associated with the media 120.

In example operation, the DLB circuitry 106 can enqueue data indications, such as pointers to data stored in memory. For example, the data indications can correspond to respective objects of the webserver requests 320. For example, the DLB circuitry 106 can enqueue a first data pointer corresponding to first data of the video object, a second data pointer corresponding to second data of the audio object, and a third data pointer corresponding to third data of the text object. In some examples, the first data pointer can include, reference, and/or point to a first address (e.g., a first memory address, a first data address, etc.) or a first range of addresses (e.g., a first range of memory addresses, a first range of data addresses, etc.) of the first data at which the first data is stored (e.g., in memory, in a datastore, in mass storage, etc.). In some examples, the second data pointer can include, reference, and/or point to a second address (e.g., a second memory address, a second data address, etc.) or a second range of addresses (e.g., a second range of memory addresses, a second range of data addresses, etc.) of the second data at which the second data is stored (e.g., in memory, in a datastore, in mass storage, etc.). In some examples, the third data pointer can include, reference, and/or point to a third address (e.g., a third memory address, a third data address, etc.) or a third range of addresses (e.g., a third range of memory addresses, a third range of data addresses, etc.) of the third data at which the third data is stored (e.g., in memory, in a datastore, in mass storage, etc.).

In example operation, the DLB circuitry 106 can dequeue the first data pointer to the first worker thread 308, the second data pointer to the second worker thread 310, and the third data pointer to the third worker thread 312. For example, the DLB circuitry 106 can dequeue the first data pointer by moving (or removing) the first data pointer from a first data queue of the DLB circuitry 106 to a second data queue pointer associated with the first core 314. In some examples, the first worker thread 308 can be implemented by the first core 314, the second worker thread 310 can be implemented by the second core 316, and/or the third worker thread 312 can be implemented by the third core 318. After dequeuing the data pointers from the DLB circuitry 106, the worker threads 308, 310, 312 can respond to the DLB circuitry 106 to at least one of (i) close the connection or indicate to the DLB circuitry 106 that the data pointers have been dequeued from the DLB circuitry 106 for processing.

Advantageously, by allocating workloads based on an object type of an HTTP request, the DLB circuitry 106 can increase the performance, increase the throughput and/or reduce latency associated with execution of compute tasks by the processor circuitry 304. For example, if all of the workloads are allocated to the same core (e.g., the first core 314), then the processing of one type of object data, such as video object data, can cause a backlog in execution of the other types of object data while waiting for the one type of object data to be processed and/or complete. In the illustrated example of FIG. 3, the DLB circuitry 106 can distribute the different types of workloads to different ones of the cores 314, 316, 318 to expedite execution of the webserver requests 320.

In some examples, the requests 320 are implemented by sustained contact (e.g., sustained communication, prolonged communication, etc.) and/or short-burst contact (e.g., short-burst communication, pulse communication, ephemeral communication, etc.) in non-terrestrial systems. For example, a first one of the HTTP clients 302 can be a satellite and a first one of the requests 320 can be implemented by and/or correspond to sustained non-terrestrial contact in which the satellite is in communication with the processor circuitry 304 for a time period that satisfies a threshold (e.g., a time period longer than 10 seconds, 30 seconds, 1 minute, 1 hour, 3 hours, etc.). In some examples, the first one of the requests 320 can be implemented by and/or correspond to short-burst non-terrestrial contact. For example, the first one of the requests 320 can be a message (e.g., a Short Message Service (SMS) message, an Apple® iMessage®, etc.). In some examples, the communication between the satellite and the processor circuitry 304 is established only to transmit the message and, after the transmission of the message, the communication between the satellite and the processor circuitry 304 is terminated (e.g., terminated until another short-burst message may be generated and/or transmitted). For example, the processor circuitry 304 can be included in and/or associated with an aircraft, such as an onboard aircraft Internet delivery system. In some examples, the onboard aircraft Internet delivery system can effectuate communication between the satellite and user devices on the aircraft, such as tablet computers, handheld devices (e.g., smartphones), wearable devices, etc.

In some examples, the requests 320 are implemented by sustained contact (e.g., sustained communication, prolonged communication, etc.) and/or short-burst contact (e.g., short-burst communication, pulse communication, ephemeral communication, etc.) in terrestrial systems. For example, a second one of the HTTP clients 302 can be a distributed unit (DU), a centralized unit (CU), a core server, etc., in a telecommunications system (e.g., a fifth generation cellular (i.e., 5G) system, a sixth generation cellular (i.e., 6G) system, etc.) and a second one of the requests 320 can be implemented by and/or correspond to sustained terrestrial contact in which the DU, the CU, the core server, etc., is in communication with the processor circuitry 304 for a time period that satisfies a threshold (e.g., a time period longer than 10 seconds, 30 seconds, 1 minute, 1 hour, 3 hours, etc.). In some examples, the second one of the requests 320 can be implemented by and/or correspond to short-burst terrestrial contact. For example, the first one of the requests 320 can be a message (e.g., an SMS message, an Apple® iMessage®, etc.). In some examples, the communication between the DU, the CU, the core server, etc., and the processor circuitry 304 is established to cause transmission of the message and, after the transmission of the message, the communication between the DU, the CU, the core server, etc., and the processor circuitry 304 concludes (e.g., terminated until another short-burst message may be generated and/or transmitted).

Figure 4:
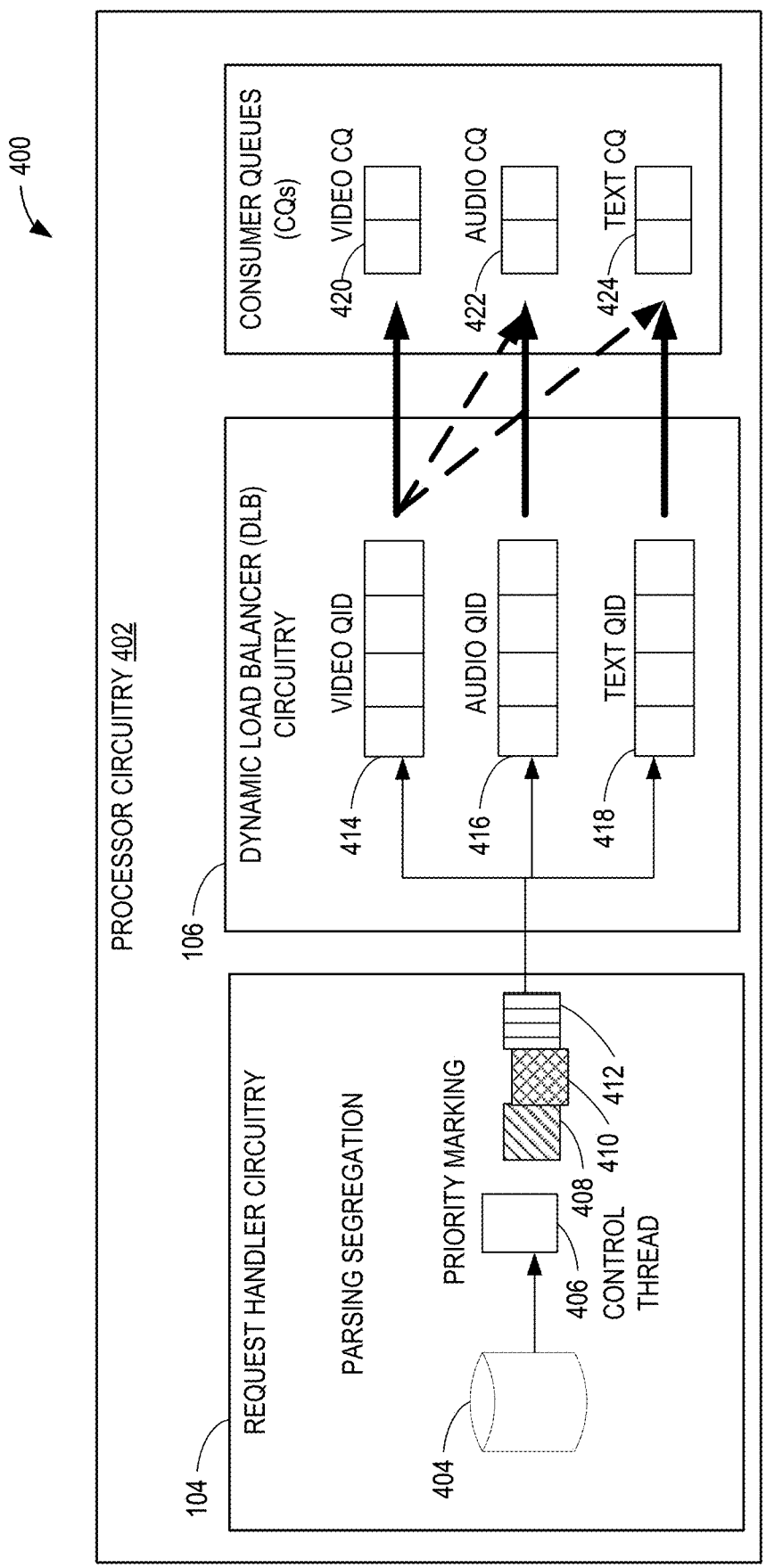
FIG. 4 is another block diagram of the example request handler circuitry of FIGS. 1 and/or 2 and/or the example DLB circuitry of FIG. 1 facilitating example webserver requests.

FIG. 4 is a block diagram of a second example webserver request processing system 400, which includes example processor circuitry 402, to facilitate webserver requests. In some examples, the processor circuitry 402 can correspond to and/or implement the first processor circuitry 108, the second processor circuitry 110, and/or the third processor circuitry 112 of FIG. 1 and/or the processor circuitry 304 of FIG. 3. The processor circuitry 402 of the illustrated example includes the request handler circuitry 104 of FIGS. 1 and/or 2, the DLB circuitry 106 of FIG. 1, and example consumer queues (CQs) 420, 422, 424.

In example operation, the request handler circuitry 104 can obtain an example webserver request 404. For example, the webserver request 404 can be a request for the media 120 of FIG. 1, which can include multiple data objects such as a video object, an audio object, a text object, etc. In some examples, the webserver request 404 can correspond to and/or implement the request(s) 118 of FIG. 1 and/or the media requests 272 of FIG. 2. The request handler circuitry 104 can include and/or implement an example control thread 406 to parse the webserver request 404 into different example object types 408, 410, 412. The request handler circuitry 104 can include and/or implement the control thread 406 to prioritize the different object types 408, 410, 412 based on Quality-of-Service (QoS) considerations, requirements, policies, user selections, etc. The different object types 408, 410, 412 of the illustrated example include an example video object type 408, an example audio object type 410, and an example text object type 412. Additionally or alternatively, the object types 408, 410, 412 may include any other type of object data. The control thread 406 of the illustrated example can determine that first data of the video object type 408 is stored at one or more first addresses (e.g., an address or range of addresses in memory, mass storage, a datastore, etc.) referenced by a first data pointer, the second data of the audio object type 410 is stored at one or more second addresses referenced by a second data pointer, and/or the third data of the text object type 412 is stored at one or more third addresses referenced by a third data pointer. In some examples, the first object type 408 can be a data object based on HTTPS, JSON, ASN.1, XML, or any other data format, data protocol, etc. In some examples, the second object type 410 can be a data object based on HTTPS, JSON, ASN.1, XML, or any other data format, data protocol, etc. In some examples, the third object type 412 can be a data object based on HTTPS, JSON, ASN.1, XML, or any other data format, data protocol, etc.

In example operation, the DLB circuitry 106 can enqueue the data pointers from the control thread 406. For example, the DLB circuitry 106 can enqueue and/or dequeue the data pointers based on atomic order (e.g., atomicity). In some examples, the DLB circuitry 106 can enqueue the first data pointer corresponding to the video object type 408 into a first example queue 414 having a first queue identifier (QID) (e.g., a video QID). For example, the DLB circuitry 106 can enqueue the first data pointer by storing the first QID in the first queue 414. In some examples, the first queue 414 can be a first producer queue (e.g., a first data producer queue).

In example operation, the DLB circuitry 106 can enqueue the second data pointer corresponding to the audio object type 410 into a second example queue 416 identified by a second QID (e.g., an audio QID). For example, the DLB circuitry 106 can enqueue the second data pointer by adding the second data pointer from the request handler circuitry 104 to the second queue 416. In some examples, the second queue 416 can be a second producer queue (e.g., a second data producer queue).

In example operation, the DLB circuitry 106 can enqueue the third data pointer corresponding to the text object type 412 into a third example queue 418 associated with a third QID (e.g., a text QID). For example, the DLB circuitry 106 can enqueue the third data pointer by storing the third data pointer in the third queue 418. In some examples, the third queue 418 can be a third producer queue (e.g., a third data producer queue).

In some examples, the first queue 414, the second queue 416, and/or the third queue 418 is/are implemented in and/or by hardware. For example, the first queue 414, the second queue 416, and/or the third queue 418 can be implemented by memory, one or more registers, one or more flip-flops, one or more latches, etc., and/or any combination(s) thereof. In some examples, the first queue 414, the second queue 416, and/or the third queue 418 is/are hardware-implemented and/or hardware-managed queues.

In example operation, the DLB circuitry 106 can dequeue the data pointers from respective ones of the queues 414, 416, 418 to respective ones of example consumer queues 420, 422, 424. The consumer queues 420, 422, 424 include a first example consumer queue 420, a second example consumer queue 422, and a third example consumer queue 424. In some examples, one or more of the consumer queues 420, 422, 424 is/are implemented in and/or by hardware. For example, one or more of the consumer queues 420, 422, 424 can be implemented by memory, one or more registers, one or more flip-flops, one or more latches, etc., and/or any combination(s) thereof.

In example operation, the DLB circuitry 106 can dequeue the first data pointer from the first queue 414 to the first consumer queue 420, which can be implemented as a queue that corresponds to the video object type 408. For example, the DLB circuitry 106 can dequeue the first data pointer by removing the first data pointer from a tail of the first queue 414 and adding the first data pointer to a head of the first consumer queue 420.

In example operation, the DLB circuitry 106 can dequeue the second data pointer from the second queue 416 to the second consumer queue 422, which can be implemented as a queue that corresponds to the audio object type 410. For example, the DLB circuitry 106 can dequeue the second data pointer by disassociating the first data pointer from a tail of the second queue 416 and associating the second data pointer with a head of the second consumer queue 422.

In example operation, the DLB circuitry 106 can dequeue the third data pointer from the third queue 418 to the third consumer queue 424, which can be implemented as a queue that corresponds to the text object type 412. For example, the DLB circuitry 106 can dequeue the third data pointer by deleting the third data pointer from a tail or end portion of the third queue 418 and generating the third data pointer at a head or start portion of the third consumer queue 424.

Additionally or alternatively, the first consumer queue 420, the second consumer queue 422, and/or the third consumer queue 424 may correspond to multiple one(s) of the object types 408, 410, 412. For example, the first consumer queue 420 and the second consumer queue 422 can correspond to video objects. In some examples, the third consumer queue 424 can correspond to text and audio objects.

In example operation, a first core of the processor circuitry 402 can dequeue the first data pointer from the first consumer queue 420. For example, the first core can retrieve the first data from the first address referenced by the first data pointer. In some examples, after retrieving the first data, the first core can retrieve video data from the first media provider 138 and/or the second media provider 140 of FIG. 1. For example, the first data can be representative of a uniform resource locator (URL) at which the video data is stored and/or can be accessed. In some examples, in response to accessing the first data, the first core can access the video data by querying the URL for the video data.

In example operation, a second core of the processor circuitry 402 can dequeue the second data pointer from the second consumer queue 422. For example, the second core can retrieve the second data from the second address referenced by the second data pointer. In some examples, in response to retrieving the second data, the second core can retrieve audio data from the first media provider 138 and/or the second media provider 140 of FIG. 1.

In example operation, a third core of the processor circuitry 402 can dequeue the third data pointer from the third consumer queue 424. For example, after obtaining the third data pointer from the third consumer queue 424, the third core can obtain the third data from the third address referenced by the third data pointer. In some examples, based on the third data, the third core can identify a location (e.g., an IP address and/or IP port number, a URL, etc.) associated with the first media provider 138 and/or the second media provider 140 of FIG. 1 at which text data can be obtained.

Figure 5:
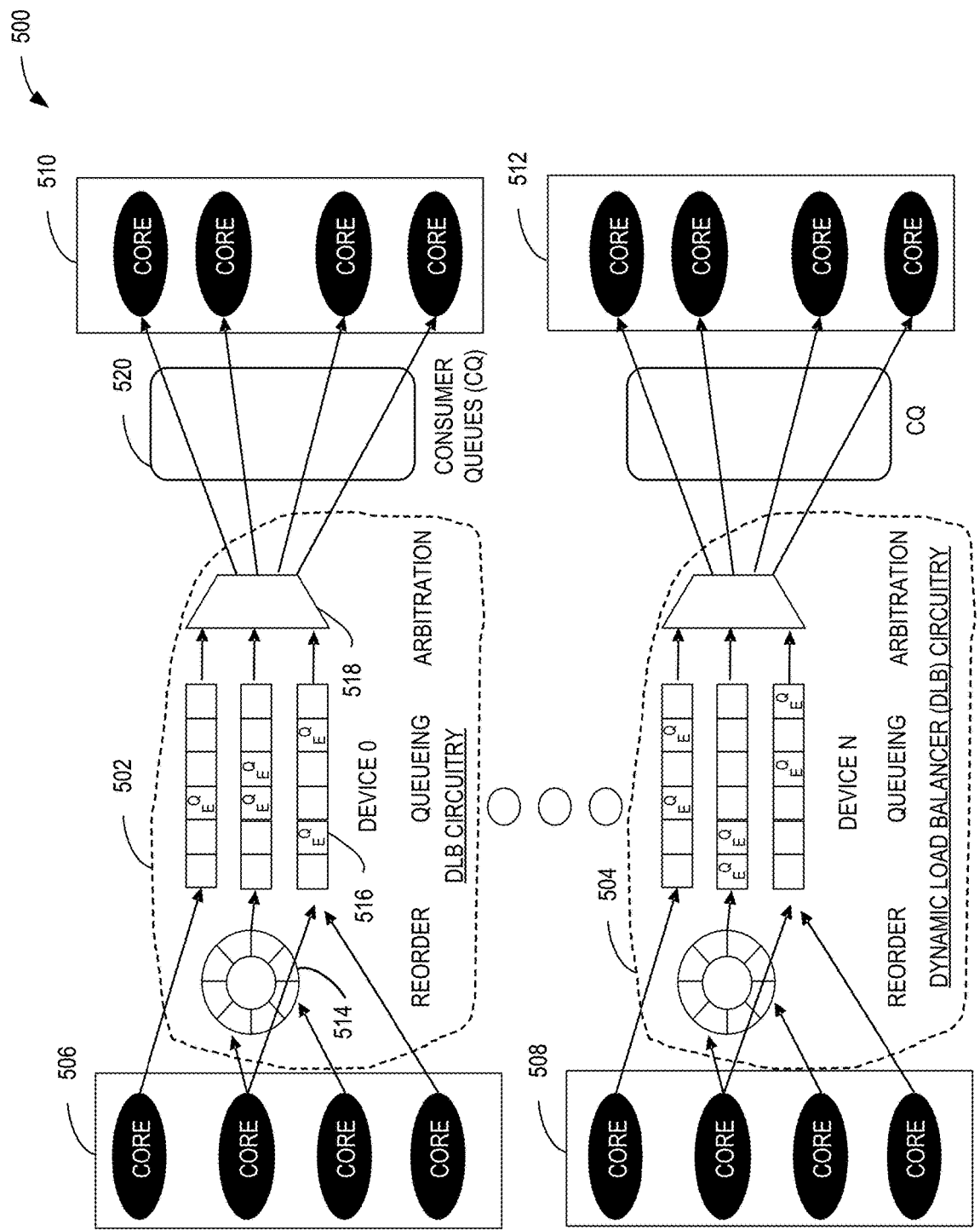
FIG. 5 is an illustration of the example DLB circuitry of FIG. 1 facilitating a scheduling of webserver requests.

FIG. 5 is an illustration of a third example webserver request processing system 500 including first example DLB circuitry 502 and second example DLB circuitry 504. In some examples, the first DLB circuitry 502 and/or the second DLB circuitry 504 can implement and/or correspond to the DLB circuitry 106 of FIGS. 1, 3, and/or 4. In some examples, the first DLB circuitry 502 and/or the second DLB circuitry 504 can be implemented by a Dynamic Load Balancer provided by Intel® Corporation of Santa Clara, California.

The third webserver request processing system 500 of the illustrated example includes first example producer cores 506 and second example producer cores 508. In the illustrated example, the first producer cores 506 and the second producer cores 508 are in communication with a respective one of the DLB circuitry 502, 504. In this example, first example consumer cores 510 and second example consumer cores 512 are in communication with a respective one of the DLB circuitry 502, 504. In some examples, fewer or more than instances of the DLB circuitry 502, 504 and/or fewer or more than the producer cores 506, 508 and/or consumer cores 510, 512 depicted in the illustrated example may be used. In this example, there is no cross-device arbitration (e.g., DEVICE 0 does not arbitrate for DEVICE N), however, in other examples, there may be cross-device arbitration.

In some examples, the DLB circuitry 502, 504 correspond to a hardware-managed system of queues and arbiters that link the producer cores 506, 508 and the consumer cores 510, 512. In some examples, one or both of the DLB circuitry 502, 504 can be a PCI or PCI-E device in processor circuitry. For example, one or both of the DLB circuitry 502, 504 can be an accelerator (e.g., a hardware accelerator) included either in processor circuitry or in communication with the processor circuitry.

The DLB circuitry 502, 504 of the illustrated example includes example reorder logic circuitry 514, example queueing logic circuitry 516, and example arbitration logic circuitry 518. In this example, the reorder logic circuitry 514, the queueing logic circuitry 516, and/or the arbitration logic circuitry 518 can be implemented with hardware alone. In some examples, the reorder logic circuitry 514, the queueing logic circuitry 516, and/or the arbitration logic circuitry 518 can be implemented by hardware, software, firmware and/or any combination of hardware, software and/or firmware.

In example operation, the reorder logic circuitry 514 can obtain data from one or more of the producer cores 506, 508 and facilitate reordering operations based on the data. For example, the reorder logic circuitry 514 can inspect a data pointer from one of the producer cores 506, 508. In some examples, the data pointer can be associated with an object type of an HTTP request (or an HTTPS request, an HTTPA request, etc.). In some examples, the reorder logic circuitry 514 can determine that the data pointer is associated with a known data sequence. In some examples, the producer cores 506, 508 can enqueue the data pointer with the queueing logic circuitry 516 because the data pointer is not associated with a known data flow and may not be needed to be reordered and/or otherwise processed by the reorder logic circuitry 514.

In some examples, the reorder logic circuitry 514 can store the data pointer and other data pointers associated with data packets in the known data flow in a buffer (e.g., a ring buffer, a first-in first-out (FIFO) buffer, etc.) until a portion of or an entirety of the data pointers in connection with the known data flow are obtained and/or otherwise identified. The reorder logic circuitry 514 can transmit the data pointers to one or more of the queues controlled by the queueing logic circuitry 516 to maintain an order of the known data sequence. For example, the queues can store the data pointers as queue elements (QEs). In some examples, the queues of the queueing logic circuitry 516 can be implemented by and/or correspond to the queues 414, 416, 418 of FIG. 4.

The queueing logic circuitry 516 of the illustrated example implements a plurality of queues or buffers to store data pointers or other information. In some examples, the queueing logic circuitry 516 transmits data pointers in response to filling an entirety of the queue(s). In some examples, the queueing logic circuitry 516 transmits data pointers from one or more of the queues to the arbitration logic circuitry 518 on an asynchronous or synchronous basis.

In some examples, the arbitration logic circuitry 518 can be configured and/or instantiated to perform an arbitration by selecting a given one of the consumer cores 510, 512. For example, the arbitration logic circuitry 518 can include and/or implement one or more arbiters, sets of arbitration logic circuitry (e.g., first arbitration logic circuitry, second arbitration logic circuitry, etc.), etc. In some examples, respective ones of the one or more arbiters, the sets of arbitration logic circuitry, etc., can correspond to a respective one of the consumer cores 510, 512. In some examples, the arbitration logic circuitry 518 is based on consumer readiness (e.g., a consumer core having space available for an execution or completion of a task), task availability, etc. In example operation, the arbitration logic circuitry 518 can execute and/or carry out a passage of data pointers from the queueing logic circuitry 516 to example consumer queues 520. In some examples, the consumer queues 520 can be implemented by and/or correspond to the consumer queues 420, 422, 424 of FIG. 4.

In the illustrated example of FIG. 5, the consumer cores 510, 512 are in communication with the consumer queues 520 to obtain data pointers for subsequent processing. In some examples, a length (e.g., a data length) of one or more of the consumer queues 520 are programmable and/or otherwise configurable. In some examples, the DLB circuitry 502, 504 can generate an interrupt (e.g., a hardware interrupt) to one(s) of the consumer cores 510, 512 in response to a status, a change in status, etc., of the consumer queues 520. Responsive to the interrupt, the one(s) of the consumer cores 510, 512 can retrieve the data pointer(s) from the consumer queues 520.

In some examples, the DLB circuitry 502, 504 can check a status (e.g., a status of being full, not full, not empty, partially full, partially empty, etc.) of the consumer queues 520. In some examples, the DLB circuitry 502, 504 can track fullness of the consumer queues 520 by observing enqueues on an associated producer port (e.g., a hardware port) of the DLB circuitry 502, 504. For example, in response to each enqueuing, the DLB circuitry 502, 504 can determine that a corresponding one of the consumer cores 510, 512 has completed work on and/or associated with a QE and, thus, a location of the QE is now available in the queues controlled by the queueing logic circuitry 516. For example, a format of the QE can include a bit that is indicative whether a consumer queue token (or other indicia or datum), which can represent a location of the QE in the consumer queues 520, is being returned. In some examples, new enqueues that are not completions of prior dequeues do not return consumer queue tokens because there is no associated entry in the consumer queues 520.

Figure 6:
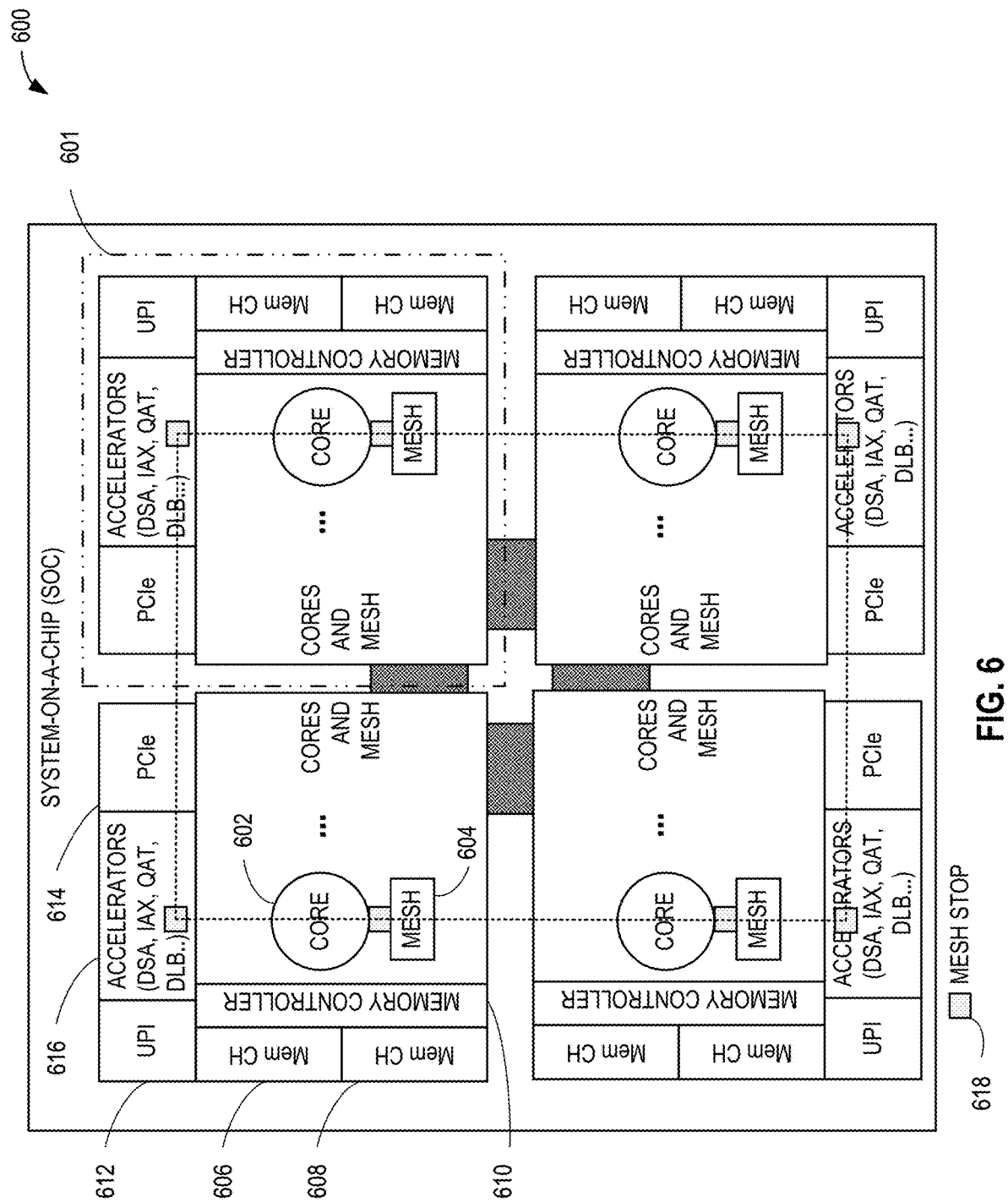
FIG. 6 is a block diagram of an example implementation of the DLB circuitry of FIG. 1.

FIG. 6 is a block diagram of a first example system-on-a-chip (SoC) 600. For example, the first SoC 600 can be processor circuitry implemented by a semiconductor package including a plurality of example semiconductor tiles (or dies) 601. In some examples, the first SoC 600 can implement and/or include the DLB circuitry 106 of FIGS. 1, 3, and/or 4 and/or the DLB circuitry 502, 504 of FIG. 5. The first SoC 600 includes a plurality of example cores 602, example mesh circuitry (e.g., mesh fabric circuitry) 604, example memory channels 606, 608, example memory controllers 610, Ultra Path Interconnects (UPIs) 612, example PCIe interconnects 614, example accelerators 616, and example mesh stops 618.

The accelerators 616 of the illustrated example can be implemented by one or more Data Streaming Accelerators (DSAs) (e.g., one or more DSAs provided by Intel® Corporation of Santa Clara, California), one or more Analytics Accelerators (e.g., one or more Intel Analytics Accelerators (IAX) provided by Intel® Corporation of Santa Clara, California), one or more QuickAssist Technology (QAT) accelerators (e.g., one or more QAT accelerators provided by Intel® Corporation of Santa Clara, California), one or more instances of a Dynamic Load Balancer provided by Intel® Corporation of Santa Clara, California, and/or one or more instances of Dynamic Load Balancer (DLB) circuitry, etc. In some examples, the accelerators 616 can be implemented by one or more instances of the DLB circuitry 106 of FIGS. 1, 3, and/or 4 and/or the DLB circuitry 502, 504 of FIG. 5. The DLB circuitry of the accelerators 616 can implement uncore accelerators because the DLB circuitry is in an uncore region of the first SoC 600. For example, the DLB circuitry of the accelerators 616 can be uncore accelerators because they are not in the cores 602. Advantageously, the cores 602 can offload scheduling tasks to the DLB circuitry of the accelerators 616 to increase the availability of the cores 602 for other high-value added application workload processing, such as retrieving media (e.g., multimedia, media portion(s) of the multimedia, etc.) from the Internet, executing machine-learning workloads, machine-vision tasks, etc.

Figure 7:
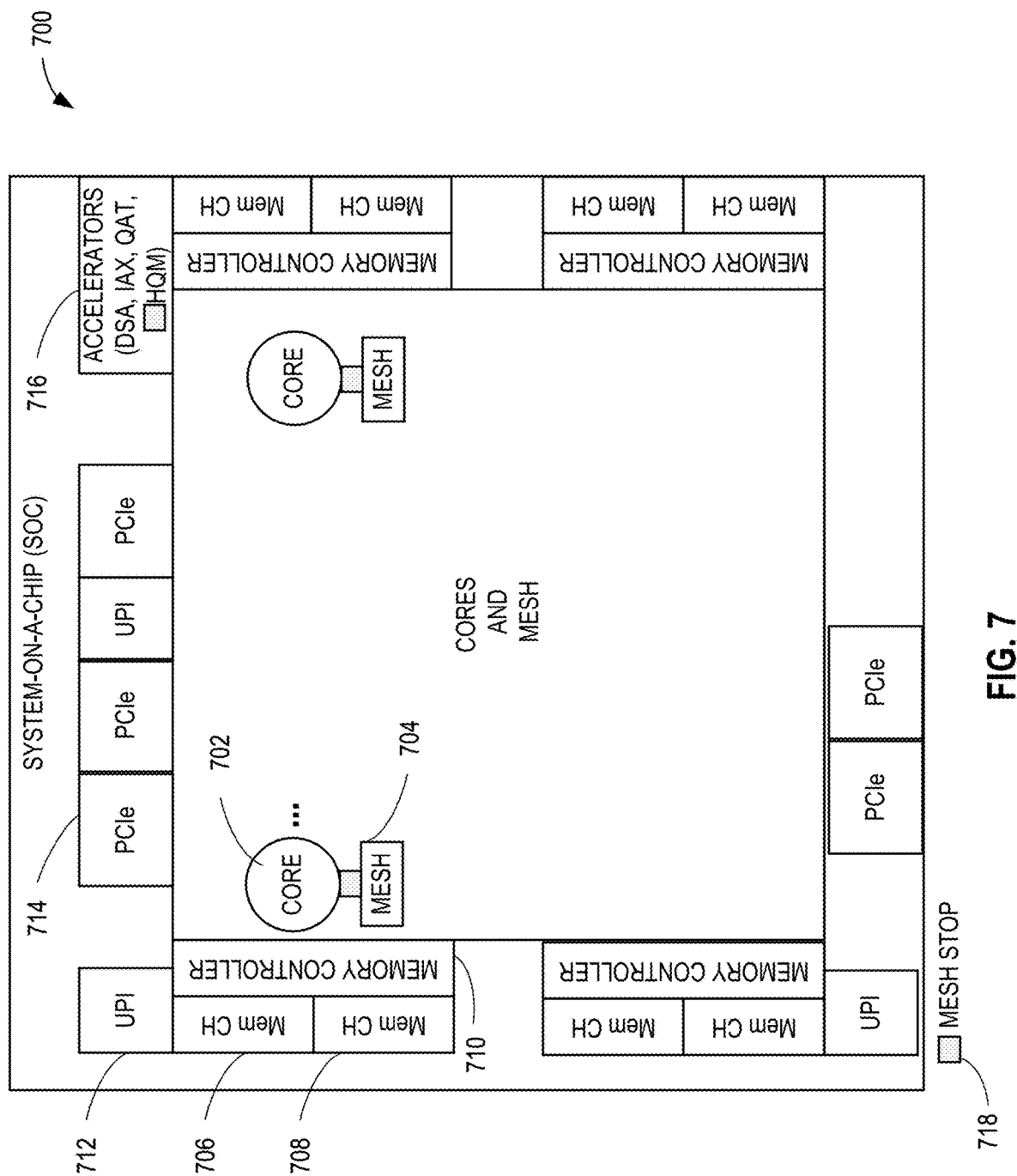
FIG. 7 is another block diagram of an example implementation of the DLB circuitry of FIG. 1.

FIG. 7 is a block diagram of a second example SoC 700. For example, the second SoC 700 can be processor circuitry implemented by a semiconductor package, which can be include and/or be implemented as a single semiconductor tile or die. Alternatively, the second SoC 700 may be implemented by more than one tile or die. In some examples, the second SoC 700 can include and/or implement the DLB circuitry 106 of FIGS. 1, 3, and/or 4 and/or the DLB circuitry 502, 504 of FIG. 5. The second SoC 700 includes a plurality of example cores 702, example mesh circuitry (e.g., mesh fabric circuitry) 704, example memory channels 706, 708, example memory controllers 710, example UPIs 712, example PCIe interconnects 714, example accelerators 716, and example mesh stops 718.

The accelerators 716 of the illustrated example can be implemented by one or more DSAs (e.g., one or more DSAs provided by Intel® Corporation of Santa Clara, California), one or more Analytics Accelerators (e.g., one or more IAX provided by Intel® Corporation of Santa Clara, California), one or more QAT accelerators (e.g., one or more QAT accelerators provided by Intel® Corporation of Santa Clara, California), one or more instances of a Dynamic Load Balancer provided by Intel® Corporation of Santa Clara, California, and/or one or more instances of DLB circuitry. The cores 702 of the illustrated example share the same one(s) of the accelerators 716 while one or more of the cores 602 of FIG. 6 access their own respective accelerators 616.

In some examples, the accelerators 716 can include and/or be implemented by one or more instances of the DLB circuitry 106 of FIGS. 1, 3, and/or 4 and/or the DLB circuitry 502, 504 of FIG. 5. The DLB circuitry of the accelerators 716 can implement uncore accelerators because the DLB circuitry is in an uncore region of the second SoC 700. For example, the DLB circuitry of the accelerators 716 can be uncore accelerators because they are not in the cores 702. Advantageously, the cores 702 can offload scheduling tasks to the DLB circuitry of the accelerators 716 to increase the availability of the cores 702 for other high-value added application workload processing, such as retrieving media (e.g., multimedia, media portion(s) of the multimedia, etc.) from the Internet, executing machine-learning workloads, machine-vision tasks, etc.

Figure 8:
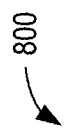
FIG. 8 depicts a table of example performance improvements of webserver request execution by utilizing the example request handler circuitry of FIGS. 1 and/or 2 and/or the example DLB circuitry of FIGS. 1, 6, and/or 7.

FIG. 8 depicts a table 800 of example performance improvements of webserver request execution by utilizing the request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, and/or the accelerators 716 of FIG. 7. The table 800 includes a first column 810, which including object types (such as video, audio, or text object types associated with HTTP requests). The table 800 includes a second column 820, which includes Time-to-First Byte (TTFB) values in milliseconds (ms). The table 800 includes a third column 830, which includes total latency values in ms. The table 800 includes a fourth column 840, which includes CPU utilization values measured in percentages (e.g., 100% is defined as fully utilized, 0% is defined as not utilized, etc.). The table 800 includes a fifth column 850, which includes and/or describes example performance improvements. In some examples, TTFB measures a time duration that begins when a web application (e.g., the web applications 126, 130, 134 of FIG. 1) makes an HTTP request and ends when the first byte is returned by a server and/or host. For example, TTFB can measure how quickly a web server responds to HTTP requests (or HTTPS requests, HTTPA requests, etc.).

Advantageously, processor circuitry (e.g., a CPU, an FPGA, a GPU, etc.), which includes DLB circuitry and/or accelerators as disclosed herein, demonstrates improved TTFB values (e.g., reductions in TTFB values), improved total latency values (e.g., reductions in total latency values), and improved CPU utilization (e.g., reductions in CPU utilization percentages) based on the measurements of the table 800 with respect to processor circuitry that does not include DLB circuitry as described herein.

Figure 9:
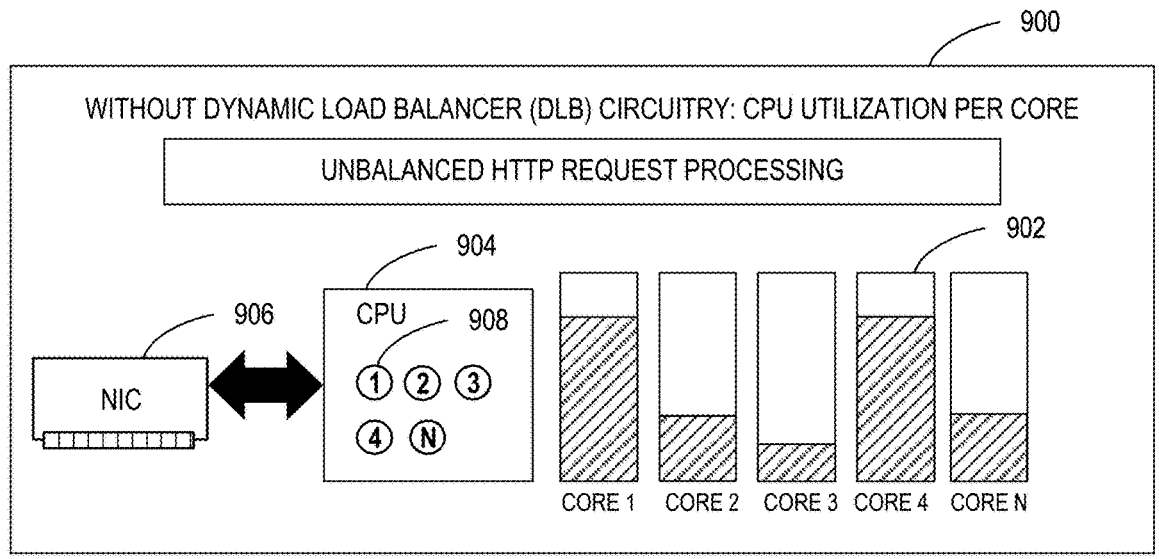
FIG. 9 is an illustration of first example processor core utilizations in first example processor circuitry.

FIG. 9 is an illustration 900 of first example processor core utilizations 902 in first example processor circuitry 904, which is implemented by a CPU that does not include DLB circuitry as disclosed herein. The first processor circuitry 904 is in communication with and/or coupled to an example NIC 906. In this example, the first processor circuitry 904 does not include a DLB, such as the DLB circuitry 106 of FIGS. 1, 3, and/or 4, the DLB circuitry 502, 504 of FIG. 5, the accelerators 616 of FIG. 6, and/or the accelerators 716 of FIG. 7. In this example, utilizations of cores 908 of the first processor circuitry 904 are not balanced (e.g., not substantially evenly distributed) due to the lack of dynamic and scalable load balancing in the first processor circuitry 904.

For example, the first processor circuitry 904 may statically assign data to the cores 908 to process. In some examples, the utilizations of the cores 908 become unbalanced because the first processor circuitry 904 does not assign data to the cores 908 based on the utilizations of the cores 908. In some examples, the utilizations of the cores 908 become unbalanced because the first processor circuitry 904 does not assign data to the cores 908 using hardware-implemented queues as disclosed herein, which assign tasks to cores with reduced latency.

Figure 10:
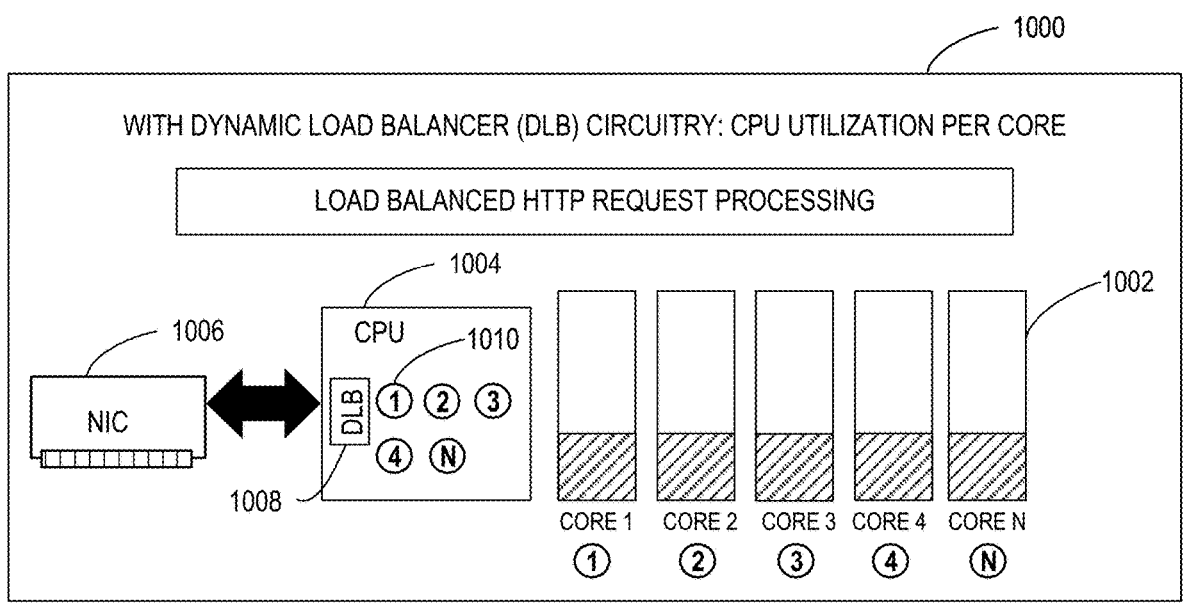
FIG. 10 is an illustration of second example processor core utilizations in second example processor circuitry including the example DLB circuitry of FIGS. 1, 6, and/or 7.

FIG. 10 is an illustration 1000 of second example processing core utilizations 1002 for second example processor circuitry 1004, which is implemented by a CPU in accordance with teachings of this disclosure. In some examples, the second processor circuitry 1004 can be implemented by the first processor circuitry 108, the second processor circuitry 110, and/or the third processor circuitry 112 of FIG. 1, the processor circuitry 304 of FIG. 3, the processor circuitry 402 of FIG. 4, the webserver request processing system 500 of FIG. 5, the first SoC 600 of FIG. 6, and/or the second SoC 700 of FIG. 7. The second processor circuitry 1004 is in communication with and/or coupled to an example NIC 1006. In contrast with the first processor circuitry 904 of FIG. 9, in the example of FIG. 10, the second processor circuitry 1004 includes example DLB circuitry 1008. In some examples, the DLB circuitry 1008 can be implemented by and/or correspond to the DLB circuitry 106 of FIGS. 1, 3, and/or 4, the DLB circuitry 502, 504 of FIG. 5, the accelerators 616 of FIG. 6, and/or the accelerators 716 of FIG. 7.

Advantageously, by utilizing the DLB circuitry 1008 to effectuate and/or carry out the processing of HTTP requests, utilizations of example cores 1010 of the second processor circuitry 1004 are substantially balanced. For example, each of the cores 1010 can be substantially balanced by being within a specified or defined tolerance (e.g., a tolerance or tolerance range of less than 1% utilization, a tolerance or tolerance range of 1-3% utilization, etc.) or threshold utilization value (e.g., a threshold utilization value of being less than 1% different in utilization than other core(s), a threshold utilization value of being within a range of 1-2% different in utilization than other core(s), etc.) of one or more of the other cores 1010. In some examples, each of the cores 1010 can be substantially balanced by having the approximately same utilization within a tolerance or tolerance range (e.g., a tolerance in a range of +/−1%, +/−2%, etc.). For example, the utilizations of the cores 1010 become balanced in response to the DLB circuitry 1008 dynamically assigning data to the cores 1010 based on at least one of the utilizations of the cores 1010 or an object type associated with the HTTP requests.

Figure 11:
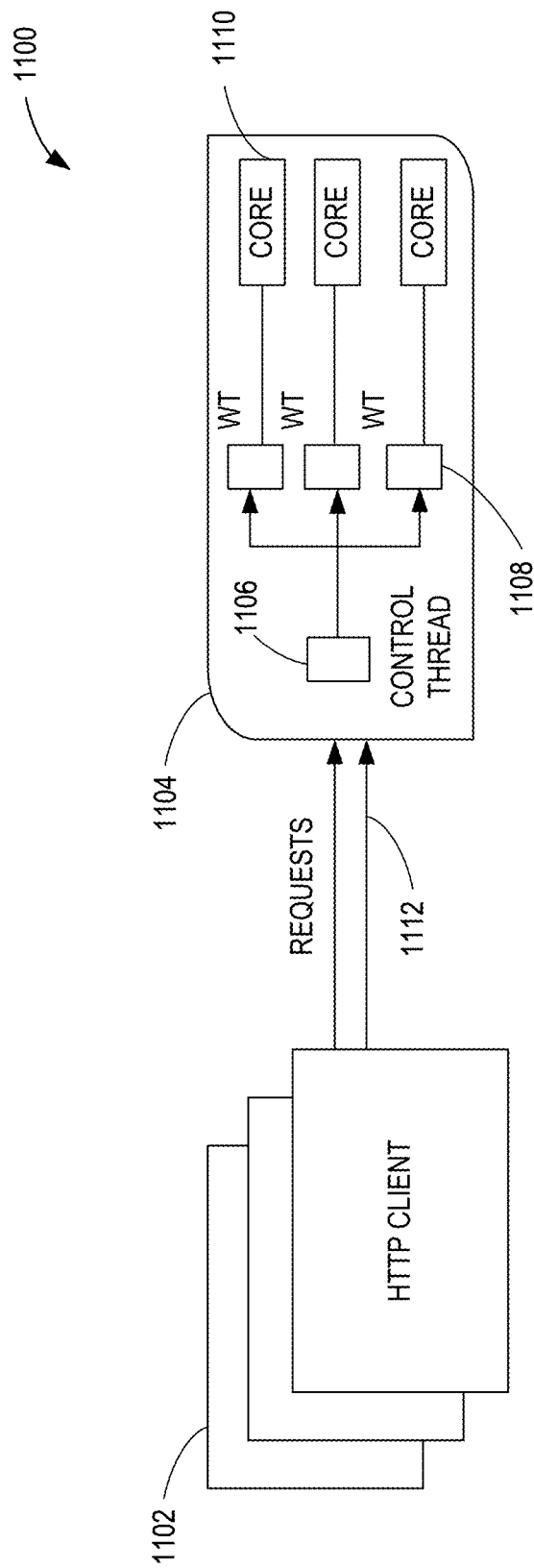
FIG. 11 is a block diagram of example processor circuitry facilitating example webserver requests.

FIG. 11 is a block diagram of a fourth example webserver request processing system 1100 including example HTTP clients 1102 and example processor circuitry 1104. The processor circuitry 1104 includes an example control thread 1106, example worker threads 1108 (identified by WT), and example cores 1110. The processor circuitry 1104 of the illustrated example does not include the DLB circuitry 106 of FIGS. 1, 3, and/or 4, the DLB circuitry 502, 504 of FIG. 5, the accelerators 616 of FIG. 6, and/or the accelerators 716 of FIG. 7.

In example operation, the processor circuitry 1104 receives example HTTP requests 1112. The control thread 1106 dispatches an entirety of a received one of the HTTP requests 1112 to one of the cores 1110. For example, the one of the cores 1110 can process the received one of the HTTP requests 1112, which can include a video object, an audio object, and a text object. In some examples, the one of the cores 1110 can have decreased and/or reduced performance because an entirety of an object, such as the video object, may need to be processed before another object by the one of the cores 1110 can begin and thereby stalling the processing pipeline. In some examples, the one of the cores 1110 may be overutilized while the other ones of the cores 1110 may be underutilized or not utilized at all. In some examples, the processor circuitry 1104 can have reduced throughput, reduced performance, and increased latency compared to other example processor circuitry disclosed herein that include DLB circuitry as disclosed herein.

Figure 12:
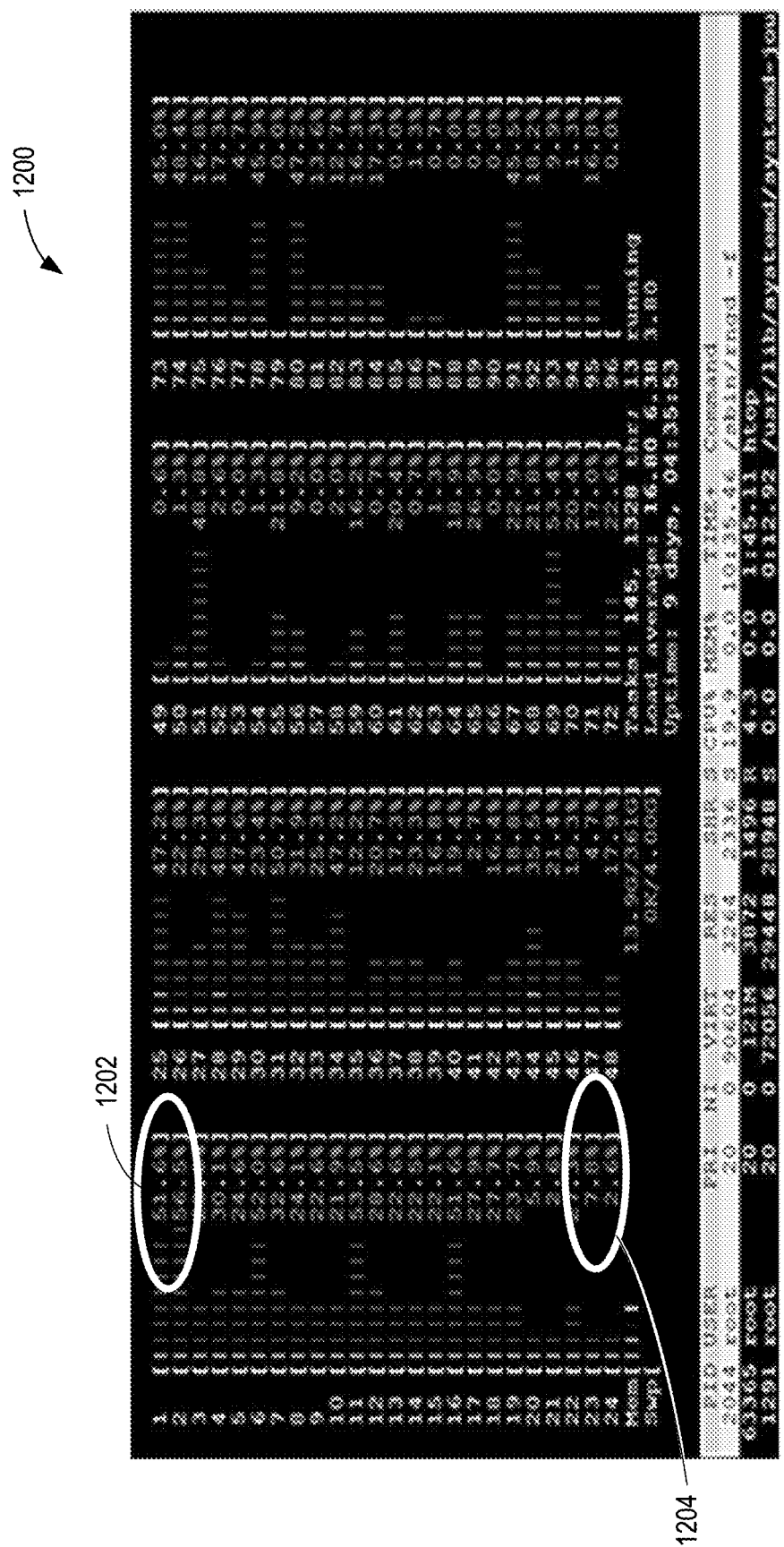
FIG. 12 is an illustration of third example processor core utilizations corresponding to example operation of the example processor circuitry of FIG. 11.

FIG. 12 is an illustration 1200 of third example processor utilizations corresponding to example operation of the example processor circuitry 1104 of FIG. 11, which does not include DLB circuitry as disclosed herein. The third processor utilizations depict example utilization measured in percentages (e.g., 100% is fully utilized, 0% is not utilized, etc.) for 96 cores (e.g., 96 cores of the processor circuitry 1104). In this example, a first core (identified by "1", such as core 1) has a first example utilization 1202 of 51.6% while a second core (identified by "24", such as core 24) has a second example utilization 1204 of 2.6%. In some examples, the first core may be overutilized with respect to the second core because an entirety of an HTTP request object, such as a video object of an HTTP request, may need to be processed by the first core before another HTTP request object by the first core can begin. In some examples, the first core is overutilized while the second core is underutilized with respect to the first core, which is representative of the first core and the second core being unbalanced. As demonstrated by the illustrated example of FIG. 12, the processor circuitry 1104 of FIG. 11 may have reduced throughput, reduced performance, and increased latency compared to other example processor circuitry disclosed herein that include DLB circuitry as disclosed herein.

Figure 13:
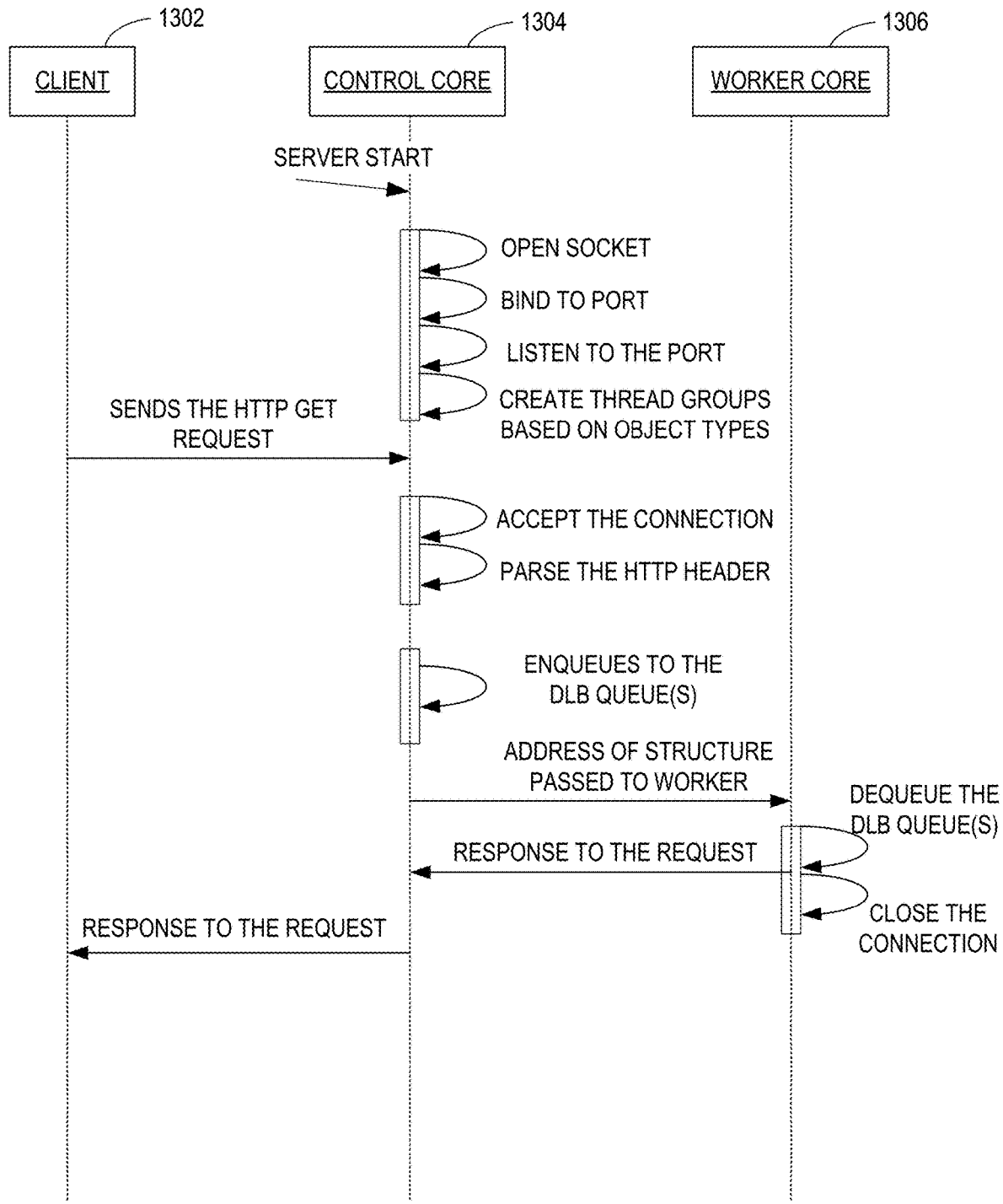
FIG. 13 is a first data flow diagram corresponding to example operation of the example request handler circuitry of FIGS. 1 and/or 2 and/or the example DLB circuitry of FIGS. 1, 6, and/or 7.

FIG. 13 is a data flow diagram representative of example machine-readable instructions and/or example operations 1300 that may be executed and/or instantiated by processor circuitry to execute a webserver request for media (e.g., Internet content including audio, video, and/or text data, multimedia, etc.). The example machine-readable instructions and/or the example operations 1300 of FIG. 13 may be executed and/or instantiated by an example client 1302, an example control core 1304, and an example worker core 1306.

In some examples, the client 1302 can be implemented by one(s) of the web applications 126, 130, 134 of FIG. 1, and/or, more generally, the client devices 124, 128, 132 of FIG. 1. In some examples, the control core 1304 can be implemented by a first core of the first processor circuitry 108, the second processor circuitry 110, and/or the third processor circuitry 112 of FIG. 1. In some examples, the control core 1304 can implement the control thread 306 of FIG. 3 and/or the control thread 406 of FIG. 4. In some examples, the control core 1304 can be implemented by a first one of the producer cores 506, 508 of FIG. 5. In some examples, the control core 1304 can be implemented by a first one of the cores 602 of FIG. 6, a first one of the cores 702 of FIG. 7, and/or a first one of the cores 1010 of FIG. 10.

In some examples, the worker core 1306 can be implemented by a second core of the first processor circuitry 108, the second processor circuitry 110, and/or the third processor circuitry 112 of FIG. 1. In some examples, the worker core 1306 can implement the first worker thread 308, the second worker thread 310, and/or the third worker thread 312 of FIG. 3. In some examples, the worker core 1306 can be implemented by a second one of the producer cores 506, 508 of FIG. 5. In some examples, the worker core 1306 can be implemented by a second one of the cores 602 of FIG. 6, a second one of the cores 702 of FIG. 7, and/or one a second of the cores 1010 of FIG. 10.

In example operation, the control core 1304 can be initialized to operate as a server (e.g., a webserver) to effectuate webserver requests for the media 120 of FIG. 1. For example, the interface circuitry 210 (FIG. 2) can be initialized to operate as a server to execute the media requests 272 (FIG. 2). The control core 1304 can open a socket of the control core 1304; bind a port (e.g., a producer port, an interface port, etc.) to the opened socket; and listen to the port. For example, the interface circuitry 210 can open a socket; bind a port to the opened socket; and listen to the port. The control core 1304 can create thread groups based on object types (e.g., an audio, video, or text object type). For example, the object parser circuitry 220 (FIG. 2) can create, generate, and/or instantiate a first thread (e.g., a first worker thread) to handle an audio object type, a second thread (e.g., a second worker thread) to handle a video object type, and/or a third thread (e.g., a third worker thread) to handle a text object type of an incoming request.

In example operation, the client 1302 can send an HTTP GET request to the control core 1304. For example, the interface circuitry 210 can receive an HTTP GET request from one of the client devices 124, 128, 132. The control core 1304 can accept the connection and parse an HTTP header of the HTTP GET request. For example, the object parser circuitry 220 can parse the HTTP GET request into at least one of an audio object, a video object, or a text object.

The control core 1304 can enqueue a pointer, which can reference data of an object type stored in memory, to DLB circuitry included in the control core 1304. For example, the priority determination circuitry 240 (FIG. 2) can enqueue a first data pointer that references data associated with an audio object to the DLB circuitry 106 of FIG. 1 of the first processor circuitry 108.

The control core 1304 can pass an address of a structure (e.g., an object data type) to the worker core 1306. For example, the priority determination circuitry 240 can pass a memory address that references the audio object stored in memory to a core of the first processor circuitry 108 that is available to accept a new workload.

The worker core 1306 can dequeue the DLB circuitry by providing a response to the control core 1304 that the DLB circuitry has been dequeued and that the connection between the DLB circuitry and the worker core 1306 is to be closed. For example, the core of the first processor circuitry 108 can write a bit into a queue element and store the queue element into the DLB circuitry 106. The DLB circuitry 106 can determine that the memory address (or data or other indicia corresponding to the memory address) has been dequeued to the core of the first processor circuitry 108 to execute a corresponding HTTP workload.

The worker core 1306 can execute webserver operation(s) associated with the HTTP GET request. For example, the worker core 1306 can retrieve a portion of the media 120 that corresponds to the object type enqueued and dequeued from the DLB circuitry. The worker core 1306 can provide a response, which can include the portion of the media 120, to the request to the control core 1304. For example, the response generation circuitry 260 (FIG. 2) can compile audio, video, and/or text objects into one or more HTTP packets for transmission to the requesting client device (or a different client device). The control core 1304 can provide the response to the request to the client 1302 to complete execution of the HTTP GET request. For example, the interface circuitry 210 can cause transmission of the one or more HTTP packets to the requesting one of the client devices 124, 128, 132. For example, the requesting one of the client devices 124, 128, 132 can access and/or present media associated with the HTTP GET request with increased throughput, increased bandwidth, and/or reduced latency when compared to executing the HTTP GET request without the DLB circuitry 106 as disclosed herein.

Figure 14:
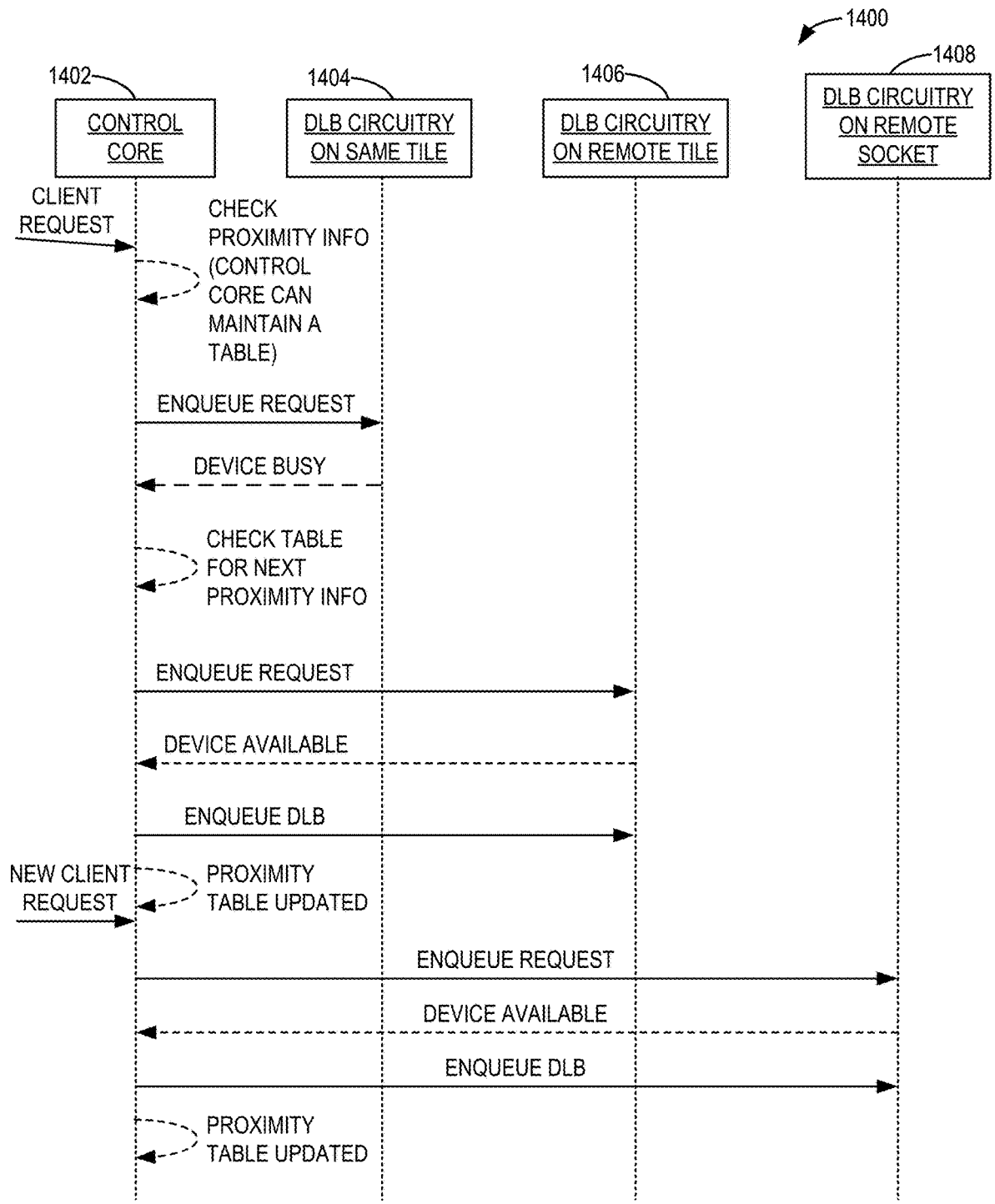
FIG. 14 is a second data flow diagram corresponding to example operation of the example request handler circuitry of FIGS. 1 and/or 2 and/or the example DLB circuitry of FIGS. 1, 6, and/or 7.

FIG. 14 is a data flow diagram representative of example machine-readable instructions and/or example operations 1400 that may be executed and/or instantiated by processor circuitry to execute a webserver request for media (e.g., Internet content including audio, video, and/or text data, multimedia, etc.). The example machine-readable instructions and/or the example operations 1400 of FIG. 14 may be executed and/or instantiated by an example control core 1402, first example DLB circuitry 1404, second example DLB circuitry 1406, and third example DLB circuitry 1408. In this example, the first DLB circuitry 1404 is on the same tile and socket as the control core 1402. In this example, the second DLB circuitry 1406 is on a remote or different tile than the control core 1402, but is on the same socket. In this example, the third DLB circuitry 1408 is on a remote socket or different socket than the control core 1402.

In some examples, the control core 1402 can be implemented by a first core of the first processor circuitry 108, the second processor circuitry 110, and/or the third processor circuitry 112 of FIG. 1. In some examples, the control core 1402 can implement the control thread 306 of FIG. 3 and/or the control thread 406 of FIG. 4. In some examples, the control core 1402 can be implemented by a first one of the producer cores 506, 508. In some examples, the control core 1704 can be implemented by a first one of the cores 602 of FIG. 6, a first one of the cores 702 of FIG. 7, and/or a first one of the cores 1010 of FIG. 10.

In some examples, the first DLB circuitry 1404, the second DLB circuitry 1406, and/or the third DLB circuitry 1408 can be implemented by the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10. In some examples, the first DLB circuitry 1404 can be implemented by the accelerators 616 of FIG. 6 on a first one of the tiles 601, the second DLB circuitry 1406 may be implemented by the accelerators 616 on a second one of the tiles 601, and the third DLB circuitry 1408 can be implemented by the accelerators 616 on a different one of the first SoC 600 of FIG. 6.

In example operation, the control core 1402 can receive a request from a client (e.g., one of the client devices 124, 128, 132 of FIG. 1). The control core 1402 can check proximity information representative of the proximity of the first through third DLB circuitry 1404, 1406, 1408 with respect to the control core 1402. For example, the control core 1402 can identify, based on a look-up table maintained by the control core 1402, that the first DLB circuitry 1404 is closest in proximity to the control core 1402 because the first DLB circuitry 1404 is on the same tile as the control core 1402. In some examples, the look-up table can be stored in the datastore 270 (FIG. 2) as the proximity data 278 (FIG. 2). For example, the load balancer selection circuitry 250 (FIG. 2) can identify the first DLB circuitry 1404 as closest in proximity to the control core 1402 based on the proximity data 278.

In some examples, the control core 1402 can identify, based on the look-up table maintained by the control core 1402, that the second DLB circuitry 1406 is next closest in proximity to the control core 1402 after the first DLB circuitry 1404 because the second DLB circuitry 1406 is on a different tile than the control core 1402. For example, the load balancer selection circuitry 250 can determine that the second DLB circuitry 1406 is next closest in proximity to the control core 1402 based on the proximity data 278.

In some examples, the control core 1402 can identify, based on the look-up table maintained by the control core 1402, that the third DLB circuitry 1408 is next closest in proximity to the control core 1402 after the first DLB circuitry 1404 and the second DLB circuitry 1406 because the third DLB circuitry 1408 is on a different socket than the control core 1402. For example, the load balancer selection circuitry 250 can determine that the third DLB circuitry 1408 is next closest in proximity to the control core 1402 based on the proximity data 278. Additionally or alternatively, the control core 1402 may store the proximity information in any other format other than a look-up table.

In response to determining that the first DLB circuitry 1404 is closest in proximity to the control core 1402, the control core 1402 can enqueue the client request (e.g., an HTTP GET request) to the first DLB circuitry 1404. For example, the priority determination circuitry 240 (FIG. 2) can enqueue the client request, or portion(s), thereof, to the first DLB circuitry 1404. Advantageously, in some examples, the first DLB circuitry 1404 can process the client request with reduced latency compared to the second DLB circuitry 1406 and the third DLB circuitry 1408 due to the spatial closeness of the first DLB circuitry 1404 to the control core 1402.

In response to the enqueue request, the control core 1402 can determine that the first DLB circuitry 1404 is busy and/or otherwise is unavailable to enqueue the request because the first DLB circuitry 1404 (or associated worker core(s)) is processing other requests. For example, the load balancer selection circuitry 250 can obtain telemetry data associated with the first DLB circuitry 1404 that is indicative of the first DLB circuitry 1404 being utilized. In some examples, the load balancer selection circuitry 250 can query the first DLB circuitry 1404 for its availability and not receive a response from the first DLB circuitry 1404, which can indicate that the first DLB circuitry 1404 is unavailable for a new workload. In some examples, the load balancer selection circuitry 250 can query the first DLB circuitry 1404 for its availability and receive a response from the first DLB circuitry 1404 indicative of its unavailability for a new workload. After a determination that the first DLB circuitry 1404 is busy and/or otherwise unavailable, the control core 1402 can check the proximity information for the next closest DLB circuitry, which, in this example, is the second DLB circuitry 1406. The control core 1402 can enqueue the request to the second DLB circuitry 1406 based on the proximity information determination.

In response to the enqueue request, the control core 1402 can determine that the second DLB circuitry 1406 is available to enqueue the request. Based on a determination that the second DLB circuitry 1406 is available, the control core 1402 can update the proximity information. For example, the load balancer selection circuitry 250 can update a ranking, an ordering, a listing, etc., of the DLB circuitry 1404, 1406, 1408 in the proximity data 278 based on a first determination that the first DLB circuitry 1404 is unavailable and/or a second determination that the second DLB circuitry 1406 is available. In response to a new client request, the control core 1402 can enqueue the new client request to the third DLB circuitry 1408 based on the proximity information determination. For example, the control core 1402 can determine that the first DLB circuitry 1404 is busy based on the previously failed enqueue request and that the second DLB circuitry 1406 is busy based on the second DLB circuitry 1406 accepting the enqueue request.

In response to the enqueue request, the control core 1402 can determine that the third DLB circuitry 1408 is available to enqueue the new client request. After a determination that the third DLB circuitry 1408 is available, the control core 1402 can update the proximity information (e.g., the proximity data 278). In some examples, the control core 1402 can periodically update the proximity information. For example, the control core 1402 can reset the proximity information after one or more clock cycles of the control core 1402 have occurred. In some examples, the control core 1402 can update the proximity information in response to successful enqueue requests and/or failed enqueue requests. Additionally or alternatively, the control core 1402 can update the proximity information in any other manner or based on any other technique (e.g., a round-robin selection technique, a random selection technique, etc.).

Figure 15:
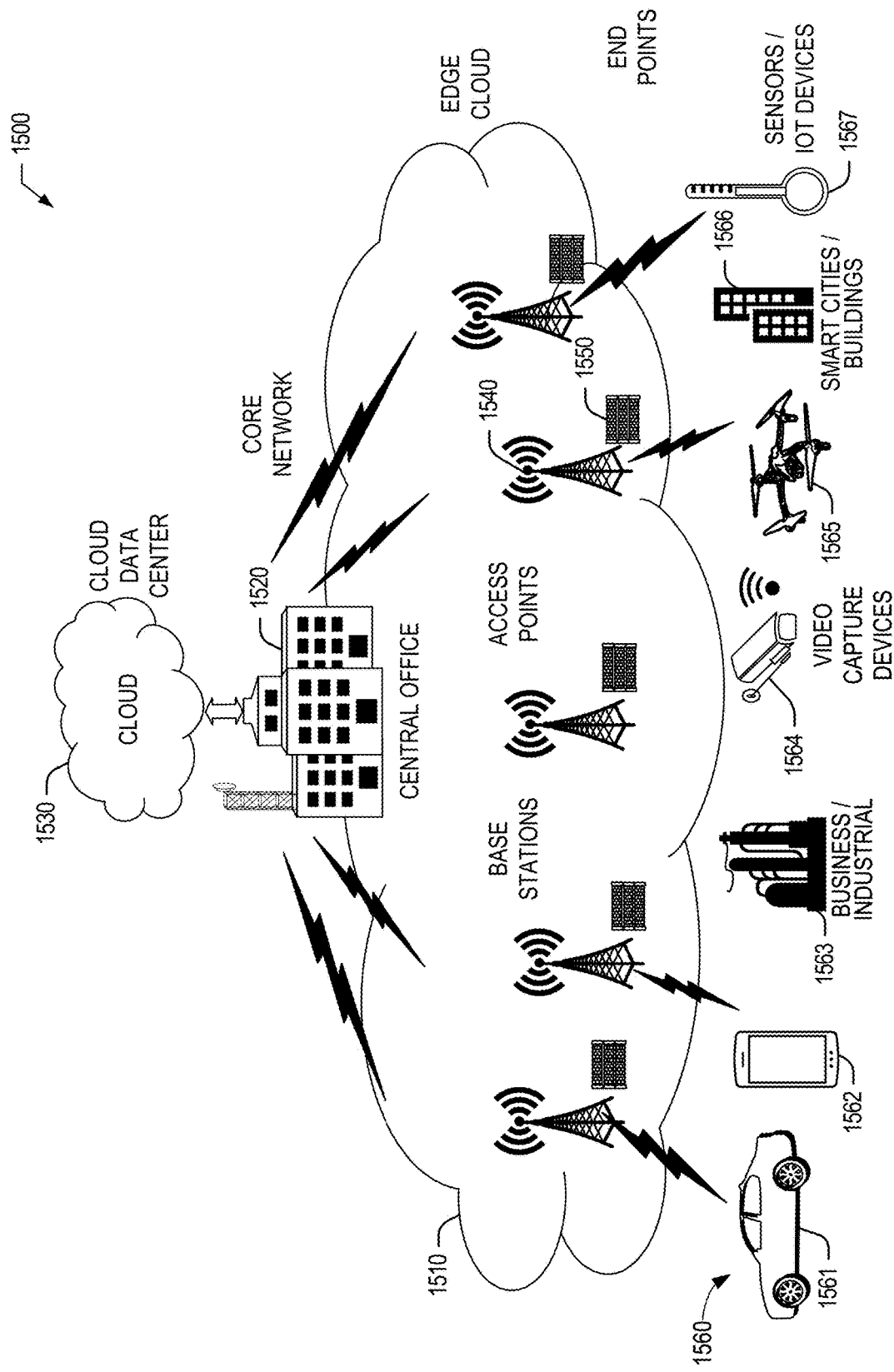
FIG. 15 illustrates an overview of an example edge cloud configuration for edge computing that may implement the examples disclosed herein.

FIG. 15 is a block diagram 1500 showing an overview of a configuration for edge computing, which includes a layer of processing referred to in many of the following examples as an "edge cloud". As shown, the edge cloud 1510 is co-located at an edge location, such as an access point or base station 1540, a local processing hub 1550, or a central office 1520, and thus may include multiple entities, devices, and equipment instances. The edge cloud 1510 is located much closer to the endpoint (consumer and producer) data sources 1560 (e.g., autonomous vehicles 1561, user equipment 1562, business and industrial equipment 1563, video capture devices 1564, drones 1565, smart cities and building devices 1566, sensors and Internet-of-Things (IoT) devices 1567, etc.) than the cloud data center 1530. Compute, memory, and storage resources that are offered at the edges in the edge cloud 1510 are critical to providing ultra-low latency response times for services and functions used by the endpoint data sources 1560 as well as reduce network backhaul traffic from the edge cloud 1510 toward cloud data center 1530 thus improving energy consumption and overall network usages among other benefits.

In some examples, the edge cloud 1510 may include one or more satellite vehicles (e.g., one or more satellite vehicles in a low-earth orbit constellation) as described herein. In some such examples, the one or more satellite vehicles may implement an HTTP client that generates HTTP requests for data (e.g., media or any other data) as described herein. In some such examples, the one or more satellite vehicles may generate data packets, data messages, etc., that include payloads that implement the HTTP requests. For example, the payloads may include requests for data (e.g., video, audio, and/or text such as cleartext). In some examples, the payloads may include the data (e.g., video, audio, and/or text such as cleartext).

In some examples, the central office 1520, the cloud data center 1530, and/or portion(s) thereof, may implement one or more webservers that process HTTP requests. For example, the central office 1520, the cloud data center 1530, and/or portion(s) thereof, may receive HTTP requests from the endpoint (consumer and producer) data sources 1560 (e.g., autonomous vehicles 1561, user equipment 1562, business and industrial equipment 1563, video capture devices 1564, drones 1565, smart cities and building devices 1566, sensors and Internet-of-Things (IoT) devices 1567, etc.). In some such examples, the central office 1520, the cloud data center 1530, and/or portion(s) thereof, may process HTTP requests with improved performance and throughput and reduced latency by implementing queue management in hardware.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 15, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 1510, which provide coordination from client and distributed computing devices.

Figure 16:
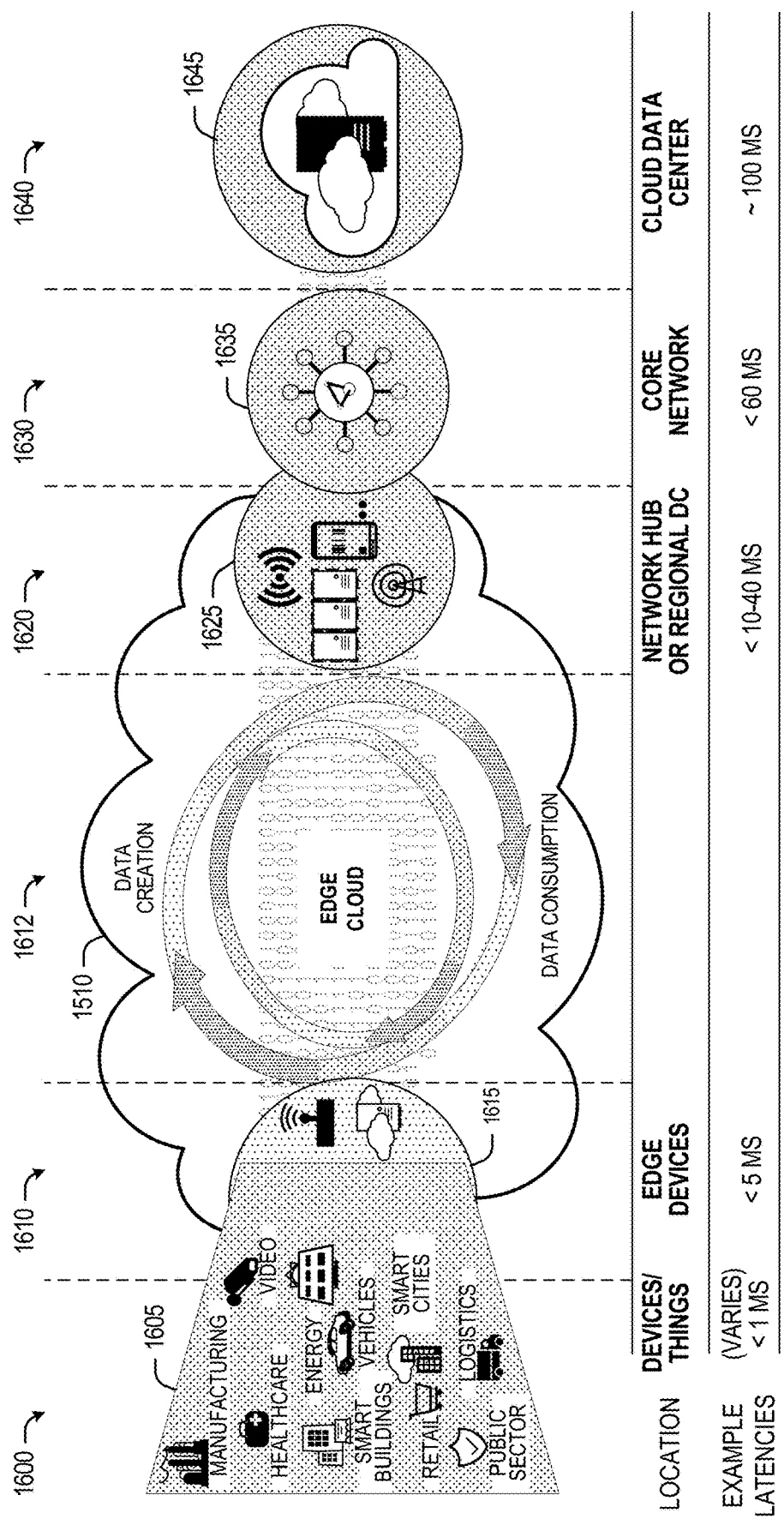
FIG. 16 illustrates operational layers among example endpoints, an example edge cloud, and example cloud computing environments that may implement the examples disclosed herein.

FIG. 16 illustrates operational layers among endpoints, an edge cloud, and cloud computing environments. Specifically, FIG. 16 depicts examples of computational use cases 1605, utilizing the edge cloud 1510 of FIG. 15 among multiple illustrative layers of network computing. The layers begin at an endpoint (devices and things) layer 1600, which accesses the edge cloud 1510 to conduct data creation, analysis, and data consumption activities. The edge cloud 1510 may span multiple network layers, such as an edge devices layer 1610 having gateways, on-premise servers, or network equipment (nodes 1615) located in physically proximate edge systems; a network access layer 1620, encompassing base stations, radio processing units, network hubs, regional data centers (DC), or local network equipment (equipment 1625); and any equipment, devices, or nodes located therebetween (in layer 1612, not illustrated in detail). The network communications within the edge cloud 1510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1600, under 5 ms at the edge devices layer 1610, to even between 10 to 40 ms when communicating with nodes at the network access layer 1620. Beyond the edge cloud 1510 are core network 1630 and cloud data center 1632 layers, each with increasing latency (e.g., between 50-60 ms at the core network layer 1630, to 100 or more ms at the cloud data center layer 1640). As a result, operations at a core network data center 1635 or a cloud data center 1645, with latencies of at least 50 to 100 ms or more, will not be able to accomplish many time-critical functions of the use cases 1605. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1635 or a cloud data center 1645, a central office or content data network may be considered as being located within a "near edge" layer ("near" to the cloud, having high latency values when communicating with the devices and endpoints of the use cases 1605), whereas an access point, base station, on-premise server, or network gateway may be considered as located within a "far edge" layer ("far" from the cloud, having low latency values when communicating with the devices and endpoints of the use cases 1605). It will be understood that other categorizations of a particular network layer as constituting a "close", "local", "near", "middle", or "far" edge may be based on latency, distance, number of network hops, or other measurable characteristics, as measured from a source in any of the network layers 1600-1640.

The various use cases 1605 may access resources under usage pressure from incoming streams, due to multiple services utilizing the edge cloud. To achieve results with low latency, the services executed within the edge cloud 1510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1510 may provide the ability to serve and respond to multiple applications of the use cases 1605 (e.g., object tracking, video surveillance, connected cars, etc.) in real-time or near real-time, and meet ultra-low latency requirements for these multiple applications. These advantages enable a whole new class of applications (VNFs), FaaS, Edge-as-a-Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1510 (network layers 1610-1630), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1510.

As such, the edge cloud 1510 is formed from network components and functional features operated by and within edge gateway nodes, edge aggregation nodes, or other edge compute nodes among network layers 1610-1630. The edge cloud 1510 thus may be embodied as any type of network that provides edge computing and/or storage resources which are proximately located to RAN capable endpoint devices (e.g., mobile computing devices, IoT devices, smart devices, etc.), which are discussed herein. In other words, the edge cloud 1510 may be envisioned as an "edge" which connects the endpoint devices and traditional network access points that serve as an ingress point into service provider core networks, including terrestrial mobile carrier networks (e.g., Global System for Mobile Communications (GSM) networks, 4G Long-Term Evolution (LTE) networks, 5G/6G networks, etc.), as well as non-terrestrial networks and constellations (e.g., low earth orbit (LEO), medium earth orbit (MEO) or intermediate circular orbit (ICO), or very low earth orbit (VLEO) satellites) while also providing storage and/or compute capabilities. Other types and forms of network access (e.g., satellite, Wi-Fi, long-range wireless, wired networks including optical networks, etc.) terrestrial and non-terrestrial may also be utilized in place of or in combination with such 3GPP carrier networks.

The network components of the edge cloud 1510 may be servers, multi-tenant servers, appliance computing devices, and/or any other type of computing devices. For example, the edge cloud 1510 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 23, 24, and/or 25 illustrate example hardware for implementing an appliance computing device. The edge cloud 1510 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 17:
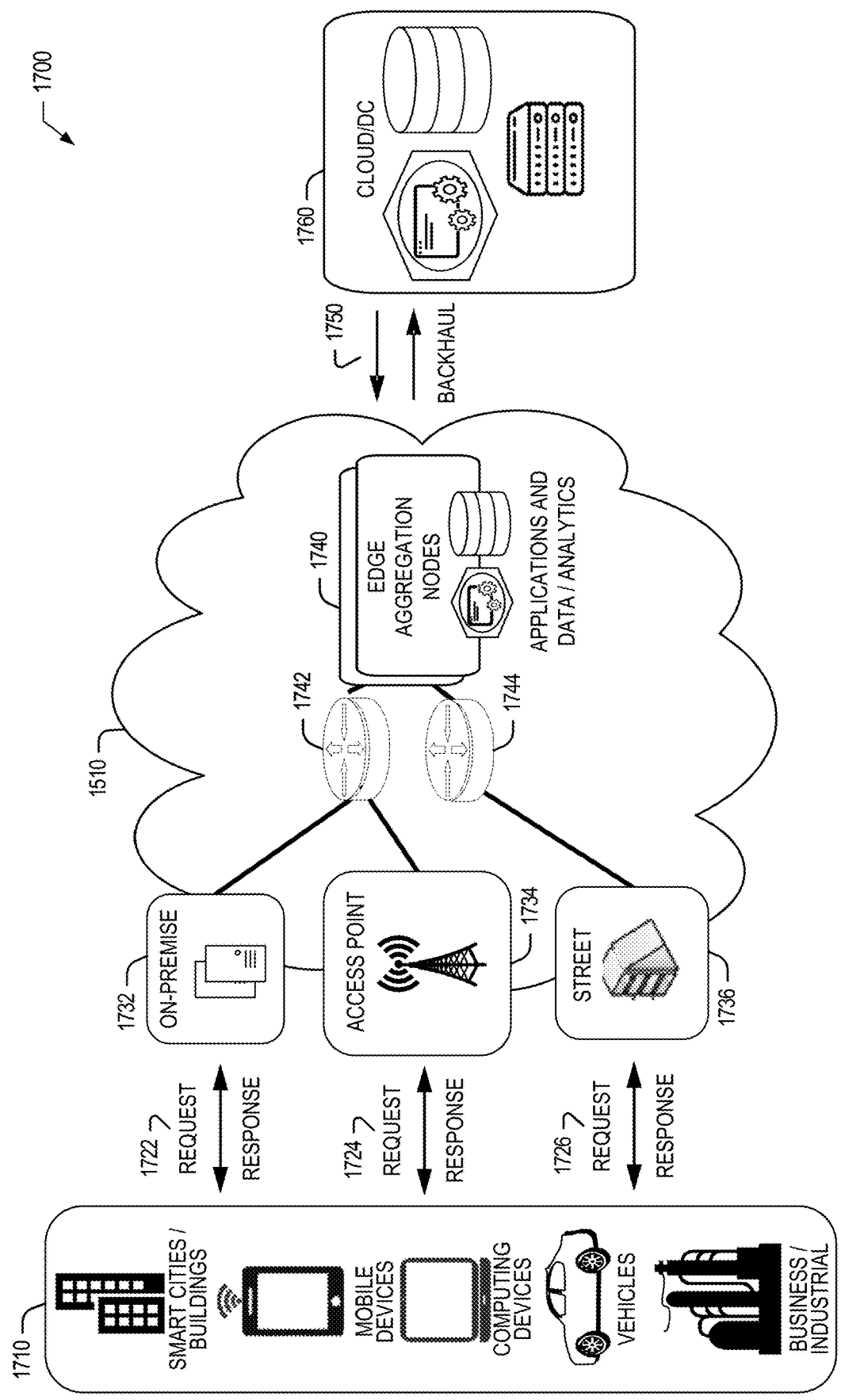
FIG. 17 illustrates an example approach for networking and services in an edge computing system that may implement the examples disclosed herein.

In FIG. 17, various client endpoints 1710 (in the form of mobile devices, computers, autonomous vehicles, business computing equipment, industrial processing equipment) exchange requests and responses that are specific to the type of endpoint network aggregation. For instance, client endpoints 1710 may obtain network access via a wired broadband network, by exchanging requests and responses 1722 through an on-premise network system 1732. Some client endpoints 1710, such as mobile computing devices, may obtain network access via a wireless broadband network, by exchanging requests and responses 1724 through an access point (e.g., cellular network tower) 1734. Some client endpoints 1710, such as autonomous vehicles may obtain network access for requests and responses 1726 via a wireless vehicular network through a street-located network system 1736. However, regardless of the type of network access, the TSP may deploy aggregation points 1742, 1744 within the edge cloud 1510 of FIG. 15 to aggregate traffic and requests. Thus, within the edge cloud 1510, the TSP may deploy various compute and storage resources, such as at edge aggregation nodes 1740, to provide requested content. The edge aggregation nodes 1740 and other systems of the edge cloud 1510 are connected to a cloud or data center (DC) 1760, which uses a backhaul network 1750 to fulfill higher-latency requests from a cloud/data center for websites, applications, database servers, etc. Additional or consolidated instances of the edge aggregation nodes 1740 and the aggregation points 1742, 1744, including those deployed on a single server framework, may also be present within the edge cloud 1510 or other areas of the TSP infrastructure.

Figure 18:
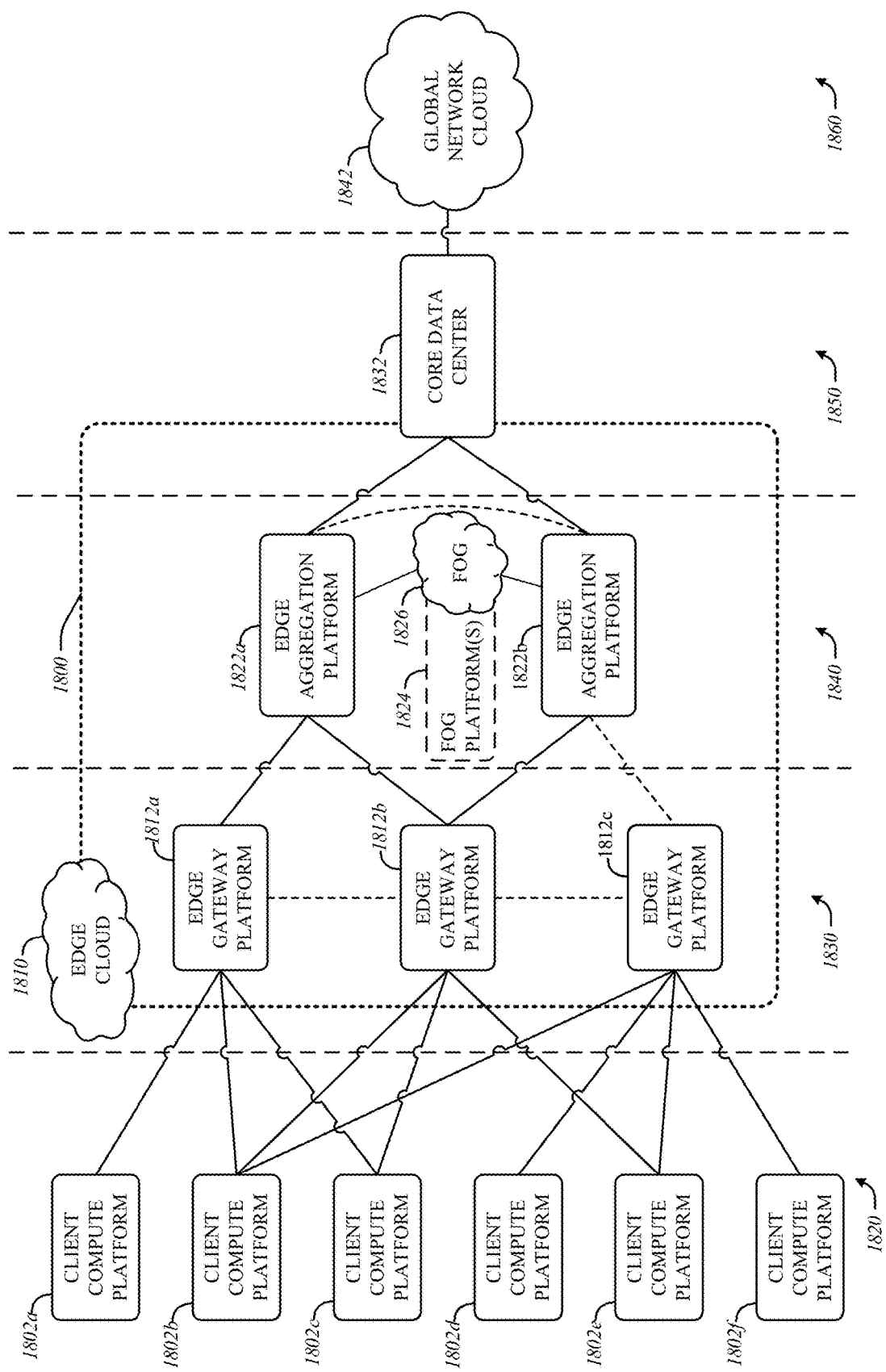
FIG. 18 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 18 depicts an example edge computing system 1800 for providing edge services and applications to multi-stakeholder entities, as distributed among one or more client compute platforms 1802, one or more edge gateway platforms 1812, one or more edge aggregation platforms 1822, one or more core data centers 1832, and a global network cloud 1842, as distributed across layers of the edge computing system 1800. The implementation of the edge computing system 1800 may be provided at or on behalf of a telecommunication service provider ("telco", or "TSP"), internet-of-things service provider, cloud service provider (CSP), enterprise entity, or any other number of entities. Various implementations and configurations of the edge computing system 1800 may be provided dynamically, such as when orchestrated to meet service objectives.

Individual platforms or devices of the edge computing system 1800 are located at a particular layer corresponding to layers 1820, 1830, 1840, 1850, and 1860. For example, the client compute platforms 1802a, 1802b, 1802c, 1802d, 1802e, 1802f are located at an endpoint layer 1820, while the edge gateway platforms 1812a, 1812b, 1812c are located at an edge devices layer 1830 (local level) of the edge computing system 1800. Additionally, the edge aggregation platforms 1822a, 1822b (and/or fog platform(s) 1824, if arranged or operated with or among a fog networking configuration 1826) are located at a network access layer 1840 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1832 is located at a core network layer 1850 (a regional or geographically central level), while the global network cloud 1842 is located at a cloud data center layer 1860 (a national or world-wide layer). The use of "core" is provided as a term for a centralized network location-deeper in the network-which is accessible by multiple edge platforms or components; however, a "core" does not necessarily designate the "center" or the deepest location of the network. Accordingly, the core data center 1832 may be located within, at, or near the edge cloud 1810. Although an illustrative number of client compute platforms 1802a, 1802b, 1802c, 1802d, 1802e, 1802f; edge gateway platforms 1812a, 1812b, 1812c; edge aggregation platforms 1822a, 1822b; edge core data centers 1832; and global network clouds 1842 are shown in FIG. 18, it should be appreciated that the edge computing system 1800 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 1812a, 1812b, 1812c can be configured as an edge of edges such that the edge gateway platforms 1812a, 1812b, 1812c communicate via peer to peer connections. In some examples, the edge aggregation platforms 1822a, 1822b and/or the fog platform(s) 1824 can be configured as an edge of edges such that the edge aggregation platforms 1822a, 1822b and/or the fog platform(s) communicate via peer to peer connections. Additionally, as shown in FIG. 18, the number of components of respective layers 1820, 1830, 1840, 1850, and 1860 generally increases at each lower level (e.g., when moving closer to endpoints (e.g., client compute platforms 1802a, 1802b, 1802c, 1802d, 1802e, 1802f)). As such, one edge gateway platforms 1812a, 1812b, 1812c may service multiple ones of the client compute platforms 1802a, 1802b, 1802c, 1802d, 1802e, 1802f, and one edge aggregation platform (e.g., one of the edge aggregation platforms 1822a, 1822b) may service multiple ones of the edge gateway platforms 1812a, 1812b, 1812c.

Consistent with the examples provided herein, a client compute platform (e.g., one of the client compute platforms 1802a, 1802b, 1802c, 1802d, 1802e, 1802f) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 1800 does not necessarily mean that such platform, node, and/or device operates in a client or slave role; rather, any of the platforms, nodes, and/or devices in the edge computing system 1800 refer to individual entities, platforms, nodes, devices, and/or subsystems which include discrete and/or connected hardware and/or software configurations to facilitate and/or use the edge cloud 1810.

As such, the edge cloud 1810 is formed from network components and functional features operated by and within the edge gateway platforms 1812a, 1812b, 1812c and the edge aggregation platforms 1822a, 1822b of layers 1830, 1840, respectively. The edge cloud 1810 may be implemented as any type of network that provides edge computing and/or storage resources which are proximately located to radio access network (RAN) capable endpoint devices (e.g., mobile computing devices, IoT devices, smart devices, etc.), which are shown in FIG. 18 as the client compute platforms 1802a, 1802b, 1802c, 1802d, 1802e, 1802f. In other words, the edge cloud 1810 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.) as well as non-terrestrial networks and constellations (e.g., LEO, MEO or ICO, or VLEO satellites), while also providing storage and/or compute capabilities. Other types and forms of network access (e.g., satellite, Wi-Fi, long-range wireless, wired networks including optical networks) terrestrial and non-terrestrial may also be utilized in place of or in combination with such 3GPP carrier networks.

In some examples, the edge cloud 1810 may form a portion of, or otherwise provide, an ingress point into or across a fog networking configuration 1826 (e.g., a network of fog platform(s) 1824, not shown in detail), which may be implemented as a system-level horizontal and distributed architecture that distributes resources and services to perform a specific function. For instance, a coordinated and distributed network of fog platform(s) 1824 may perform computing, storage, control, or networking aspects in the context of an IoT system arrangement. Other networked, aggregated, and distributed functions may exist in the edge cloud 1810 between the core data center 1832 and the client endpoints (e.g., client compute platforms 1802a, 1802b, 1802c, 1802d, 1802e, 1802f). Some of these are discussed in the following sections in the context of network functions or service virtualization, including the use of virtual edges and virtual services which are orchestrated for multiple tenants.

As discussed in more detail below, the edge gateway platforms 1812a, 1812b, 1812c and the edge aggregation platforms 1822a, 1822b cooperate to provide various edge services and security to the client compute platforms 1802a, 1802b, 1802c, 1802d, 1802e, 1802f. Furthermore, because a client compute platforms (e.g., one of the client compute platforms 1802a, 1802b, 1802c, 1802d, 1802e, 1802f) may be stationary or mobile, a respective edge gateway platform 1812a, 1812b, 1812c may cooperate with other edge gateway platforms to propagate presently provided edge services, relevant service data, and security as the corresponding client compute platforms 1802a, 1802b, 1802c, 1802d, 1802e, 1802f moves about a region. To do so, the edge gateway platforms 1812a, 1812b, 1812c and/or edge aggregation platforms 1822a, 1822b may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 1800 includes meta-orchestration functionality. For example, edge platforms at the far-edge (e.g., edge platforms closer to edge users, the edge devices layer 1830, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 1840, the core network layer 1850, a central office, a mini-datacenter, etc.). By offloading telemetry and/or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 1810. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 1810, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain". At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 19:
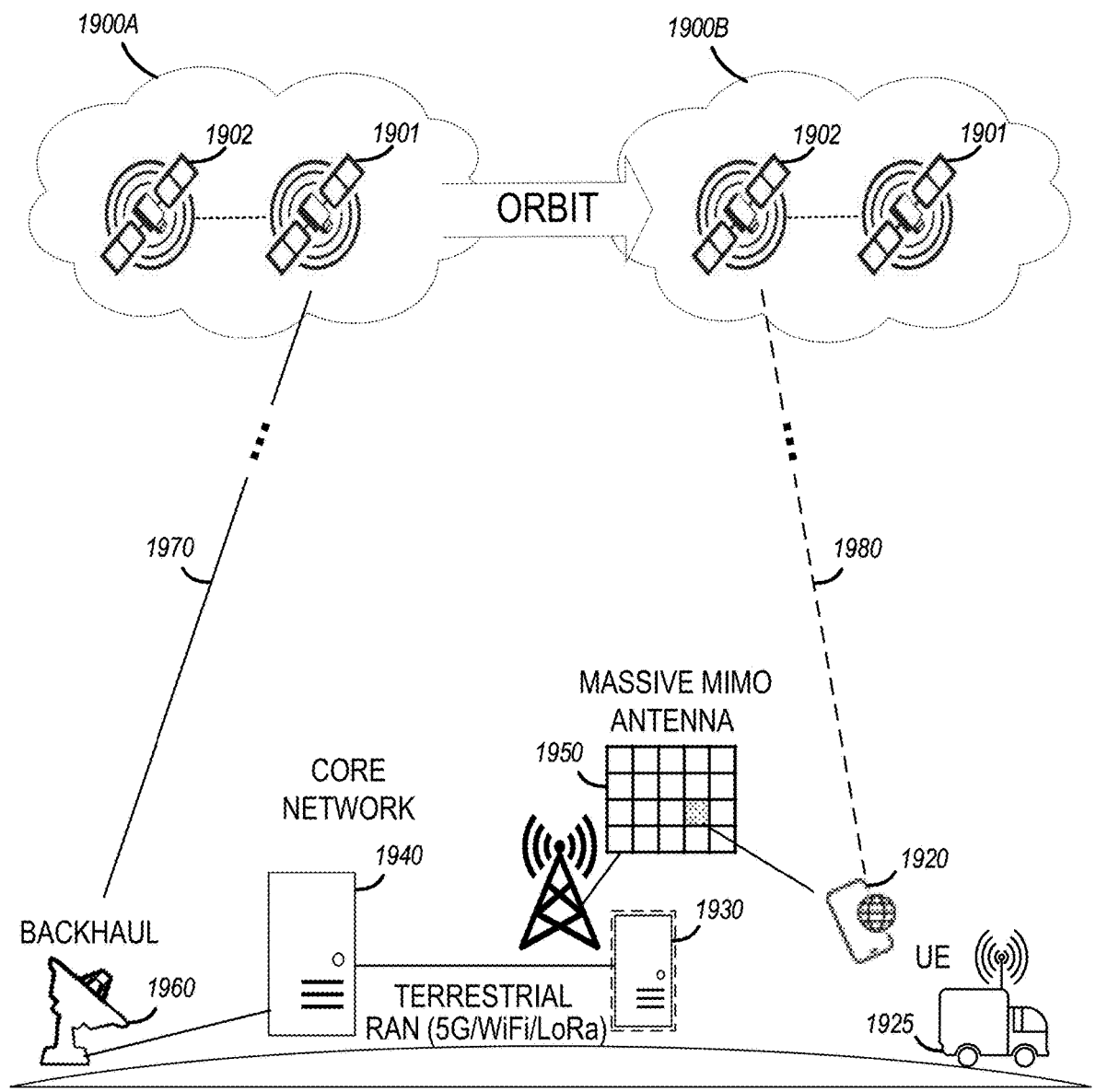
FIG. 19 illustrates network connectivity in non-terrestrial (satellite) and terrestrial (e.g., mobile cellular network) settings, according to an example.

FIG. 19 illustrates network connectivity in non-terrestrial (satellite) and terrestrial (e.g., mobile cellular network) settings, according to an example. As shown, a satellite constellation 1900 (the constellation depicted in FIG. 19 at orbital positions 1900A and 1900B) may include multiple satellite vehicles (SVs) 1901, 1902, which are connected to each other and to one or more terrestrial networks. The individual satellites in the constellation 1900 (each, an SV) conduct an orbit around the earth, at an orbit speed that increases as the SV is closer to earth. LEO constellations are generally considered to include SVs that orbit at an altitude between 160 and 1000 km; at this altitude, each SV orbits the earth about every 90 to 120 minutes.

The constellation 1900 includes individual SVs 1901, 1902 (and numerous other SVs not shown), and uses multiple SVs to provide communications coverage to a geographic area on earth. The constellation 1900 may also coordinate with other satellite constellations (not shown), and with terrestrial-based networks, to selectively provide connectivity and services for individual devices (user equipment) or terrestrial network systems (network equipment).

In this example, the satellite constellation 1900 is connected via a satellite link 1970 to a backhaul network 1960, which is in turn connected to a 5G core network 1940. The 5G core network 1940 is used to support 5G communication operations with the satellite network and at a terrestrial 5G radio access network (RAN) 1930. For instance, the 5G core network 1940 may be located in a remote location, and use the satellite constellation 1900 as the exclusive mechanism to reach wide area networks and the Internet. In other scenarios, the 5G core network 1940 may use the satellite constellation 1900 as a redundant link to access the wide area networks and the Internet; in still other scenarios, the 5G core network 1940 may use the satellite constellation 1900 as an alternate path to access the wide area networks and the Internet (e.g., to communicate with networks on other continents).

FIG. 19 additionally depicts the use of the terrestrial 5G RAN 1930, to provide radio connectivity to a user equipment (UE) such as user device 1920 or vehicle 1925 on-ground via a massive MIMO antenna 1950. It will be understood that a variety of 5G and other network communication components and units are not depicted in FIG. 19 for purposes of simplicity. In some examples, each UE 1920 or 1925 also may have its own satellite connectivity hardware (e.g., receiver circuitry and antenna), to directly connect with the satellite constellation 1900 via satellite link 1980. Although a 5G network setting is depicted and discussed at length in the following sections, it will be apparent that other variations of 3GPP, O-RAN, and other network specifications may also be applicable.

Other permutations (not shown) may involve a direct connection of the 5G RAN 1930 to the satellite constellation 1900 (e.g., with the 5G core network 1940 accessible over a satellite link); coordination with other wired (e.g., fiber), laser or optical, and wireless links and backhaul; multi-access radios among the UE, the RAN, and other UEs; and other permutations of terrestrial and non-terrestrial connectivity. Satellite network connections may be coordinated with 5G network equipment and user equipment based on satellite orbit coverage, available network services and equipment, cost and security, and geographic or geopolitical considerations, and the like. With these basic entities in mind, and with the changing compositions of mobile users and in-orbit satellites, the following techniques describe ways in which terrestrial and satellite networks can be extended for various edge computing scenarios.

Figure 20:
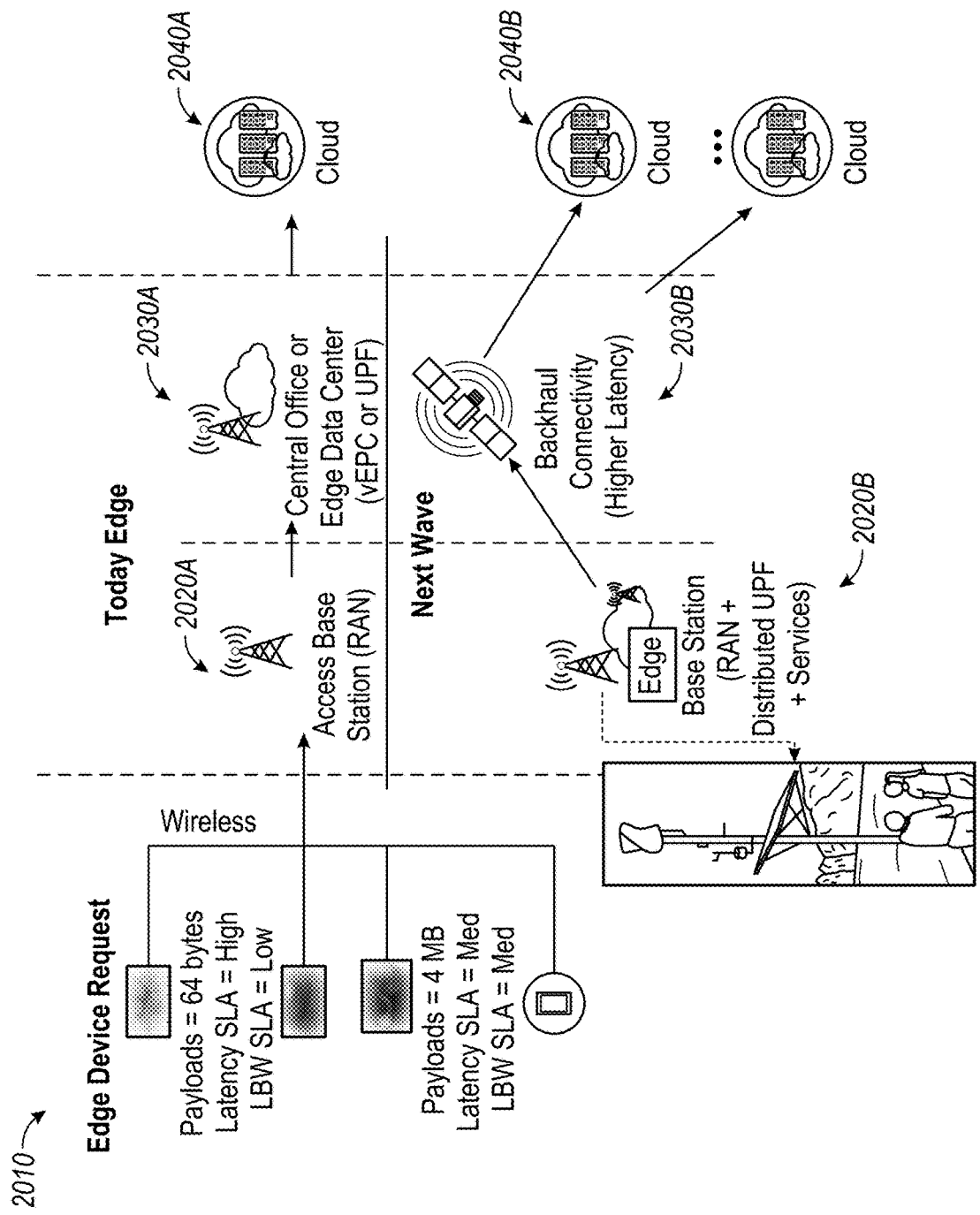
FIG. 20 illustrates terrestrial and non-terrestrial edge connectivity architectures, according to an example.

FIG. 20 illustrates terrestrial and non-terrestrial edge connectivity architectures, extended with the present techniques. Edge cloud computing has already been established as one of the next evolutions in the context of distributed computing and democratization of compute. Current edge deployments typically involve a set of devices 2010 or users connected to access data points 2020A (base stations, small cells, wireless or wired connectivity) that provide access to a set of services (hosted locally on the access points or other points of aggregations) via different type of network functions 2030A (e.g., virtual Evolved Packet Cores (vEPCs), User Plane Function (UPF), virtual Broadband Network Gateway (vBNG), Control Plane and User Plane Separation (CUPS), Multiprotocol Label Switching (MPLS), Ethernet etc.).

However, one of the limitations that current edge compute architectures experience is that these architectures rely on the network infrastructure owned by communication service providers or neutral carriers. Therefore, if a particular provider wants to provide a new service into a particular location, it has to agree with operators in order to provide the required connectivity to the location where the service is hosted (service provider owned or provided by the communications service provider). On the other hand, in many cases, such as rural edge, or emerging economies, infrastructure is not yet established. In order to overcome this limitation, several companies (tier 1 and beyond) are looking at satellite connectivity in order to remove these limitations.

Multiple constellation of satellites that act as different organizations have a significant need to work together, share resources, and offer features such as geographic exclusion zones, quality of service (QoS), and low-latency content and service delivery. In this context, reliability, QoS, resource sharing, and restrictions such as exclusion zones provide significant inter-related concerns which are addressed by the following edge computing architectures and processing approaches.

In the architecture of FIG. 20, devices 2010 are connected to a new type of edge location at a base station 2020B, that implements access capabilities (such as Radio Antenna Network), network functions (e.g., vEPC with CUPS/UPF, etc.), and a first level of edge services (such as a content delivery network (CDN)). Such services conventionally required connectivity to the cloud 2040A or the core of the network. Here, in a satellite connectivity setting, such content and compute operations may be coordinated at a base station 2020B offering RAN and distributed functions and services. The base station 2020B in turn may obtain content or offload processing to a cloud 2040B or other service via backhaul connectivity 2030B, via satellite communication (for example, in a scenario where a CDN located at the base station 2020B needs to obtain uncached content). RAN functions can be split further into wireless and wired processing such as RAN-Distributed Unit (DU) L1/L2 processing and RAN-Centralized Unit (CU) L3 and higher processing.

One of the main challenges of any type of edge compute architecture is how to overcome the higher latencies that appear when services require connectivity to the backhaul of the network. This problem becomes more challenging when there are multiple type of backhaul connections (e.g., to different data centers in the cloud 2040B) with different properties or levels of congestion. These and other types of complex scenarios are addressed among the following operations.

Figure 21:
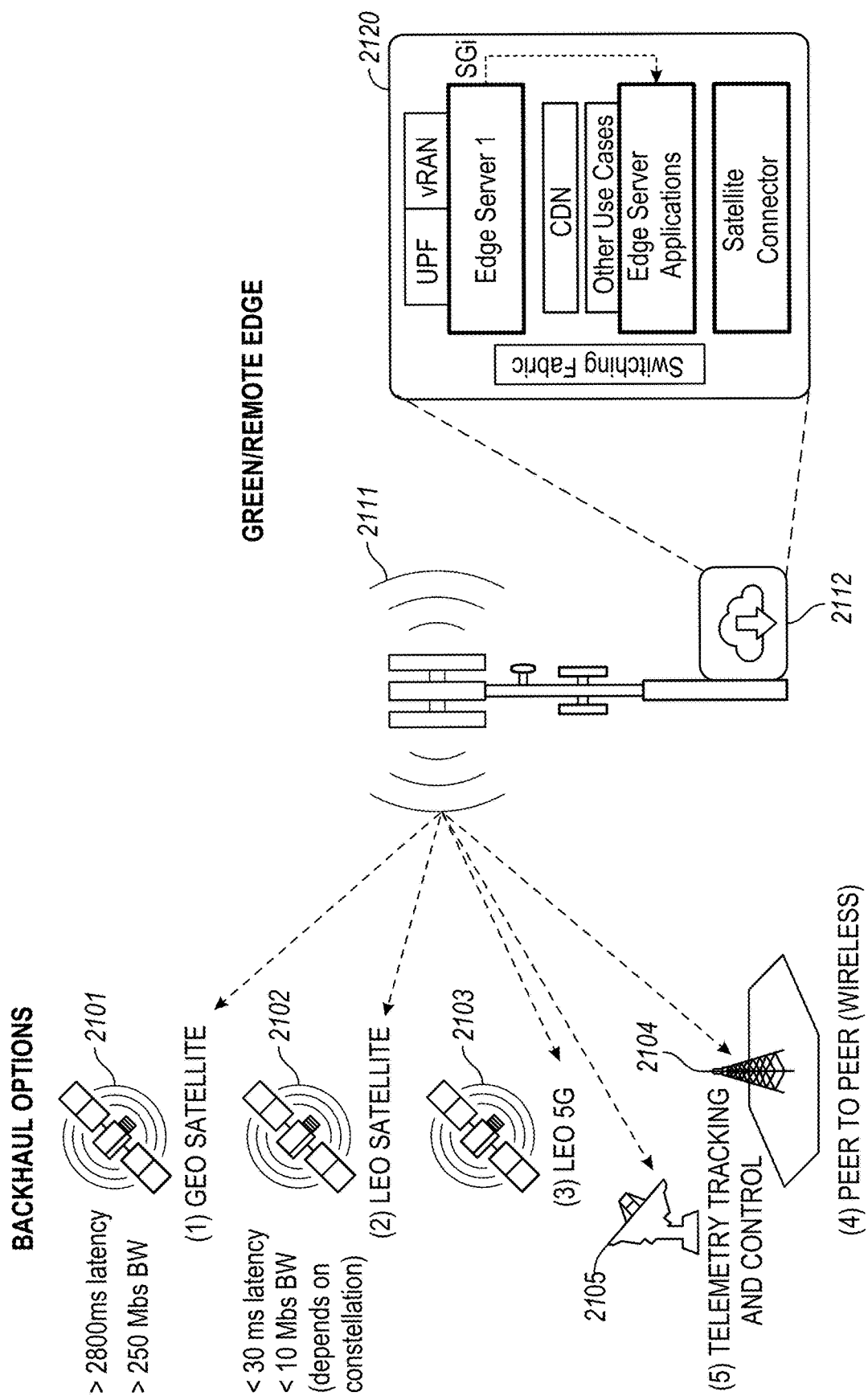
FIG. 21 illustrates multiple types of satellite communication networks, according to an example.
Figure 22A:
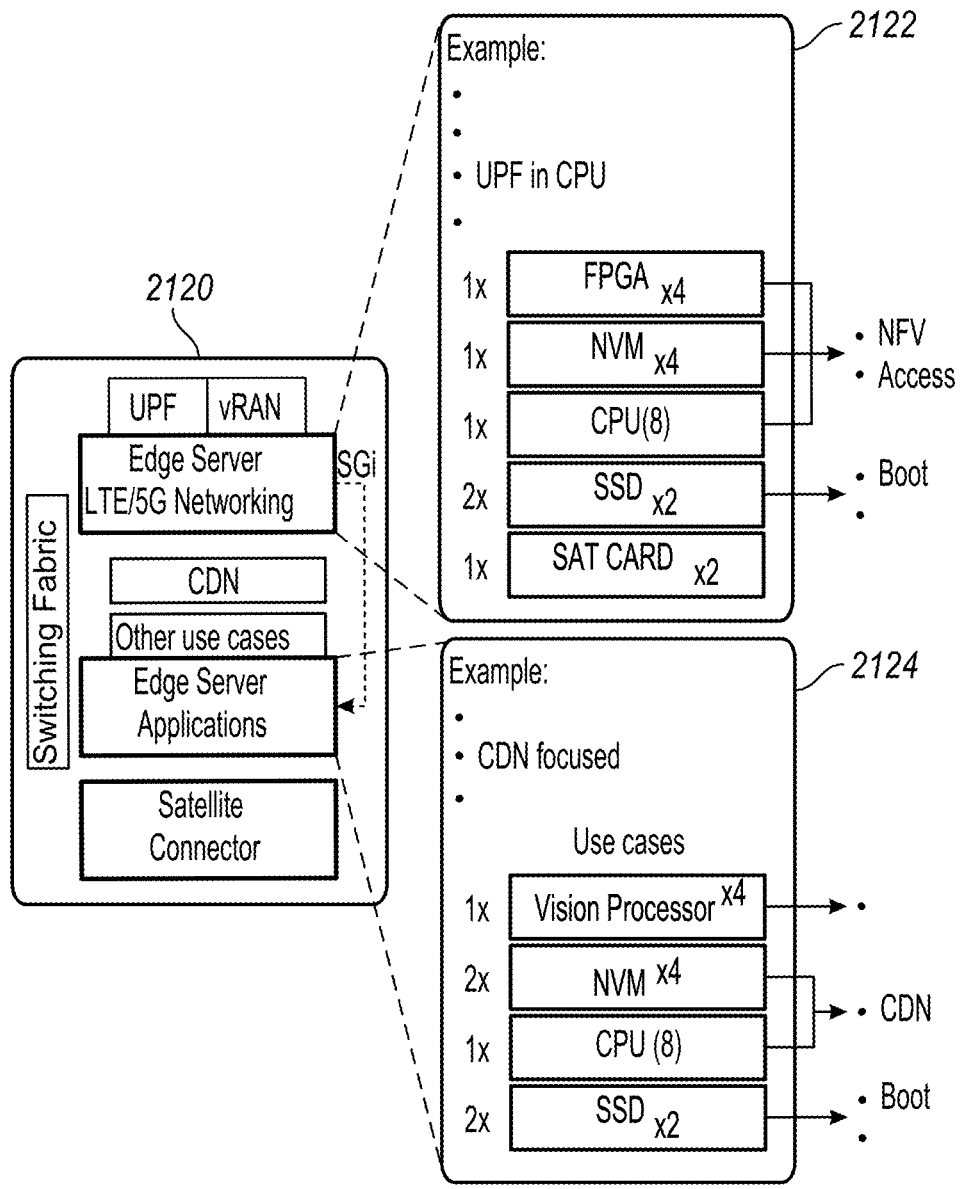
FIGS. 22A and 22B illustrates multiple types of satellite communication processing architectures, according to an example.

FIG. 21 illustrates multiple types of satellite communication networks. Here, multiple types of backhaul options are illustrated, including a geosynchronous (GEO) satellite network 2101 (discussed below with reference to FIGS. 22A and/or 22B), a low earth orbit (LEO) satellite network 2102 (discussed below with reference to FIG. 24A), and a low earth orbit 5G (LEO 5G) satellite network 2103 (discussed below with reference to FIG. 24B). In each of these cases, a remote edge RAN access point 2111, connected to a 5G core network, uses one or more of the satellite networks 2101, 2102, 2103 to provide backhaul connectivity to a larger communications network (e.g., the Internet). The use of satellite backhaul may be in addition to other types of wired or wireless backhauls, including terrestrial backhaul to other 5G RAN wireless networks (e.g., peer-to-peer to wireless network 2104), or control information communicated or obtained via telemetry tracking and control (TTAC) network 2105. For example, the TTAC network 2105 may be used for operation and maintenance traffic, using a separate link for system control backhaul (e.g., on a separate satellite communications band).

At the access point 2111, various edge computing services 2112 may be provided based on an edge computing architecture 2120, such as that included within a server or compute node. This edge computing architecture 2120 may include: UPF/vRAN functions; one or more Edge Servers configured to provide CDN, Services, Applications, and other use cases; and a Satellite Connector (hosted in the edge computing architecture 2120). This architecture 2120 may be connected by a high speed switching fabric. Additional details on the use of a Satellite Connector and coordination of edge compute and connectivity operations for satellite settings is discussed below.

Figure 22B:
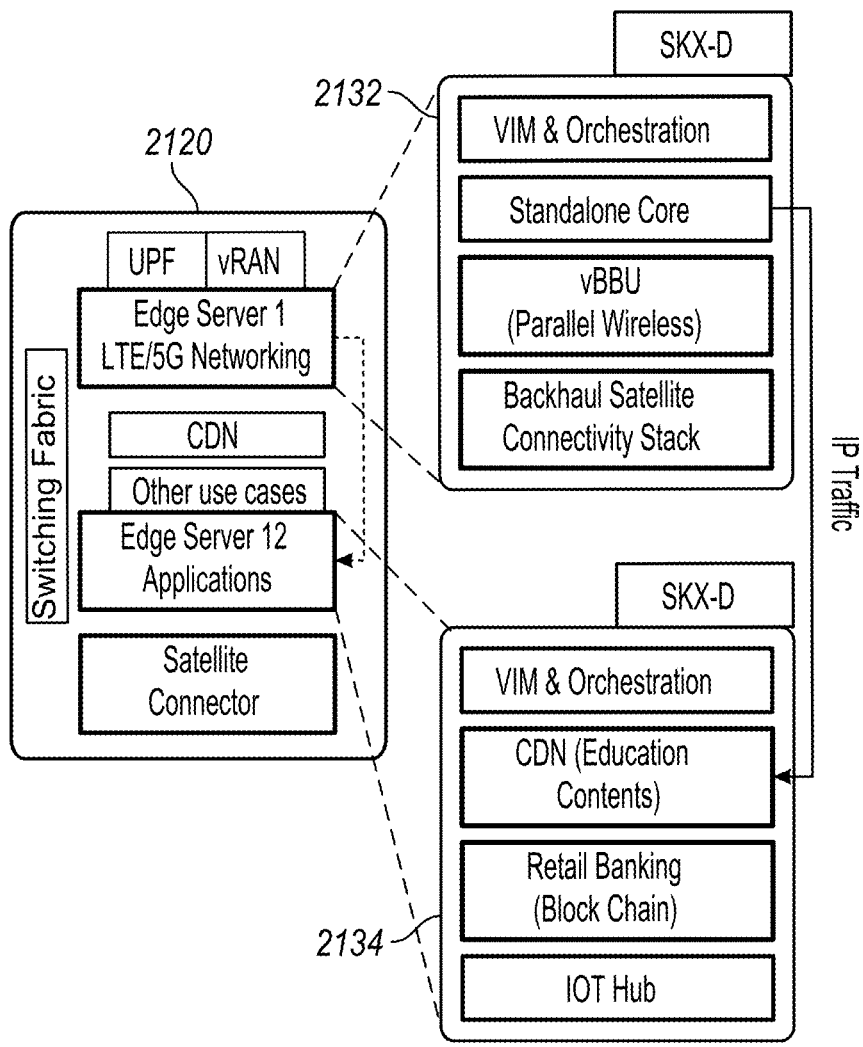

FIGS. 30A and 30B illustrates further examples of the edge computing architecture 2120. For example, an example edge server 2122 capable of LTE/5G networking may involve various combinations of FPGAs, Non-volatile memory (NVM) storage, processors, GPUs and specialized processing units, storage, and satellite communications circuitry. An example edge server 2124 capable of operating applications may include artificial intelligence (AI) compute circuitry, NVM storage, processors, and storage. Likewise, the services provided on such servers is depicted in FIG. 22B with a first service stack 2132 (e.g., operating on edge server 2122) and a second service stack 2134 (e.g., operating on edge server 2124). Various use cases (e.g., banking, IoT, CDN) are also illustrated, but the uses of the architectures are not so limited.

Figure 23:
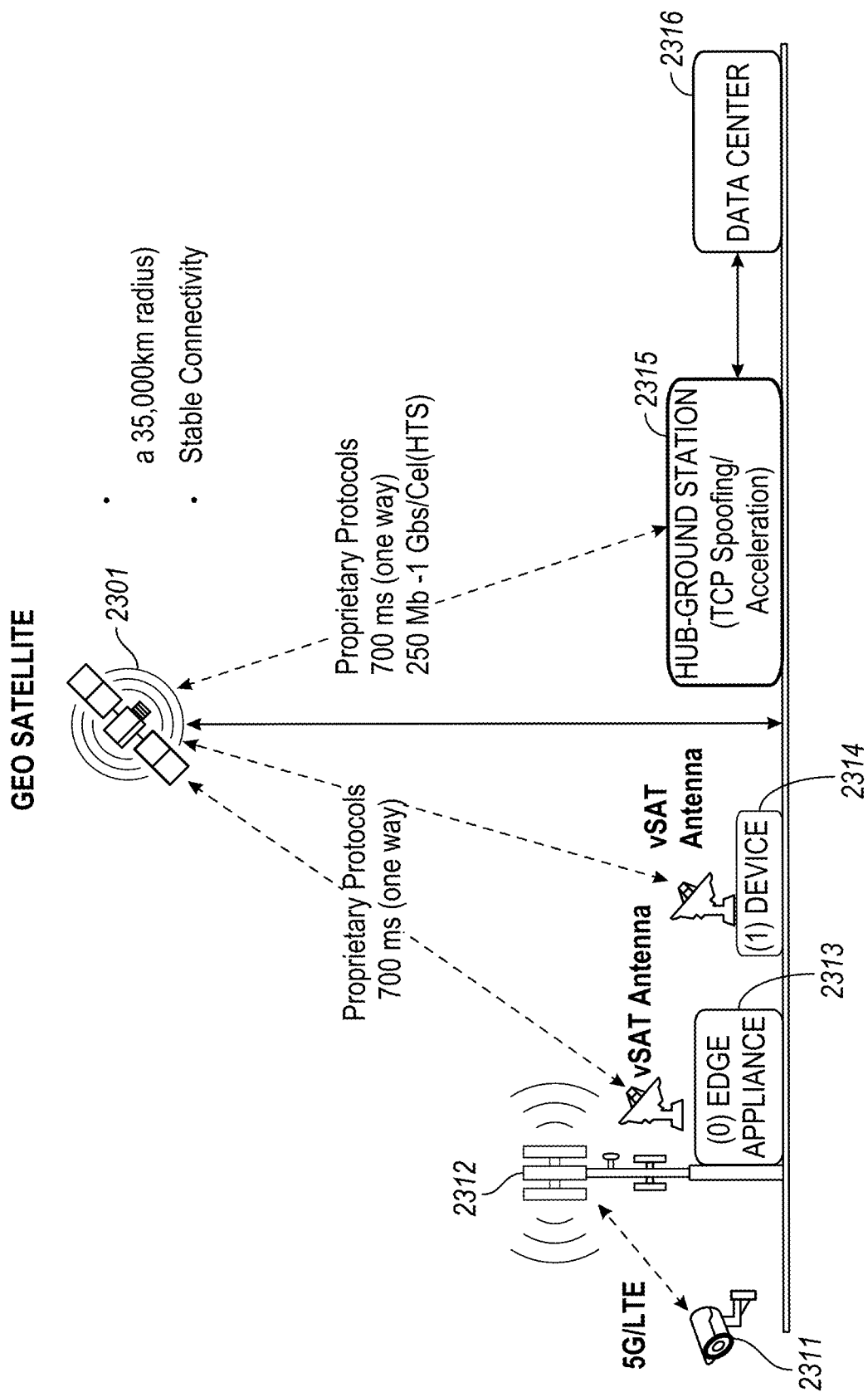
FIG. 23 illustrates terrestrial communication and architecture details in a geosynchronous satellite communication network, according to an example.

FIG. 23 illustrates terrestrial communication and architecture details in a geosynchronous satellite communication network. Here, an example IoT device 2311 uses a 5G/LTE connection to a terrestrial RAN 2312, which hosts an edge appliance 2313 (e.g., for initial edge compute processing). The RAN 2312 and edge appliance 2313 are connected to a geosynchronous satellite 2301, using a satellite link via a very-small-aperture terminal (vSAT) antenna. The geosynchronous satellite 2301 may also provide direct connectivity to other satellite connected devices, such as a device 2314. The use of existing 5G and geosynchronous satellite technology makes this solution readily deployable today.

In an example, 5G connectivity is provided in the geosynchronous satellite communication scenario using a distributed UPF (e.g., connected via the satellite) or a stand-alone core (e.g., located at a satellite-connected hub/ground station 2315) or directly at the edge appliance 2313. In any case, edge compute processing may be performed and distributed among the edge appliance 2313, the ground station 2315, or a connected data center 2316.

Figure 24A:
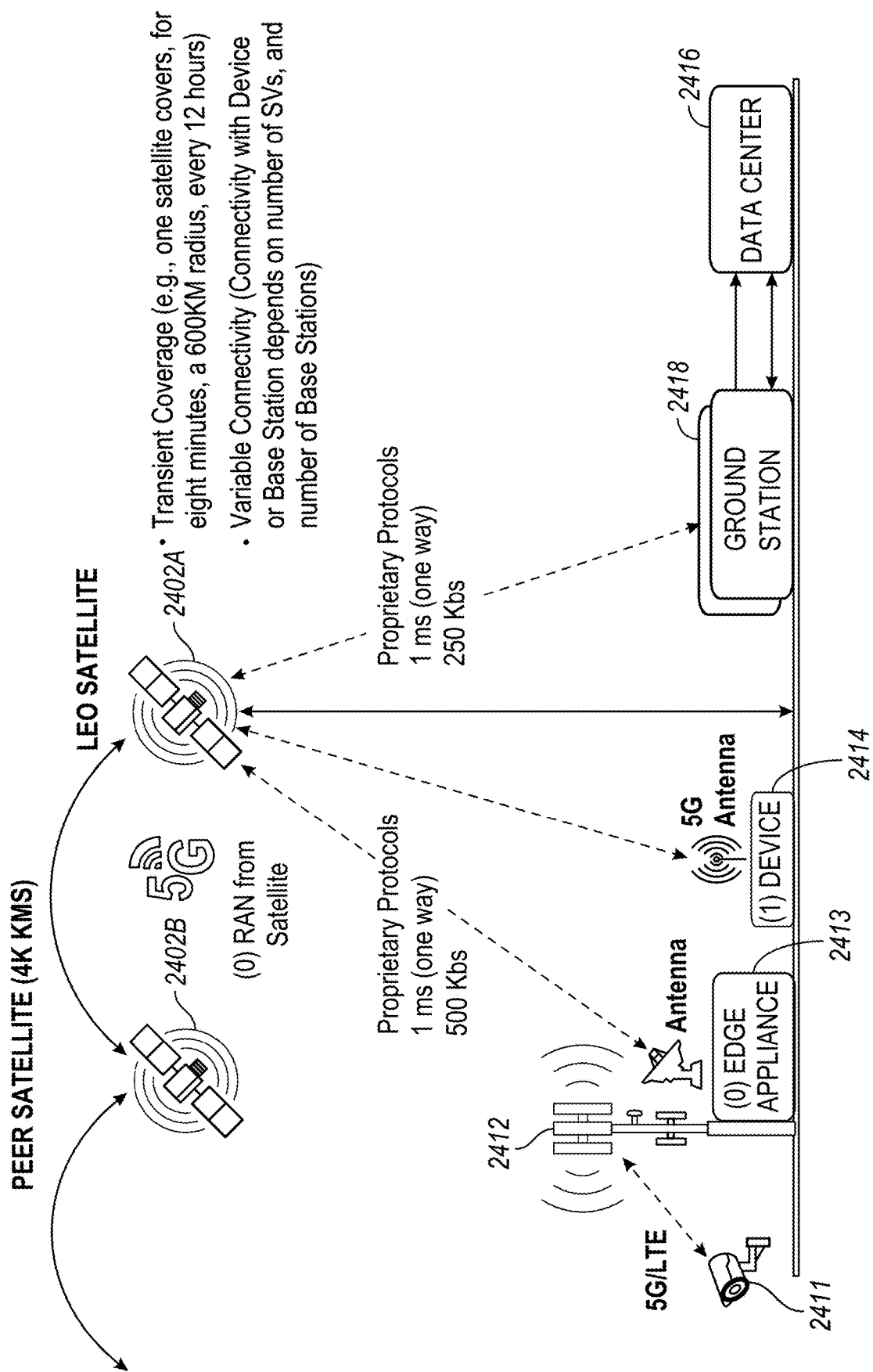
FIGS. 24A and 24B illustrate terrestrial communication and architecture details in a low earth orbit (LEO) satellite communication network, according to an example.
Figure 24B:
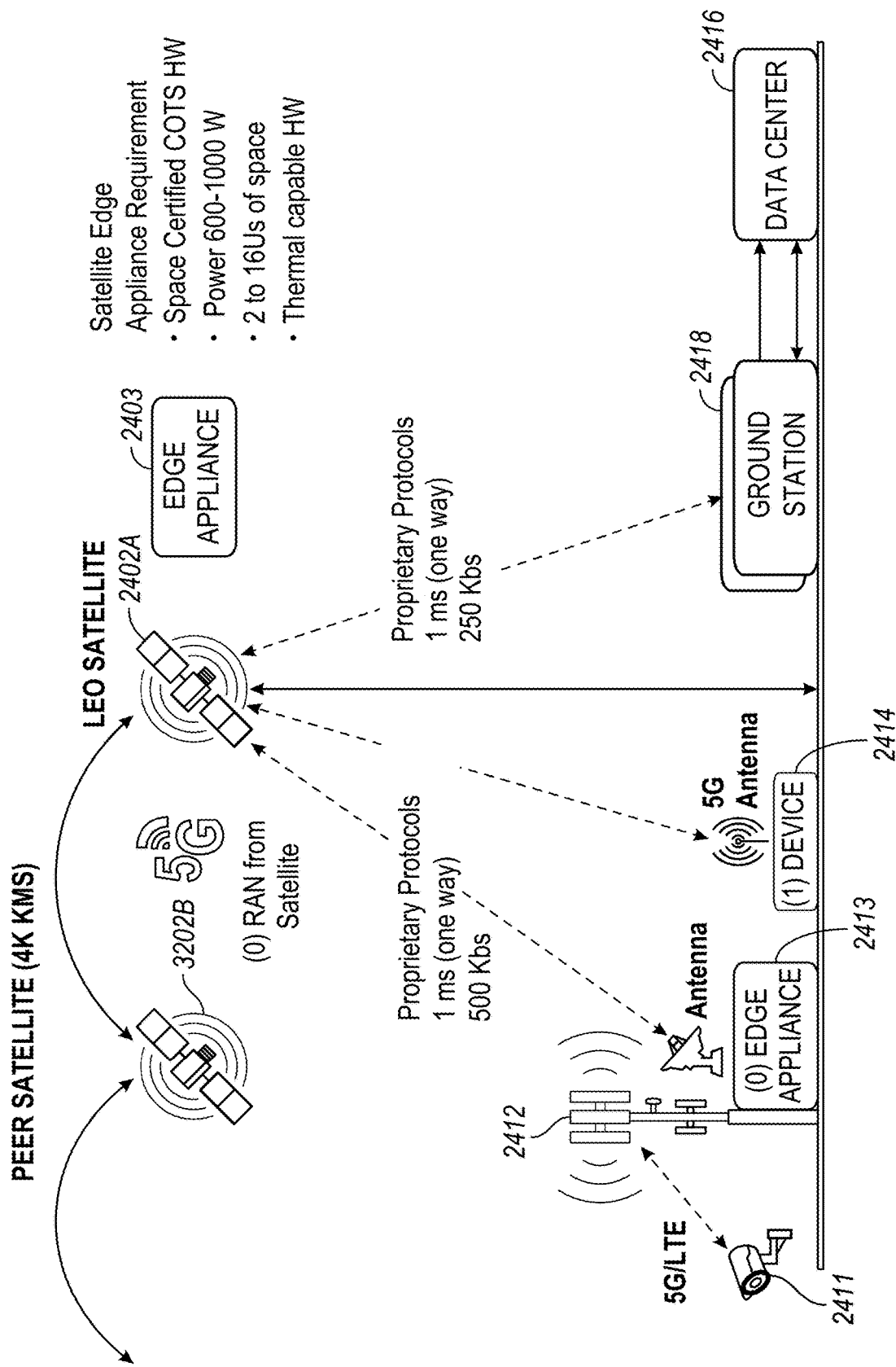

FIGS. 24A and 24B illustrate terrestrial communication and architecture details in a low earth orbit satellite communication network, provided by SVs 2402A, 2402B in constellation 2402. These drawings depict similar devices and edge systems as FIG. 23, with an IoT device 2411, an edge appliance 2413, and a device 2414. However, the provision of a 5G RAN from SVs 2402A, 2402B, and the significantly reduced latency from low earth orbit vehicles, enables much more robust use cases, including the direct connection of devices (device 2414) using 5G satellite antennas at the device 2414, and communication between the edge appliance 2413 and the satellite constellation 2402 using proprietary protocols.

As an example, in some LEO settings, one 5G LEO satellite can cover a 500 KM radius for 8 minutes, every 12 hours. Connectivity latency to LEO satellites may be as small as one millisecond. Further, connectivity between the satellite constellation and the device 2414 or the base station 2412 depends on the number and capability of satellite ground stations. In this example, the satellite 2401 communicates with a ground station 2418 which may host edge computing processing capabilities. The ground station 2418 in turn may be connected to a data center 2416 for additional processing. With the low latency offered by 5G communications, data processing, compute, and storage may be located at any number of locations (at edge, in satellite, on ground, at core network, at low-latency data center).

FIG. 24B includes the addition of an edge appliance 2403 located at the SV 2402A. Here, some of the edge compute operations may be directly performed using hardware located at the SV, reducing the latency and transmission time that would have been otherwise needed to communicate with the ground station 2418 or data center 2416. Likewise, in these scenarios, edge compute may be implemented or coordinated among specialized processing circuitry (e.g., FPGAs) or general purpose processing circuitry (e.g., x86 CPUs) located at the satellite 2401, the ground station 2418, the devices 2414 connected to the edge appliance 2413, the edge appliance 2413 itself, and combinations thereof.

Although not shown in FIGS. 24A to 24B, other types of orbit-based connectivity and edge computing may be involved with these architectures. These include connectivity and compute provided via balloons, drones, dirigibles, and similar types of non-terrestrial elements. Such systems encounter similar temporal limitations and connectivity challenges (like those encountered in a satellite orbit).

Figure 25A:
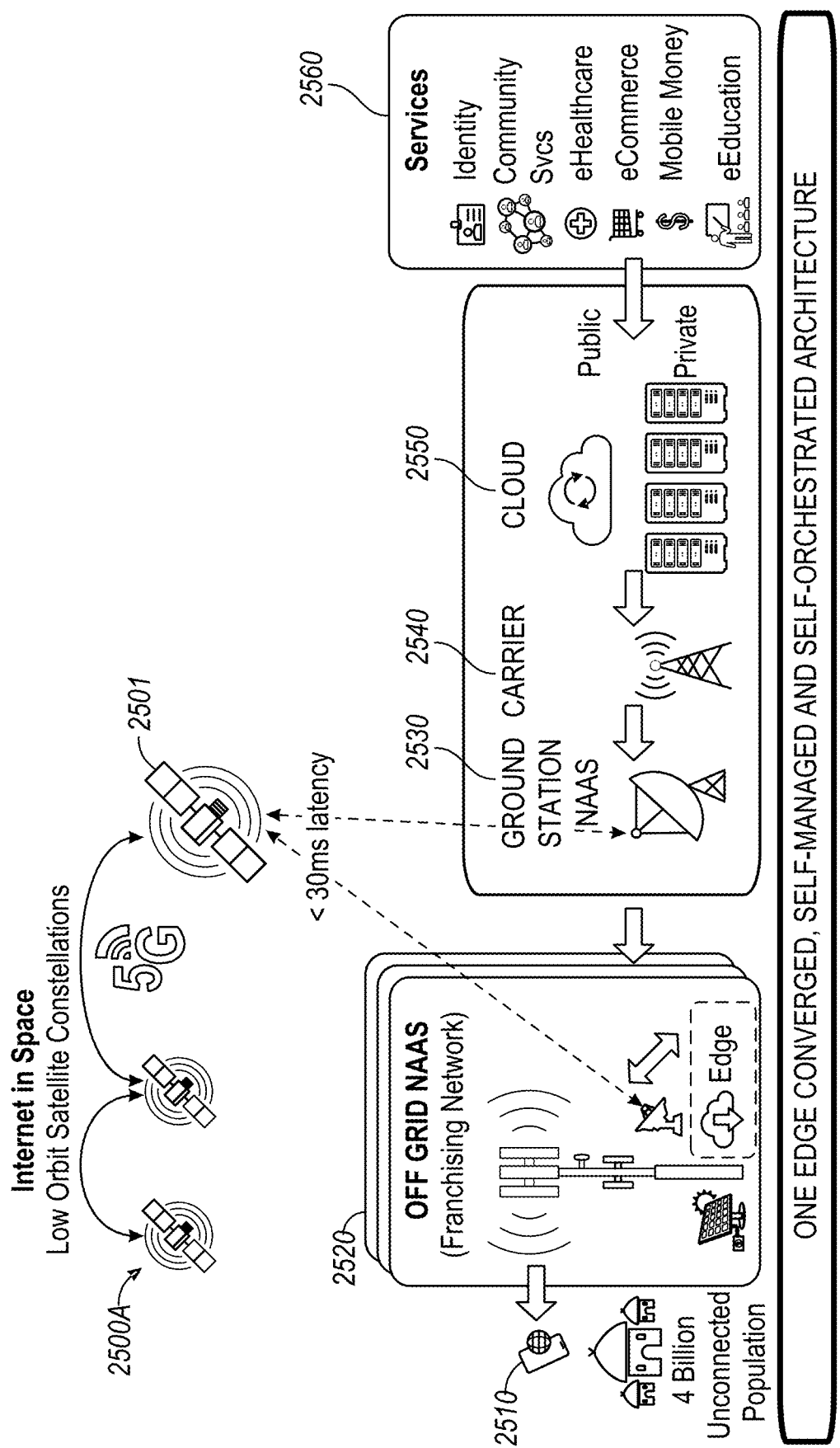
FIGS. 25A and 25B illustrate a network connectivity ecosystem implementing a LEO satellite communication network, according to an example.

FIG. 25A illustrates a network connectivity ecosystem implementing a satellite communication network. Here, a satellite 2501, part of satellite constellation 2500A, provides coverage to an "off-grid" wireless network 2520 (such as a geographically isolated network without wired backhaul). This wireless network 2520 in turn provides coverage to individual user equipment 2510. Via the satellite connection, a variety of other connections can be made to broader networks and services. These connections include connection to a carrier 2540 or to a cloud service 2550 via a satellite ground station 2530. At the cloud service 2550, a variety of public or private services 2560 may be hosted. Additionally, with the deployment of edge computing architectures, these services can be moved much closer to the user equipment 2510, based on coordination of operations at the network 2520, the satellite constellation 2500, the ground station 2530, or the carrier 2540.

Figure 25B:
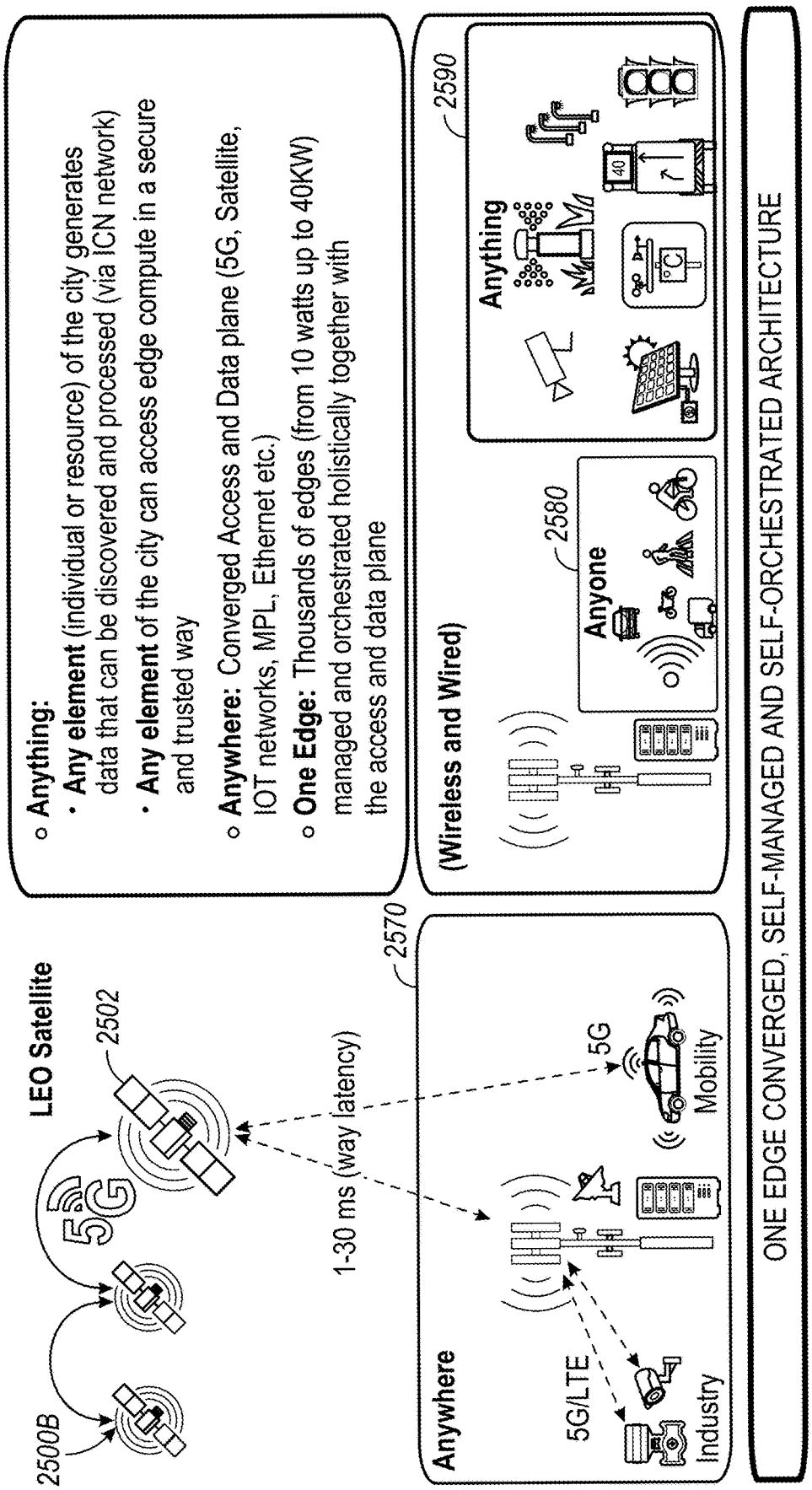

FIG. 25B further illustrates a network connectivity ecosystem, where satellite 2502, part of satellite constellation 2500B, provides high-speed connectivity (e.g., close to 1 ms one-way latency) using 5G network communications. Such high-speed connectivity enables satellite connectivity at multiple locations 2570, for multiple users 2580, and multiple types of devices 2590. Such configurations are particularly useful for the connection of industry IoT devices, mobility devices (such as robotaxis, autonomous vehicles), and the overall concept of offering connectivity for "anyone" and "anything".

Satellite Network Coverage and Coverage Identification

One of the general challenges in satellite architectures is how and where to deploy compute and all the required changes in the overall architecture. The present approaches address many aspects on where the compute can be placed and how to combine and merge satellite-based technologies with edge computing in a unique way. Here, the goal is to embrace the potential of "anywhere" compute (whether from the device, to edge, to satellite to the ground station).

The placement and coordination of edge computing with satellites is made much more complex due to the fact that satellites are going to be orbiting in constellations. This leads to two significant challenges: first, depending on the altitude and on the density of a constellation, the time that an edge location is covered is going to vary. Similarly, latency and bandwidth may change over time. Second, satellite-containing compute nodes themselves are going to be in orbit and moving around. The use of an in-motion edge computing location, which is only accessible from a geographic location at different times, needs to be considered.

Figure 26:
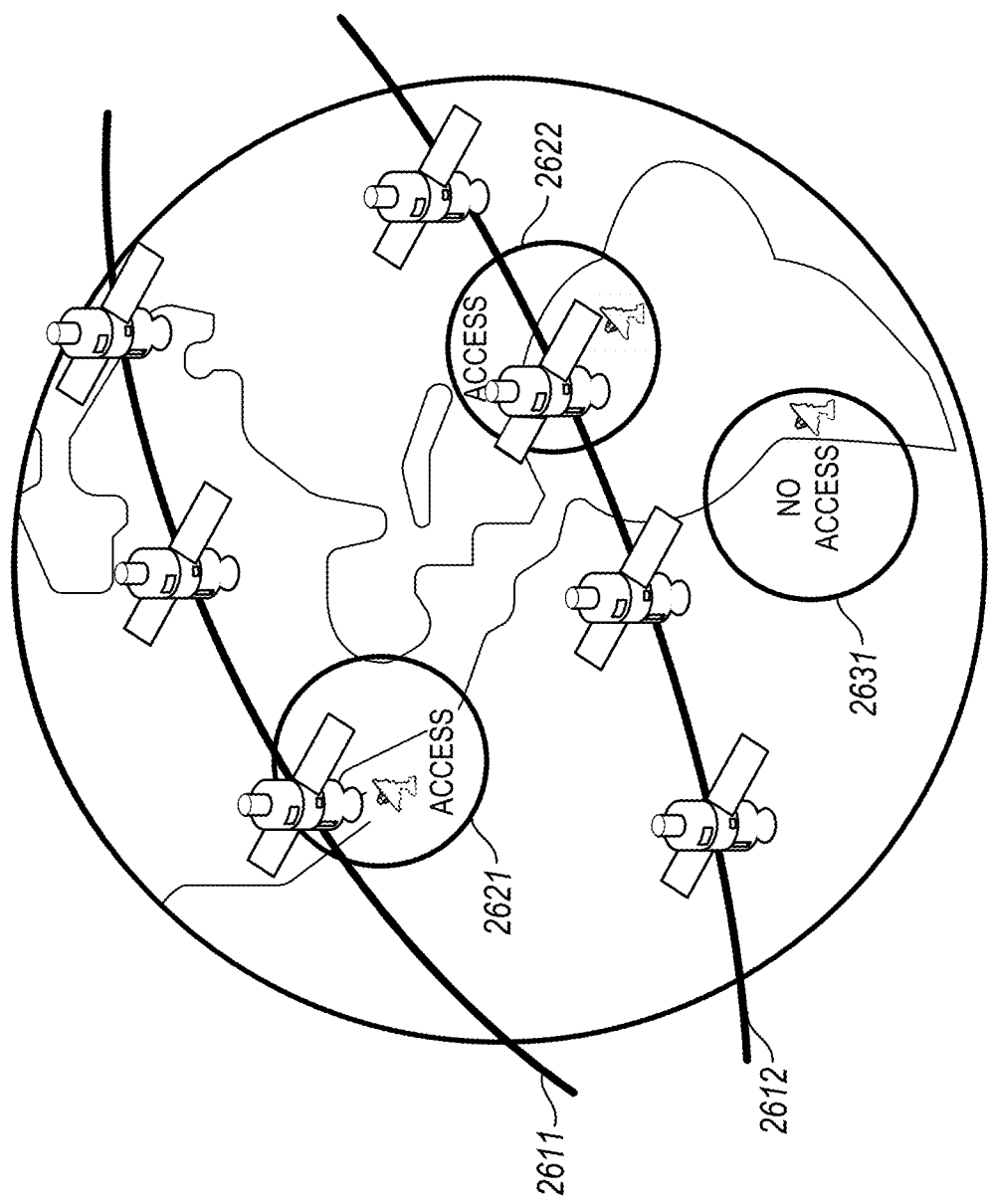
FIG. 26 illustrates an overview of terrestrial-based, LEO satellite-enabled edge processing, according to an example.

FIG. 26 illustrates an example, simplified scenario of geographic satellite connectivity from multiple LEO satellite communication networks, which depicts the movement of the relevant LEO SVs relative to geographic areas. Here, the orbits 2611, 2612 of respective satellite constellations operate to provide network coverage in limited geographic areas 2621, 2622. In contrast, there is no access provided in area 2631. It will be understood that the geographic positions of relevant satellite coverage areas may play an important part in determining service characteristics, exclusion zones, and coordination of satellite-ground processing.

Figure 27:
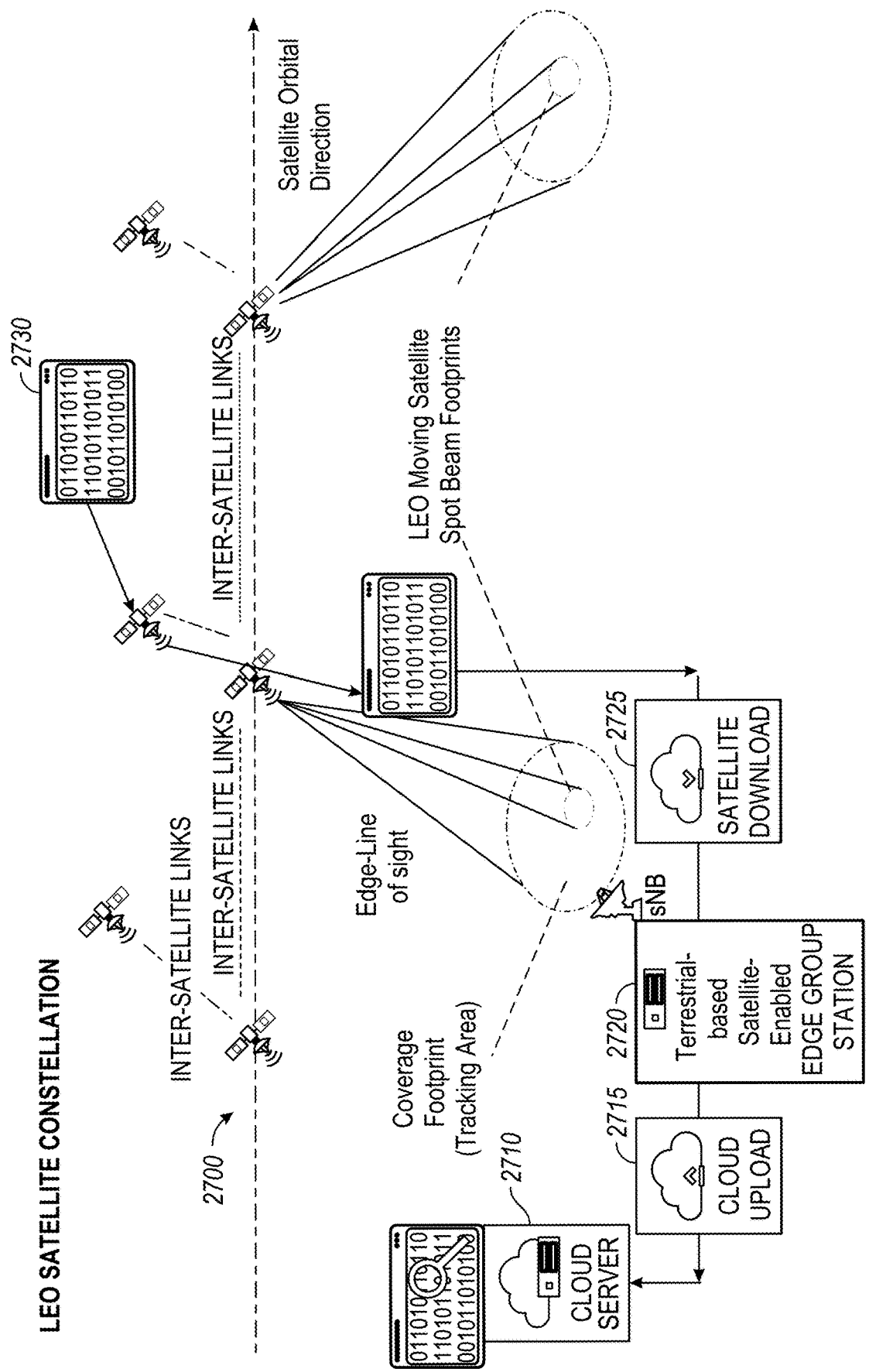
FIG. 27 illustrates a scenario of geographic satellite connectivity from LEO satellite communication networks, according to an example.

FIG. 27 illustrates an overview of terrestrial-based, satellite-enabled edge processing. As shown, a terrestrial-based, satellite enabled EDGE ground station (satellite nodeB, sNB) 2720 obtains coverage from a satellite constellation 2700, and downloads a data set 2730. The constellation 2700 may coordinate operations to handoff the download using inter-satellite links (such as in a scenario where the data set 2730 is streamed, or cannot be fully downloaded before the satellite footprint moves).

The satellite download 2725 is provided to the sNB 2720 for processing, such as with a cloud upload 2715 to a server 2710 (e.g., a CDN located at or near the sNB 2720). Accordingly, once downloaded to the sNB 2720 (and uploaded to the server 2710), the user devices located within the terrestrial coverage area (e.g., 5G coverage area) of the sNB 2720 now may access the data from the server 2710.

Figure 28A:
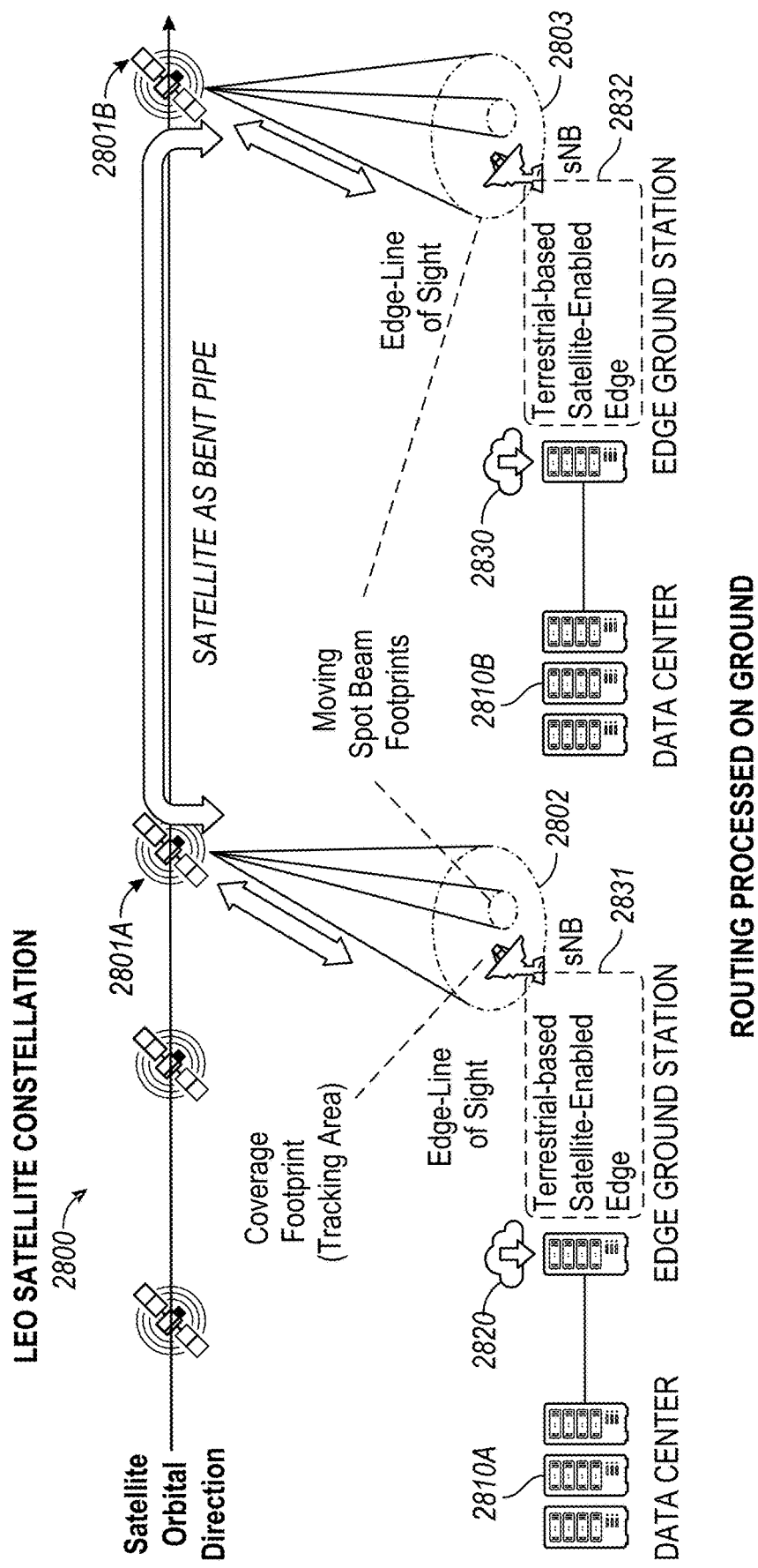
FIGS. 28A, 28B, and 28C illustrate terrestrial-based, LEO satellite-enabled edge processing arrangements, according to an example.

FIG. 28A illustrates a terrestrial-based, satellite-enabled edge processing arrangement, where routing is performed "on-ground" and the satellite is used as a "bent pipe" between edge processing locations. Here, the term "bent pipe" refers to the use of a satellite or satellite constellation as a connection relay, to simply communicate data from one terrestrial location to another terrestrial location. As shown in this figure, a satellite 2800 in a constellation has an orbital path, moving from position 2801A to 2801B, providing separate coverage areas 2802 and 2803 for connectivity at respective times.

Here, when a satellite-enabled edge computing node 2831 (sNB) is in the coverage area 2802, it obtains connectivity via the satellite 2800 (at position 2801A), to communicate with a wider area network. Additionally, this edge computing node sNB 2831 may be located at an edge ground station 2820 which is also in further communication with a data center 2810A, for performing computing operations at a terrestrial location.

Likewise, when a satellite-enabled edge computing node 2832 (sNB) is in the coverage area 2803, it obtains connectivity via the satellite 2800 (at position 2801B), to communicate with a wider area network. Again, computing operations (e.g., services, applications, etc.) are processed at a terrestrial location such as edge ground station 2830 and data center 2810B.

Figure 28B:
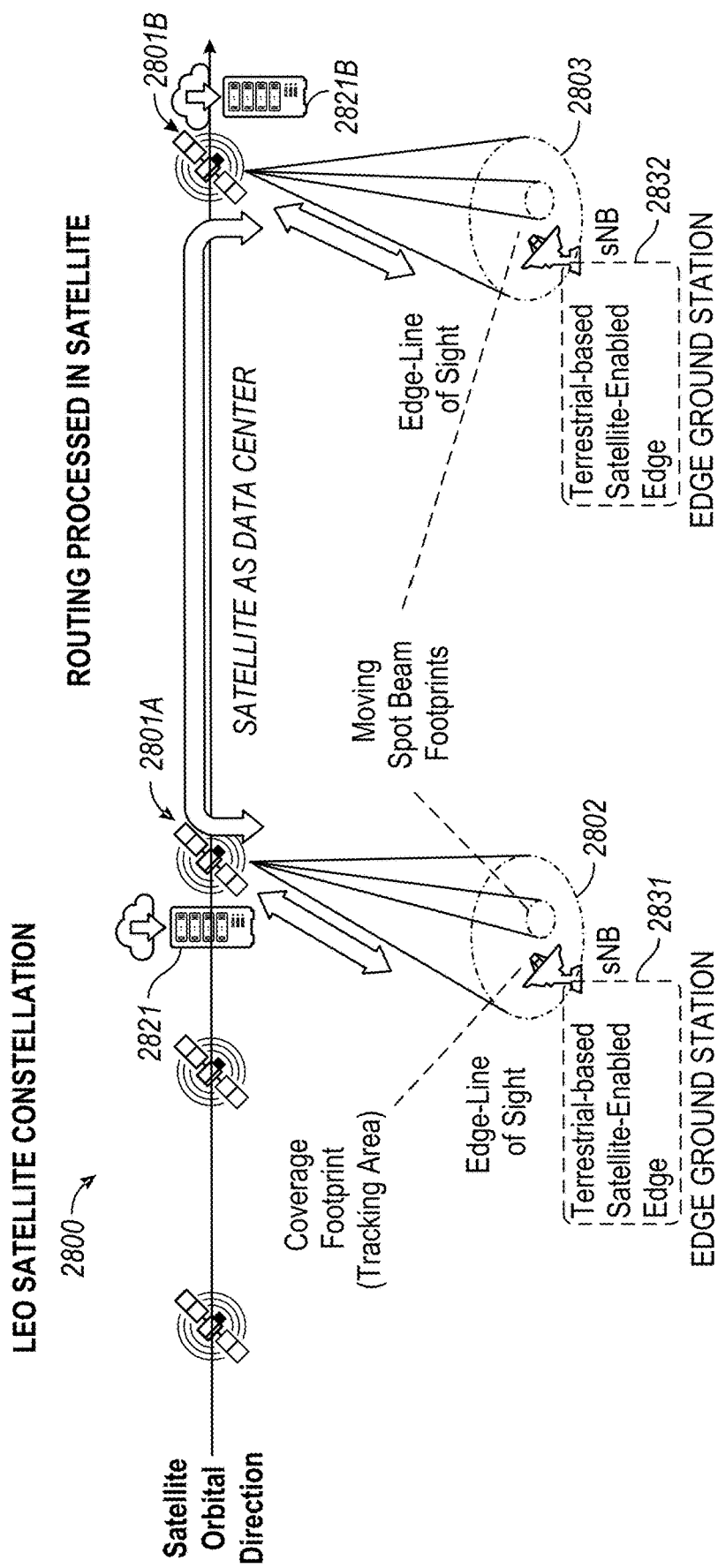

FIG. 28B illustrates another terrestrial-based, satellite-enabled edge processing arrangement. Similar to the arrangement depicted in FIG. 28A, this shows the satellite 2800 in a constellation along an orbital path, moving from position 2801A to 2801B, providing separate coverage areas 2802 and 2803 at respective times. However, in this example, the satellite is used as a data center, to perform edge computing operations (e.g., serve data, compute data, relay data, etc.).

Specifically, at the satellite vehicle, edge computing hardware 2821 is located to process computing or data requests received from the ground station sNBs 2831, 2832 in the coverage areas 2802, 2803. This may have the benefit of removing the communication latency involved with another location at the wide area network. However, due to processing and storage constraints, the amount of computation power may be limited at the satellite 2800 and thus some requests or operations may be moved to the ground stations 2831, 2832.

As will be understood, edge computing and edge network connectivity may include various aspects of RAN and software defined networking processing. Specifically, in many of these scenarios, wireless termination may be moved between ground and satellite, depending on available processing resources. Further, in these scenarios, URLCC (ultra-reliable low latency connections) processing may be performed on ground or in payload using packet processing approaches, including with the packet processing templates further discussed herein, and with and vRAN-DU (distributed unit) processing and acceleration.

Figure 28C:
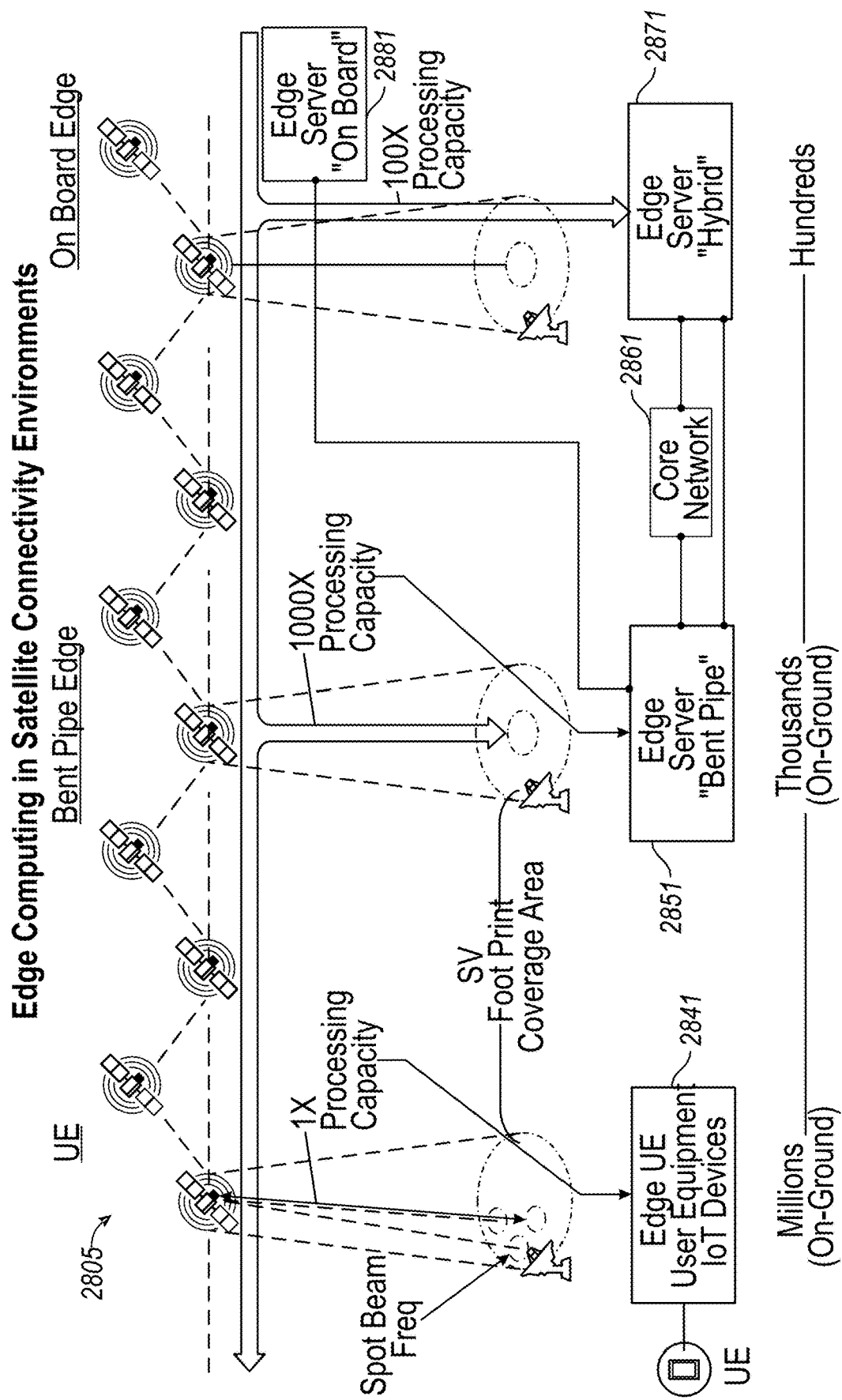

FIG. 28C illustrates further comparisons of terrestrial-based and non-terrestrial-based edge processing arrangements. Here, the satellite network 2805 provided by a LEO constellation is used: a) at left, to provide connectivity and edge processing to as many as millions of user devices 2841 (e.g., UEs, IOT Sensors), which do not have a wired direct connection to the core network 2861; b) at center, to provide connectivity and edge processing via a "bent pipe" edge server 2851, which has a wired direct connection to the core network 2861, supporting as many as thousands of edge servers on-ground; c) at right, to provide use of an on-vehicle edge server 2881, which also may coordinate with a hybrid edge server 2871, to support as many as hundreds of servers for in-orbit processing and hundreds of servers for ground stations. It will be understood that the servers 2851, 2871, and 2881 may be accessed for use by the various UEs 2841, based on connectivity and service orchestration considerations, such as discussed further below.

Figure 29A:
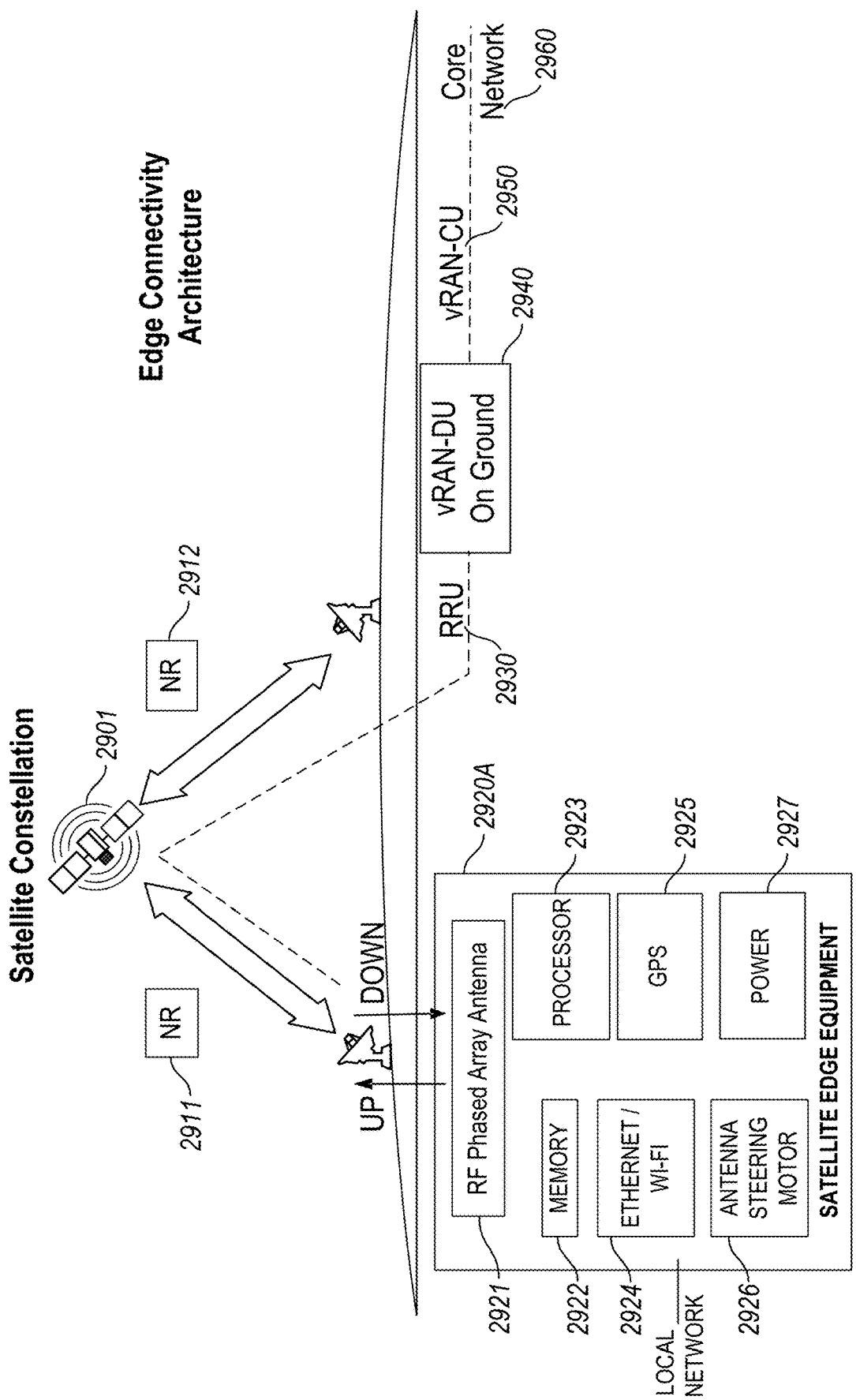
FIGS. 29A, 29B, 29C, and 29D depict various arrangements of radio access network processing via a satellite communication network, according to an example.

Additional scenarios for network processing are depicted among FIGS. 29A-29D. FIG. 29A first depicts an edge connectivity architecture, involving RAN aspects on the ground, using a satellite connection (via satellite 2901) as a "bent pipe" with a vRAN-DU 2940 as an edge on ground. In this scenario, satellite edge equipment 2920A communicates with up and downlinks via a 5G new radio (NR) interface 2911 with the satellite 2901; the satellite also communicates with up and downlinks via a NR interface 2912 to a remote radio unit (RRU) 2930 which is in turn connected to the vRAN-DU 2940. Further in the network are the vRAN-CU (central unit) 2950 and the core network 2960.

The satellite edge equipment 2920A depicts a configuration of an example platform configured to provide connectivity and edge processing for satellite connectivity. This equipment 2920A specifically includes an RF phased array antenna 2921, memory 2922, processor 2923, network interface (e.g., supporting Ethernet/Wi-Fi) 2924, GPS 2925, antenna steering motor 2926, and power components 2927. Other configurations and computer architectures of equipment 2920A for edge processing are further discussed herein.

Figure 29B:
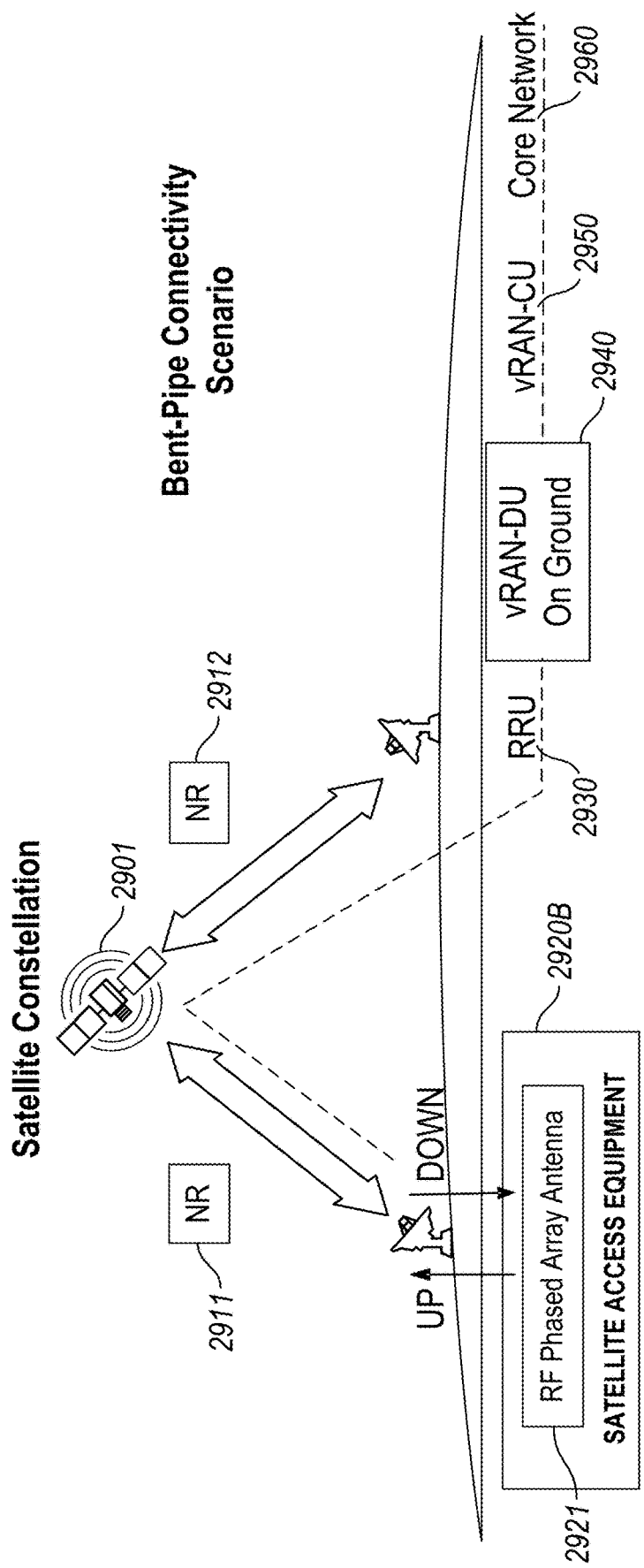
Figure 29C:
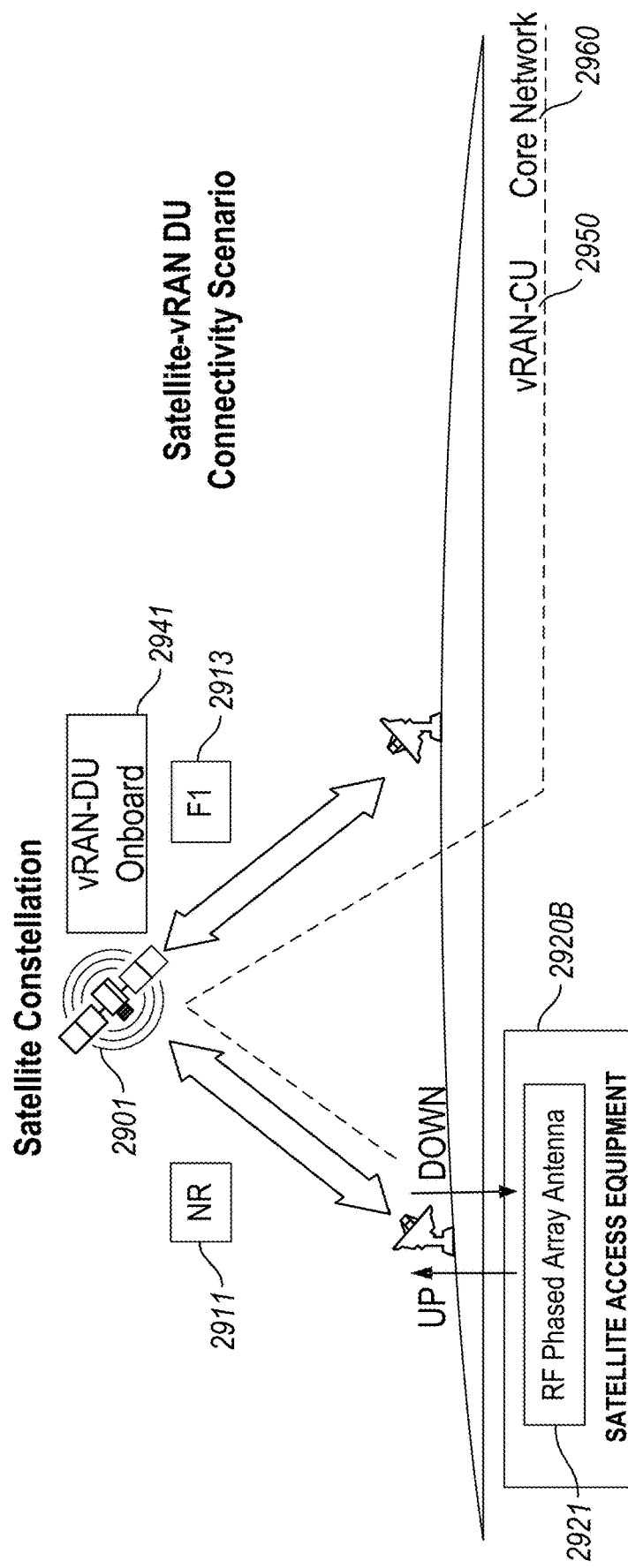
Figure 29D:
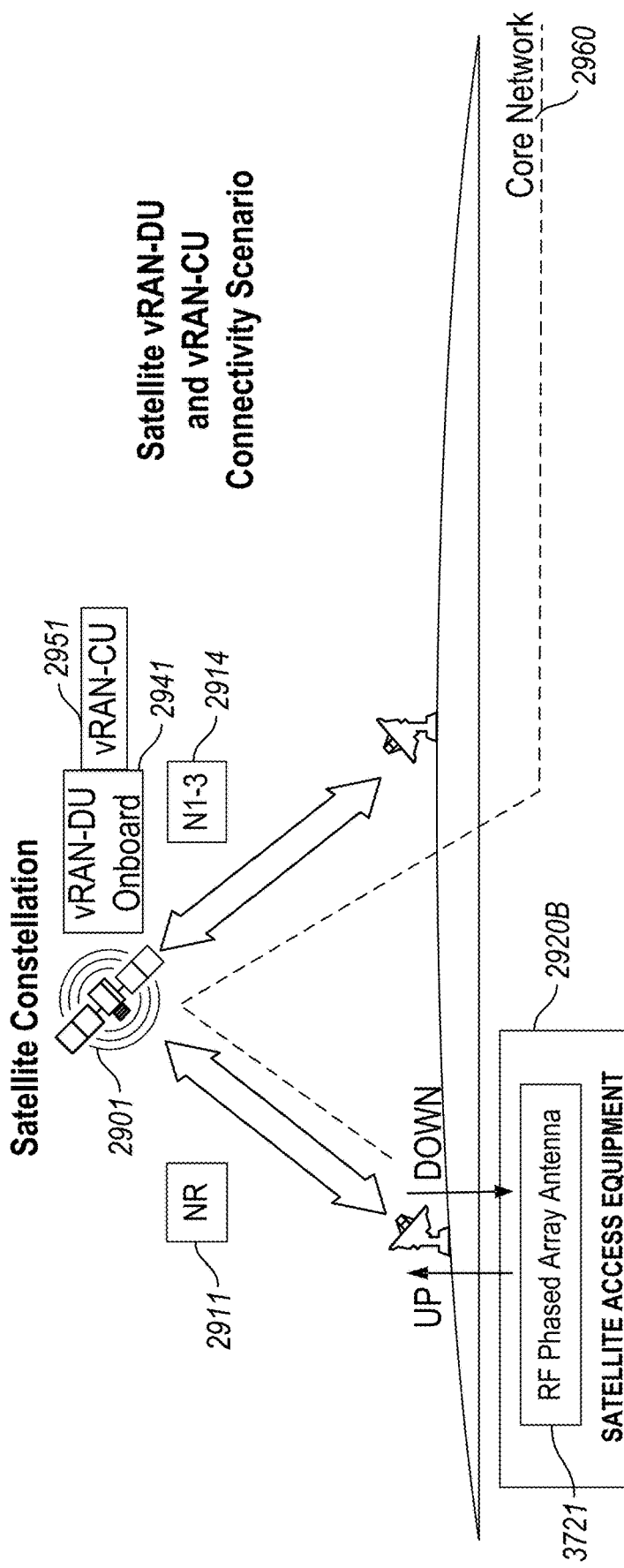

FIGS. 29B-29D show a simplified version of satellite access equipment 2920B, used for network access. In the setting of FIG. 29B, a similar bent-pipe connectivity scenario is provided, with the vRAN-DU 2940 located on ground. In the setting of FIG. 29C, the vRAN-DU 2941 is located on-board the SV, with a F1 interface 2913 used to connect to a vRAN-CU 2950 and Core Network 2960 on ground. Finally, in the setting of FIG. 29D, the vRAN-DU 2941 and vRAN-CU 2951 are located on-board the SV, with a N1-3 User Plane Function (UPF) interface and functionality 2914 can be either on-board or on-ground the SV to connect to the core network. In some examples, the vRAN-DU 2940 can be in a payload of the satellite 2901, such as on-board the satellite 2901, on-ground, and/or any combination(s) thereof. In some examples, the vRAN-CU 2950 can be in a payload of the satellite 2901, such as on-board the satellite 2901, on-ground, and/or any combination(s) thereof.

In further examples, the satellite and ground connectivity networks identified above may be adapted for Satellite and 5G Ground Station Optimization using various artificial intelligence (AI) processing techniques. In an example, infrastructure optimization related to terrestrial 5G pole placement for optimum performance (uplink, downlink, latency) and satellite constellation coexistence may be analyzed to support improved network coverage.

Some satellite constellations may have limited ground stations and thus satellite connectivity latency may be impacted if not located line-of-sight with devices on the ground. As a result, service providers are expected to optimize their network for 5G pole placement to avoid interferences caused by weather. Satellite images can be used as an inference input to an AI engine, allowing a service provider to determine optimum routing and 5G pole placement, leveraging factors such as geographic location, demand, latency, uplink, downlink requirements, forward looking weather outlook, among other considerations.

Data flow diagrams and/or flowcharts representative of example hardware logic circuitry, machine-readable instructions, hardware implemented state machines, and/or any combination thereof for implementing the request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 is/are shown in FIGS. 13, 14, 30, 31, 32, 33, and/or 34. The machine-readable instructions may be one or more executable programs or portion(s) of an executable program for execution by processor circuitry, such as the processor circuitry 3512 shown in the example processor platform 3500 discussed below in connection with FIG. 35 and/or the example processor circuitry discussed below in connection with FIGS. 36 and/or 37. The program may be embodied in software stored on one or more non-transitory computer readable storage media such as a CD, a floppy disk, an HDD, an SSD, a DVD, a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer-readable storage media may include one or more mediums located in one or more hardware devices. Further, although the example program is described with reference to the data flow diagrams and/or flowcharts illustrated in FIGS. 13, 14, 30, 31, 32, 33, and/or 34, many other methods of implementing the example request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, Hypertext Markup Language (HTML), Structured Query Language (SQL), Swift, etc.

As mentioned above, the example operations of FIGS. 13, 14, 30, 31, 32, 33, and/or 34 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer-readable medium and non-transitory computer-readable storage medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 30:
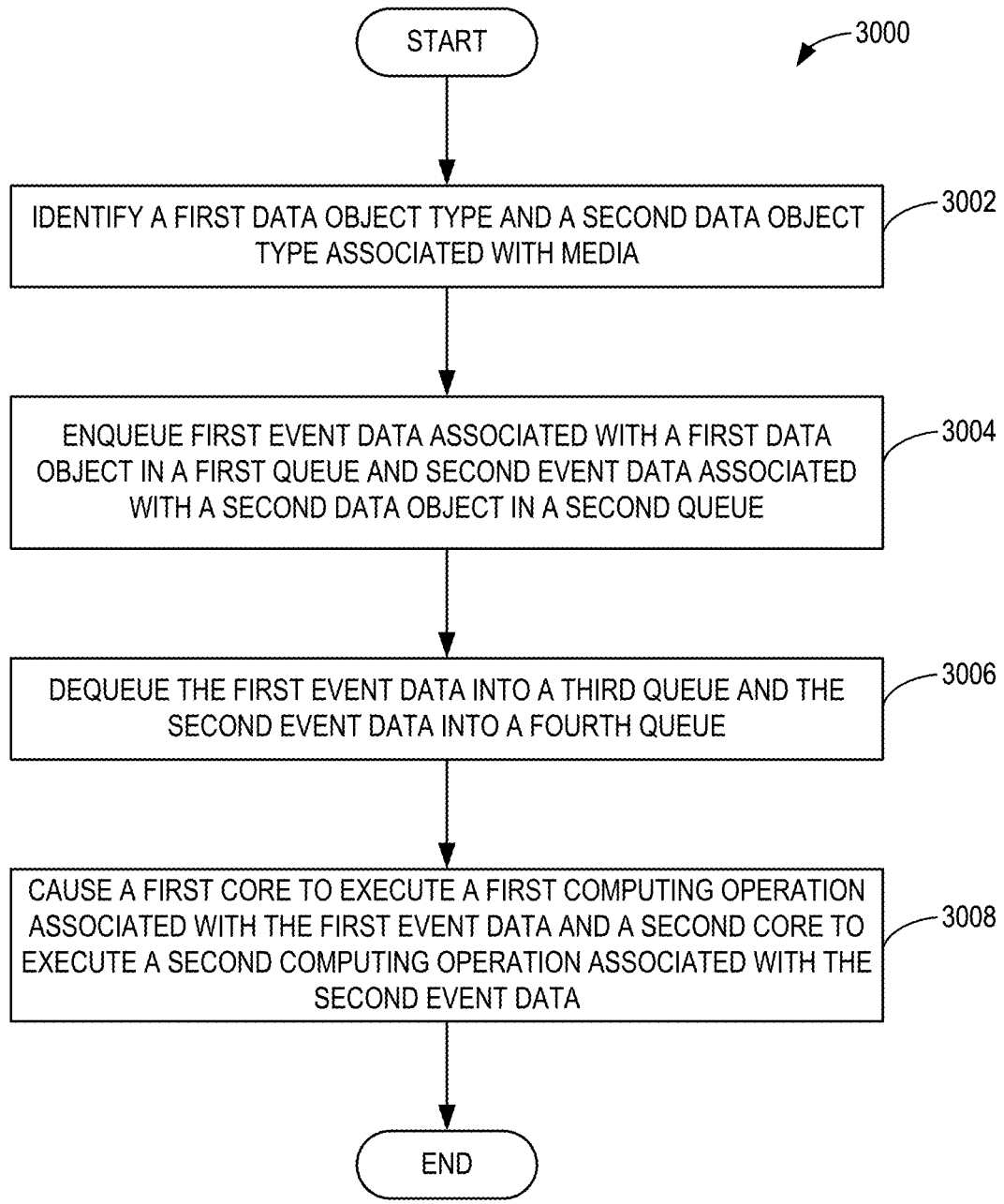
FIG. 30 is a flowchart representative of example machine-readable instructions and/or example operations that may be executed and/or instantiated by processor circuitry to implement the example request handler circuitry of FIGS. 1 and/or 2 and/or the example DLB circuitry of FIGS. 1, 6, and/or 7 to execute webserver requests.

FIG. 30 is a flowchart representative of example machine-readable instructions and/or example operations 3000 that may be executed and/or instantiated by processor circuitry to implement the example request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 to execute webserver requests. The example machine-readable instructions and/or the example operations 3000 of FIG. 30 begin at block 3002, at which the request handler circuitry 104 identifies a first data object type and a second data object type associated with media. For example, the interface circuitry 210 (FIG. 2) can receive one of the media requests 272 (FIG. 2) from the first web application 126 of the first client device 124. In some examples, the object parser circuitry 220 (FIG. 2) can segment the one of the media requests 272 into a plurality of objects, such as an audio object, a video object, and a text object. In some examples, the object type identification circuitry 230 (FIG. 2) can identify and/or determine that the one of the media requests 272 includes the audio object, the video object, and the text object.

At block 3004, the request handler circuitry 104 enqueues first event data associated with a first data object in a first queue and second event data associated with a second data object in a second queue. For example, the priority determination circuitry 240 (FIG. 2) can enqueue first event data associated with the video object in the first queue 414, second event data associated with the audio object in the second queue 416, and/or third event data associated with the text object in the third queue 418.

At block 3006, the request handler circuitry 104 dequeues the first event data into a third queue and the second event data into a fourth queue. For example, the priority determination circuitry 240 can dequeue and/or cause the dequeuing of the first event data into the first consumer queue 420, the second event data into the second consumer queue 422, and/or the third event data into the third consumer queue 424. In some examples, the priority determination circuitry 240 can cause the DLB circuitry 106 to dequeue and/or cause the dequeuing of the first event data into the first consumer queue 420, the second event data into the second consumer queue 422, and/or the third event data into the third consumer queue 424.

At block 3008, the request handler circuitry 104 causes a first core to execute a first computing operation associated with the first event data and a second core to execute a second computing operation associated with the second event data. For example, the response generation circuitry 260 (FIG. 2) and/or the DLB circuitry 106 can cause a first core of processor circuitry, such as the first processor circuitry 108 of FIG. 1, to retrieve video data associated with the video object from a host of the video data. In some examples, the response generation circuitry 260 and/or the DLB circuitry 106 can cause a second core of the processor circuitry to retrieve audio data associated with the audio object from a host of the audio data. In some examples, the response generation circuitry 260 and/or the DLB circuitry 106 can cause a third core of the processor circuitry to retrieve text data associated with the text object from a host of the text data. In some examples, after the retrieval of the video, audio, and text data, the response generation circuitry 260 can cause transmission of the video, audio, and text data to the first web application 126 for presentation on the first client device 124. In some examples, the first core and the second core of the processor circuitry can be associated with a satellite, such as the satellite 2901 of FIGS. 29A-29D. For example, the processor circuitry can be in a payload and/or otherwise included in the satellite 2901. In some examples, the first core and the second core of the processor circuitry can be associated with an in-orbits system, such as the satellite 2901 of FIGS. 29A-29D. In some examples, the first core and the second core of the processor circuitry can be associated with an on-ground system. For example, the processor circuitry can be included in the vRAN-DU On Ground 2940, the vRAN-CU 2950, etc., and/or any combination(s) thereof. In some examples, the first core and the second core can be in different hardware. For example, the first core can be included in first processor circuitry of the satellite 2901, the vRAN-DU On Ground 2940, the vRAN-CU 2950, etc., and the second core can be included in second processor circuitry of the satellite 2901, the vRAN-DU On Ground 2940, the vRAN-CU 2950, etc. In some examples, the first core and/or the second core can be associated with a terrestrial system, such as the satellite edge equipment 2920A, the RRU 2930, the vRAN-DU On Ground 2940, the vRAN-CU 2950, and/or the core network 2960. In some examples, the first core and/or the second core can be associated with a non-terrestrial system, such as the satellite 2901. After causing a first core to execute a first computing operation associated with the first event data and a second core to execute a second computing operation associated with the second event data at block 3008, the example machine-readable instructions and/or the example operations 3000 of FIG. 30 conclude.

Figure 31:
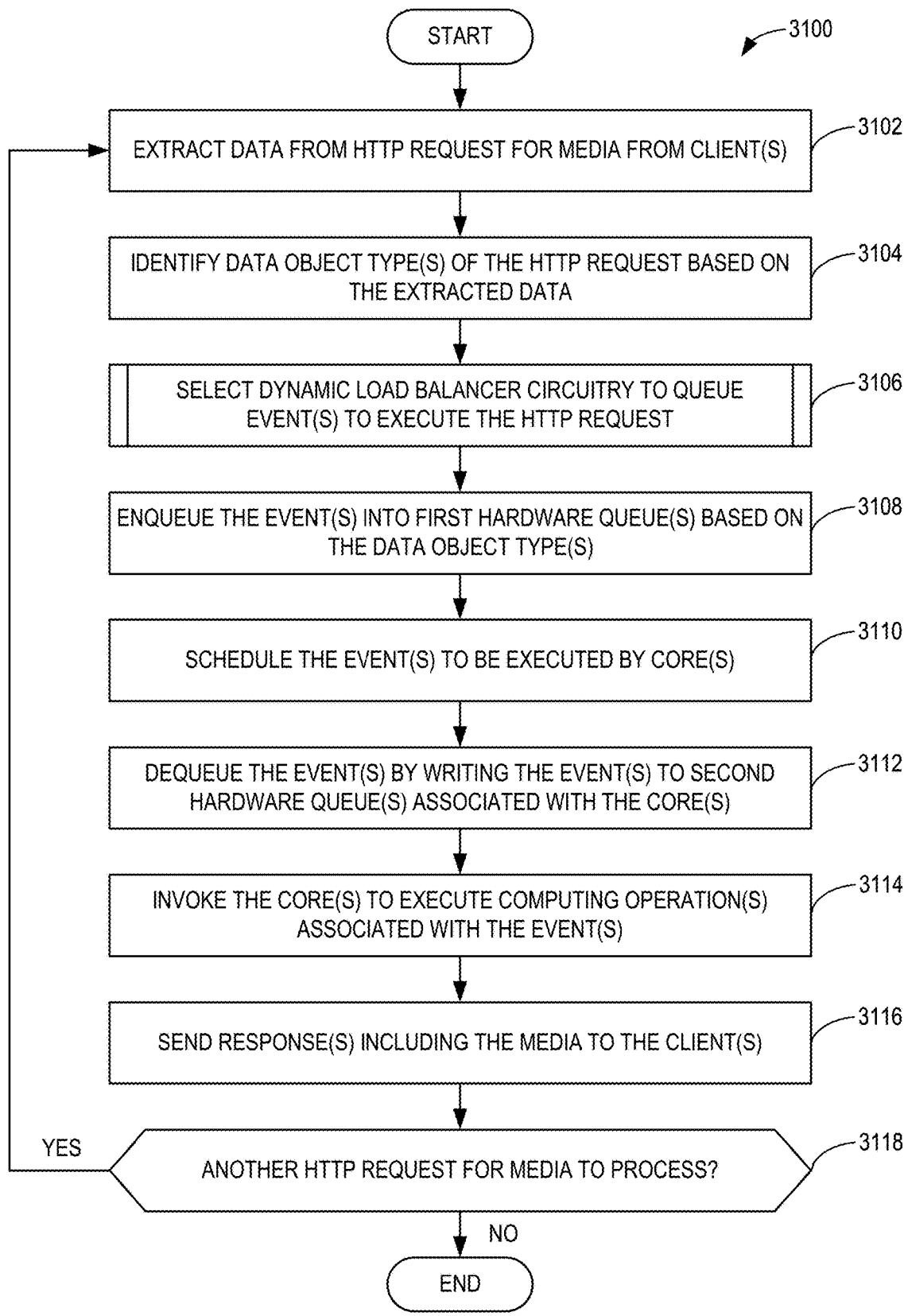
FIG. 31 is another flowchart representative of example machine-readable instructions and/or example operations that may be executed and/or instantiated by processor circuitry to implement the example request handler circuitry of FIGS. 1 and/or 2 and/or the example DLB circuitry of FIGS. 1, 6, and/or 7 to execute webserver requests.

FIG. 31 is a flowchart representative of example machine-readable instructions and/or example operations 3100 that may be executed and/or instantiated by processor circuitry to implement the example request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 to execute webserver requests. The example machine-readable instructions and/or the example operations 3100 of FIG. 31 begin at block 3102, at which the request handler circuitry 104 extracts data from an HTTP request for media from client(s). For example, the interface circuitry 210 (FIG. 2) can receive an HTTP GET request for the media 120 from one of the client devices 124, 128, 132 and store the HTTP GET request as one of the request(s) 118 of FIG. 1 and/or the media requests 272 (FIG. 2). In some examples, the media 120 is multimedia, which can include two or more different types of media objects, data objects, etc. In some examples, the object parser circuitry 220 (FIG. 2) can extract one or more data headers, one or more data payloads, etc., from the received one of the request(s) 118 and/or the media requests 272.

At block 3104, the request handler circuitry 104 identifies data object type(s) of the HTTP request based on the extracted data. For example, the object type identification circuitry 230 (FIG. 2) can extract a first object of a video object type, a second object of an audio object type, and a third object of a text object type from the HTTP GET request based on the one or more extracted data headers, the one or more extracted data payloads, etc.

At block 3106, the request handler circuitry 104 selects Dynamic Load Balancer circuitry to queue event(s) to execute the HTTP request. For example, the load balancer selection circuitry 250 (FIG. 2) can select the DLB circuitry 106 of the first processor circuitry 108 of FIG. 1 to execute the HTTP request. In some examples, the load balancer selection circuitry 250 can select the DLB circuitry 106 of the first processor circuitry 108 based on the proximity data 278 (FIG. 2). Example machine-readable instructions and/or example operations that may be executed and/or instantiated by processor circuitry to implement block 3106 are discussed below in connection with FIG. 32.

At block 3108, the request handler circuitry 104 enqueues the event(s) into first hardware queue(s) based on the data object type(s). For example, the priority determination circuitry 240 (FIG. 2) can cause and/or invoke the DLB circuitry 106 to enqueue first event data corresponding to the video object in the first queue 414, second event data corresponding to the audio object in the second queue 416, and third event data corresponding to the text object in the third queue 418.

At block 3110, the request handler circuitry 104 schedules the event(s) to be executed by core(s). For example, the priority determination circuitry 240 can cause the DLB circuitry 106 to schedule the event(s) to be executed by one or more second cores (e.g., worker cores) of the first processor circuitry 108. For example, the DLB circuitry 106 can schedule the event(s) by identifying the video object to be dequeued to the first consumer queue 420, the audio object to be dequeued to the second consumer queue 422, and the text object to be dequeued to the third consumer queue 424.

At block 3112, the request handler circuitry 104 dequeues the event(s) by writing the event(s) to second hardware queue(s) associated with the core(s). For example, the priority determination circuitry 240 (FIG. 2) can cause and/or invoke the DLB circuitry 106 to dequeue the event(s) by writing the event(s) to consumer queue(s) associated with the one or more second cores. In some examples, the DLB circuitry 106 can dequeue the video object from the first queue 414 to the first consumer queue 420. In some examples, the DLB circuitry 106 can dequeue the audio object from the second queue 416 to the second consumer queue 422. In some examples, the DLB circuitry 106 can dequeue the text object from the third queue 418 to the third consumer queue 424.

At block 3114, the request handler circuitry 104 invokes the core(s) to execute computing operation(s) associated with the event(s). For example, the interface circuitry 210 (FIG. 2) can request and/or retrieve the video object, the audio object, and/or the text object from the first media provider 138 and/or the second media provider 140 and store the objects as the media 120. In some examples, the response generation circuitry 260 (FIG. 2) can package, assemble, and/or otherwise compile the media 120 into one or more HTTP responses (e.g., one(s) of the media responses 276) to the requesting one of the client devices 124, 128, 132.

At block 3116, the request handler circuitry 104 sends response(s) including the media to the client(s). For example, the interface circuitry 210 can transmit the one or more HTTP responses to the requesting one of the client devices 124, 128, 132. In some examples, the requesting one of the client devices 124, 128, 132 can execute and/or instantiate the one or more HTTP responses to present the media 120, such as multimedia, on display device(s) of the requesting one of the client devices 124, 128, 132.

At block 3118, the request handler circuitry 104 determines whether there is another HTTP request for media to process. For example, the interface circuitry 210 can determine that another one of the request(s) 118 and/or the media requests 272 is received. If, at block 3118, the request handler circuitry 104 determines that there is another HTTP request for media to process, control returns to block 3102. Otherwise, the example machine-readable instructions and/or the example operations 3100 of FIG. 31 conclude.

Figure 32:
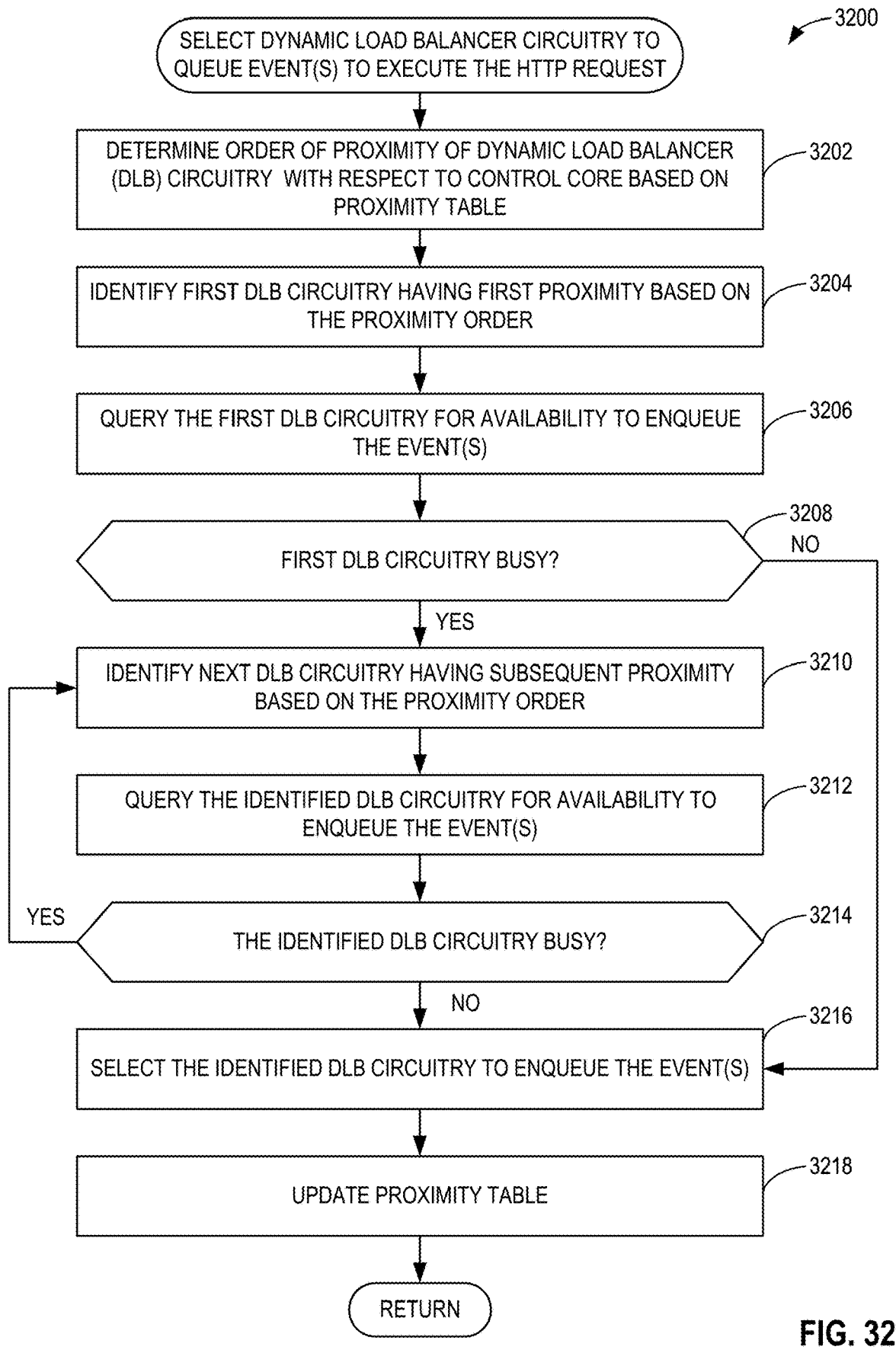
FIG. 32 is a flowchart representative of example machine-readable instructions and/or example operations that may be executed and/or instantiated by processor circuitry to implement the example request handler circuitry of FIGS. 1 and/or 2 and/or the example DLB circuitry of FIGS. 1, 6, and/or 7 to select dynamic load balancer circuitry to queue event(s) to execute example HTTP request(s).

FIG. 32 is a flowchart representative of example machine-readable instructions and/or example operations 3200 that may be executed and/or instantiated by processor circuitry to implement the example request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 to select dynamic load balancer circuitry to queue event(s) to execute example HTTP request(s). The example machine-readable instructions and/or the example operations 3200 of FIG. 32 may be executed and/or instantiated by processor circuitry to implement block 3106 of the example machine-readable instructions and/or the example operations 3100 of FIG. 31. The example machine-readable instructions and/or example operations 3200 of FIG. 32 begin at block 3202, at which the request handler circuitry 104 determines an order of proximity of Dynamic Load Balancer (DLB) circuitry with respect to a control core based on a proximity table. For example, the control core can be a first one of the cores 602 of FIG. 6. In some examples, the load balancer selection circuitry 250 (FIG. 2) can determine that first DLB circuitry of the accelerators 616 of FIG. 6 on the same tile as the first core is closest to the first core, second DLB circuitry of the accelerators 616 of FIG. 6 on a different tile than the first core is next closest to the first core, and third DLB circuitry of the accelerators 616 of FIG. 6 on a different socket than the first core is next closest to the first core. In some examples, the load balancer selection circuitry 250 can determine the proximities based on proximity information stored in a proximity table, which can be implemented by and/or included in the proximity data 278 (FIG. 2). In some examples, the proximity table can be stored in cache memory associated with the first core.

At block 3204, the request handler circuitry 104 identifies first DLB circuitry having a first proximity based on the proximity order. For example, the load balancer selection circuitry 250 can identify the first DLB circuitry of the accelerators 616 of FIG. 6 based on the proximity table.

At block 3206, the request handler circuitry 104 queries the first DLB circuitry for availability to enqueue the event(s). For example, the load balancer selection circuitry 250 can query the first DLB circuitry for availability to enqueue the event(s).

At block 3208, the request handler circuitry 104 determines whether the first DLB circuitry is busy. For example, the load balancer selection circuitry 250 can determine that the first DLB circuitry is not available to enqueue the event(s) in response to the query.

If, at block 3208, the request handler circuitry 104 determines that the first DLB circuitry is not busy, control proceeds to block 3216 to select the identified DLB circuitry to enqueue the event(s). If, at block 3208, the request handler circuitry 104 determines that the first DLB circuitry is busy, then, at block 3210, the request handler circuitry 104 identifies a next DLB circuitry having a subsequent proximity based on the proximity order. For example, the load balancer selection circuitry 250 can identify the second DLB circuitry based on the proximity table.

At block 3212, the request handler circuitry 104 queries the identified DLB circuitry for availability to enqueue the event(s). For example, the load balancer selection circuitry 250 can query the second DLB circuitry for availability to enqueue the event(s).

At block 3214, the request handler circuitry 104 determines whether the identified DLB circuitry is busy. For example, the load balancer selection circuitry 250 can determine that the second DLB circuitry is not available to enqueue the event(s) in response to the query.

If, at block 3214, the request handler circuitry 104 determines that the identified DLB circuitry is busy, control returns to block 3210 to identify a next DLB circuitry having a subsequent proximity based on the proximity order. If, at block 3214, the request handler circuitry 104 determines that the identified DLB circuitry is not busy, then, at block 3216, the request handler circuitry 104 selects the identified DLB circuitry to enqueue the event(s). For example, the priority determination circuitry 240 (FIG. 2) can enqueue the event(s) to the second DLB circuitry after a determination that the second DLB circuitry is available to enqueue the event(s).

In response to selecting the identified DLB circuitry to enqueue the event(s) at block 3216, the request handler circuitry 104 updates the proximity table at block 3218. For example, the load balancer selection circuitry 250 can update the proximity table to indicate that the first DLB circuitry is unavailable to enqueue event(s) and/or that the second DLB circuitry is available to enqueue event(s) to reduce latency in selecting DLB circuitry for subsequent event enqueuing operations. In response to updating the proximity table at block 3218, the example machine-readable instructions and/or the example operations 3200 of FIG. 32 conclude. For example, the machine-readable instructions and/or the operations 3200 of FIG. 32 can return to block 3108 of the example machine-readable instructions and/or the example operations 3100 of FIG. 31 to enqueue the event(s) into first hardware queue(s) based on the data object type(s).

Figure 33:
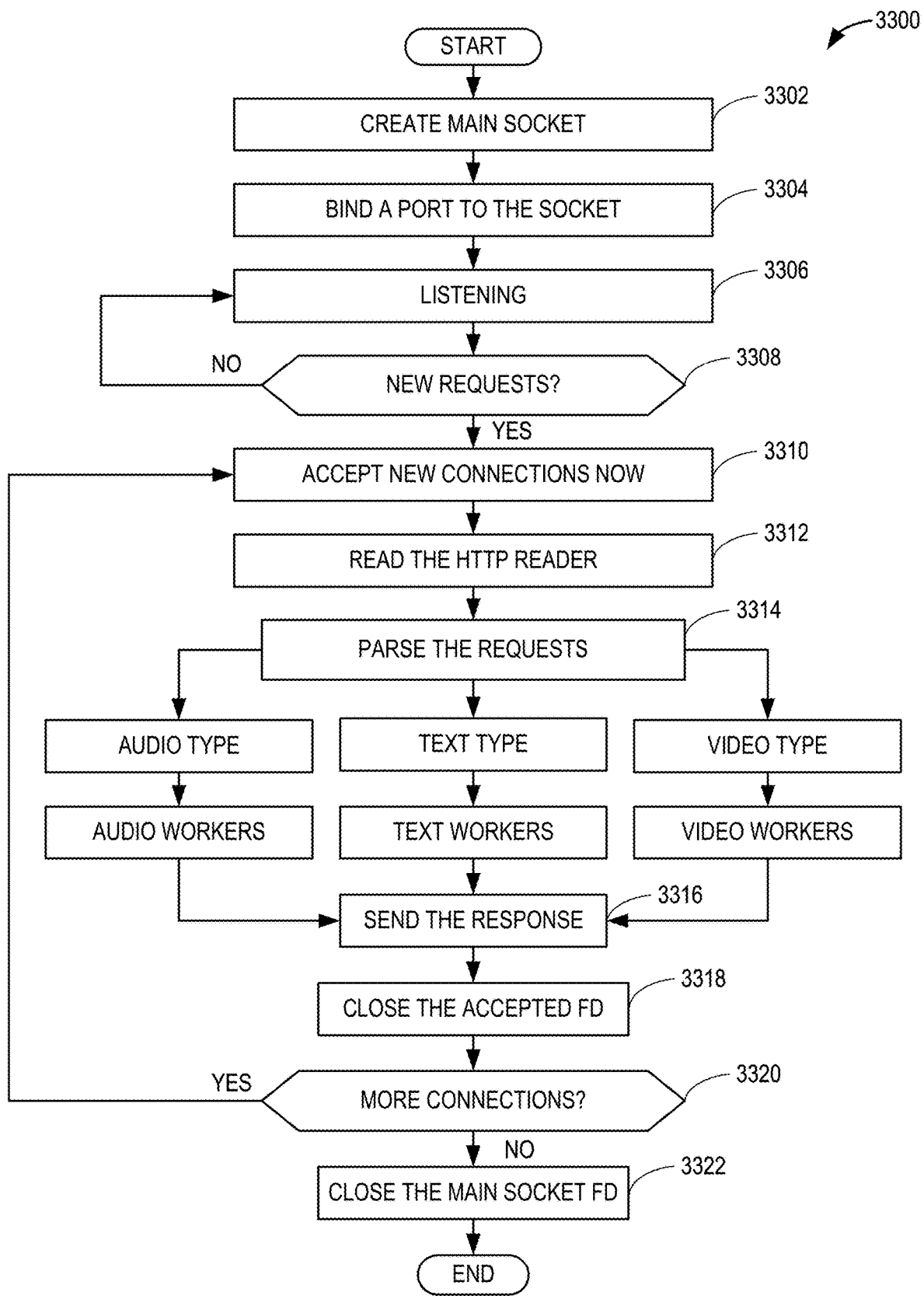
FIG. 33 is a flowchart representative of example machine-readable instructions and/or example operations that may be executed and/or instantiated by the example processor circuitry of FIG. 11 to execute webserver requests.

FIG. 33 is a flowchart representative of example machine-readable instructions and/or example operations 3200 that may be executed and/or instantiated by processor circuitry to execute webserver requests. For example, the machine-readable instructions and/or the operations 3300 of FIG. 33 may be executed and/or instantiated by the processor circuitry 1104 of FIG. 11, which may not include DLB circuitry as disclosed herein. The example machine-readable instructions and/or the example operations 3300 of FIG. 33 begin at block 3302, at which the processor circuitry 1104 can create a main socket, which may be implemented by a control core or a control thread. The processor circuitry 1104 can bind a port to the main socket at block 3304. At block 3306, the processor circuitry 1104 can listen to the port for client requests, which may be implemented by HTTP GET requests.

The processor circuitry 1104 can accept a new connection at block 3310 in response to receiving a new client request at block 3308. If, at block 3308, the processor circuitry does not identify any new requests, control returns to block 3306 to continue listening for new requests. The processor circuitry 1104 may return a file descriptor (FD) and read an HTTP header of the client request at block 3312. The processor circuitry 1104 may parse the client request into different types (e.g., audio, text, and video types) at block 3314. The processor circuitry 1104 may send a response from worker corkers (e.g., audio, text, and video workers or worker cores) to the requesting client at block 3316. The processor circuitry 1104 may close the accept file descriptor at block 3318 and determine whether there are additional connections at block 3320. If, at block 3320, the processor circuitry 1104 determines there more connections, control returns to block 3310. In response to determining that there are no additional connections, the processor circuitry 1104 may close the main socket file descriptor at block 3322 to cause the example machine-readable instructions and/or the example operations 3300 of FIG. 33 to conclude.

Figure 34:
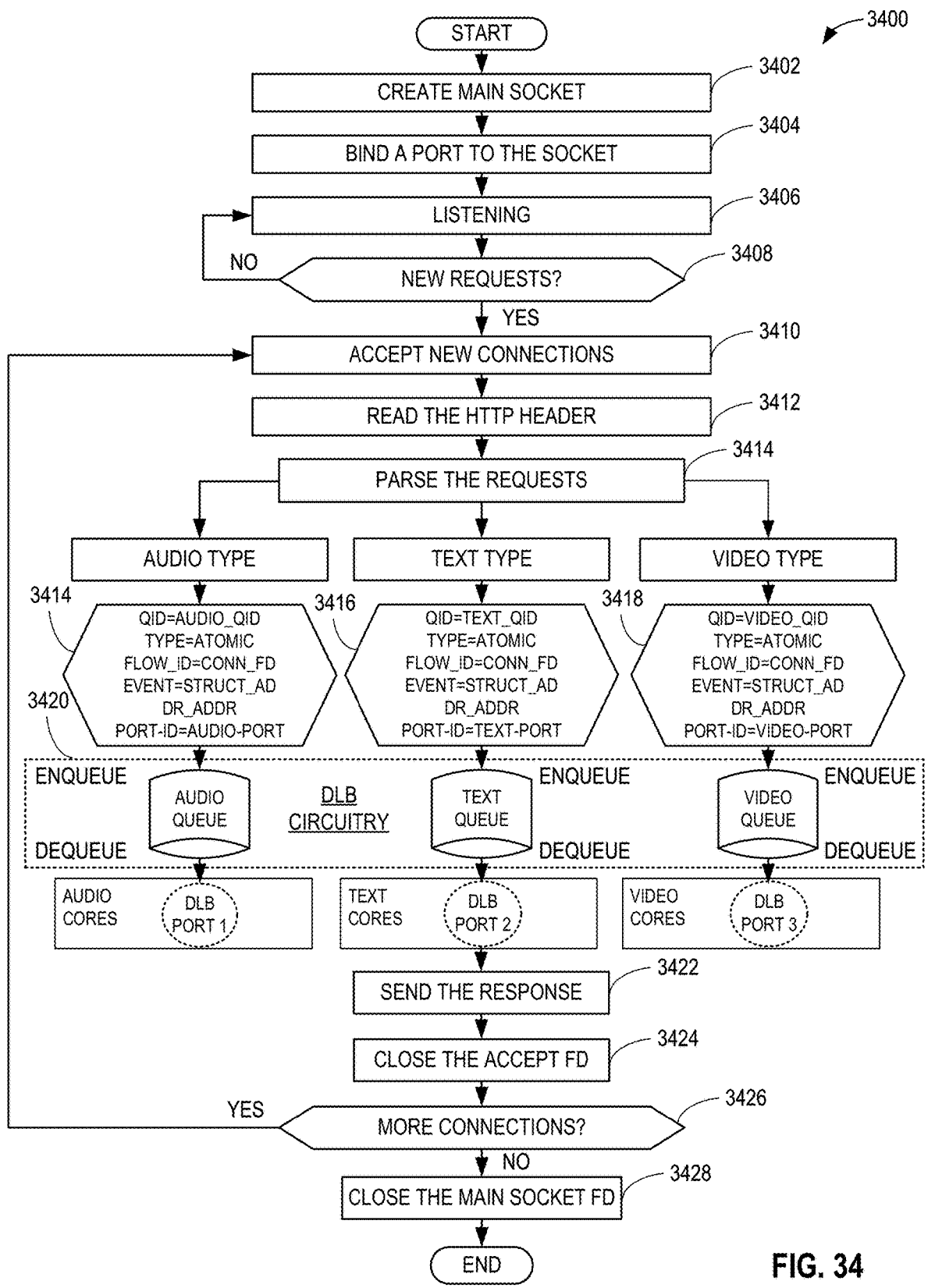
FIG. 34 is a flowchart representative of example machine-readable instructions and/or example operations that may be executed and/or instantiated by processor circuitry to implement the example request handler circuitry of FIGS. 1 and/or 2 and/or the example DLB circuitry of FIGS. 1, 6, and/or 7 to execute webserver requests.

FIG. 34 is a flowchart representative of example machine-readable instructions and/or example operations 3400 that may be executed and/or instantiated by processor circuitry to implement the example request handler circuitry 104 of FIGS. 1, 2, and/or 4, the DLB circuitry 106 of FIGS. 1, 3, and/or 4, the DLB circuitry 502, 504 of FIG. 5, the accelerators 616 of FIG. 6, the accelerators 716 of FIG. 7, and/or the DLB circuitry 1008 of FIG. 10 to execute webserver requests. The example machine-readable instructions and/or the example operations 3400 of FIG. 34 begin at block 3402, at which the request handler circuitry 104 creates a main socket, which can be implemented by a control core or a control thread. At block 3404, the request handler circuitry 104 binds a port to the main socket. At block 3406, the request handler circuitry 104 listens to the port for client requests, which can be implemented by HTTP GET requests.

At block 3408, the request handler circuitry 104 determines whether new requests have been received. If, at block 3408, the request handler circuitry 104 determines that there are no new requests, control returns to block 3406. Otherwise, control proceeds to block 3410. At block 3410, the request handler circuitry 104 accepts a new connection in response to receiving a new client request.

At block 3412, the request handler circuitry 104 reads the HTTP header of the request. For example, the request handler circuitry 104 can return a file descriptor (FD) and read an HTTP header of the client request. At block 3414, the request handler circuitry 104 parses the client request into different types (e.g., audio, text, and video types).

At blocks 3414, 3416, 3418, the request handler circuitry 104 causes DLB operations to occur. For example, at block 3414, the request handler circuitry 104 can enqueue first pointer(s) associated with the audio type to a queue of the DLB circuitry 106 that has a QID of AUDIO_QID based on atomic scheduling (e.g., TYPE=ATOMIC). The request handler circuitry 104 can assign a flow identifier of CONN_FD to the first pointer(s), an event identifier of STRUCT_ADDR to the first pointer(s), and a port identifier of AUDIO_PORT to the first pointer(s).

At block 3416, the request handler circuitry 104 can enqueue second pointer(s) associated with the text type to a queue of the DLB circuitry 106 that has a QID of TEXT_QID based on atomic scheduling (e.g., TYPE=ATOMIC). The request handler circuitry 104 can assign a flow identifier of CONN_FD to the second pointer(s), an event identifier of STRUCT_ADDR_ADDR to the second pointer(s), and a port identifier of TEXT_PORT to the second pointer(s).

At block 3418, the request handler circuitry 104 can enqueue third pointer(s) associated with the video type to a queue of the DLB circuitry 106 that has a QID of VIDEO_QID based on atomic scheduling (e.g., TYPE=ATOMIC). The request handler circuitry 104 can assign a flow identifier of CONN_FD to the third pointer(s), an event identifier of STRUCT_ADDR_ADDR to the third pointer(s), and a port identifier of VIDEO_PORT to the third pointer(s).

At block 3420, the request handler circuitry 104 can cause enqueuing and dequeuing operations to occur. For example, the request handler circuitry 104 can enqueue the first pointer(s) to a first queue (identified by AUDIO QUEUE), the second pointer(s) to a second queue (identified by TEXT QUEUE), and the third pointer(s) to a third queue (identified by VIDEO QUEUE) of the DLB circuitry 106. The DLB circuitry 106 can dequeue the first pointer(s) to first cores (identified by AUDIO CORES), second pointer(s) to second cores (identified by TEXT CORES), and third pointer(s) to third worker cores (identified by VIDEO CORES). For example, the first through third cores can be cores of one or more of the processor circuitry 108, 110, 112 of FIG. 1. In some examples, the first through third cores can process the data associated with the pointer(s) and send a response to the requesting client based on the processed data.

At block 3422, the request handler circuitry 104 can close the accept file descriptor. At block 3424, the request handler circuitry 104 can determine whether there are additional connections. If, at block 3426, the request handler circuitry 104 determines that there are more connections, control returns to block 3410. Otherwise, control proceeds to block 3428. In response to determining that there are no additional connections at block 3426, the request handler circuitry 104 can close the main socket file descriptor at block 3428. After closing the main socket file descriptor at block 3428, the example machine-readable instructions and/or the example operations 3400 of FIG. 34 conclude.

Figure 35:
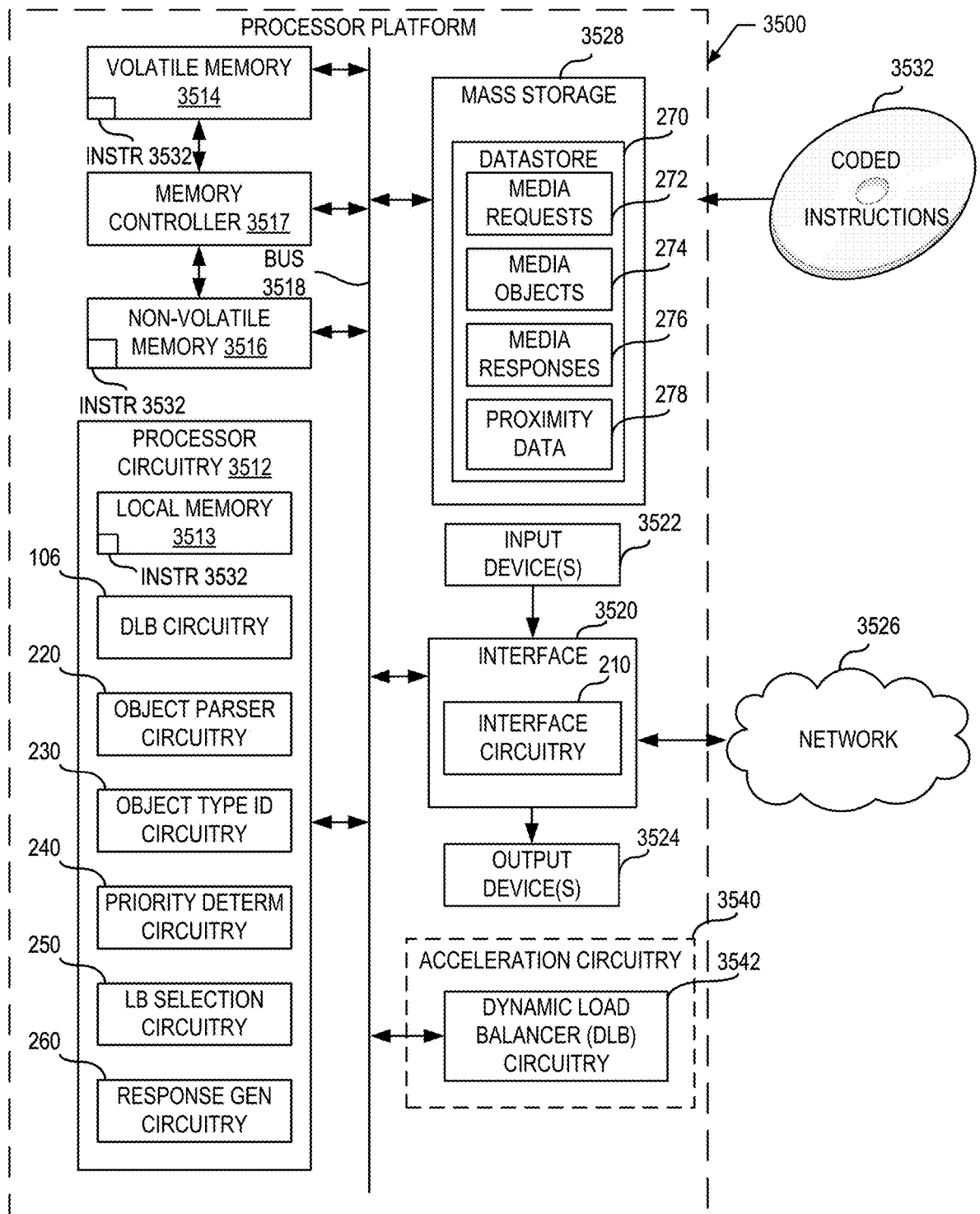
FIG. 35 is a block diagram of an example processing platform including processor circuitry structured to execute the example machine-readable instructions and/or the example operations of FIGS. 30, 31, 32, 33, and/or 34 to implement the example request handler circuitry of FIGS. 1 and/or 2 and/or the example DLB circuitry of FIGS. 1, 6, and/or 7.

FIG. 35 is a block diagram of an example processor platform 3500 structured to execute and/or instantiate the example machine-readable instructions and/or the example operations of FIGS. 13, 14, 30, 31, 32, 33, and/or 34 to implement the example request handler circuitry 104 of FIGS. 1, 2, and/or 4, the example DLB circuitry 106 of FIGS. 1, 3, and/or 4, the example DLB circuitry 502, 504 of FIG. 5, the example accelerators 616 of FIG. 6, the example accelerators 716 of FIG. 7, and/or the example DLB circuitry 1008 of FIG. 10. The processor platform 3500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, an IoT device, a satellite, a personal video recorder, a set top box, a headset (e.g., an augmented reality (AR) headset, a virtual reality (VR) headset, etc.) or other wearable device, or any other type of computing and/or electronic device.

The processor platform 3500 of the illustrated example includes processor circuitry 3512. The processor circuitry 3512 of the illustrated example is hardware. For example, the processor circuitry 3512 can be implemented by one or more integrated circuits, logic circuits, FPGAs microprocessors, CPUs, GPUs, DSPs, and/or microcontrollers from any desired family or manufacturer. The processor circuitry 3512 may be implemented by one or more semiconductor based (e.g., silicon based) devices. In this example, the processor circuitry 3512 implements the example DLB circuitry 106 of FIGS. 1, 3, and/or 4. In this example, the processor circuitry 3512 implements the example object parser circuitry 220, the example object type identification circuitry 230 (identified by OBJECT TYPE ID CIRCUITRY), the example priority determination circuitry 240 (identified by PRIORITY DETERM CIRCUITRY), the example load balancer selection circuitry 250 (identified by LB SELECTION CIRCUITRY), and the example response generation circuitry 260 (identified by RESPONSE GEN CIRCUITRY) of FIG. 2.

The processor circuitry 3512 of the illustrated example includes a local memory 3513 (e.g., a cache, registers, etc.). The processor circuitry 3512 of the illustrated example is in communication with a main memory including a volatile memory 3514 and a non-volatile memory 3516 by a bus 3518. In some examples, the bus 3518 implements the bus 280 of FIG. 2. The volatile memory 3514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 3516 may be implemented by flash memory and/or any other desired type of memory device. Access to the main memory 3514, 3516 of the illustrated example is controlled by a memory controller 3517.

The processor platform 3500 of the illustrated example also includes interface circuitry 3520. In this example, the interface circuitry 3520 implements the example interface circuitry 210 of FIG. 2. The interface circuitry 3520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 3522 are connected to the interface circuitry 3520. The input device(s) 3522 permit(s) a user to enter data and/or commands into the processor circuitry 3512. The input device(s) 3522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 3524 are also connected to the interface circuitry 3520 of the illustrated example. The output device(s) 3524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 3520 of the illustrated example, thus, typically includes a graphics driver card, a graphics driver chip, and/or graphics processor circuitry such as a GPU.

The interface circuitry 3520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 3526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 3500 of the illustrated example also includes one or more mass storage devices 3528 to store software and/or data. Examples of such mass storage devices 3528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 3528 implement the example datastore 270 of FIG. 2, which includes the example media requests 272, the example media objects 274, the example media responses 276, and the example proximity data 278 of FIG. 2.

The machine executable instructions 3532, which may be implemented by the example machine-readable instructions of FIGS. 13, 14, 30, 31, 32, 33, and/or 34, may be stored in the mass storage device 3528, in the volatile memory 3514, in the non-volatile memory 3516, and/or on a removable non-transitory computer-readable storage medium such as a CD or DVD.

Figure 36:
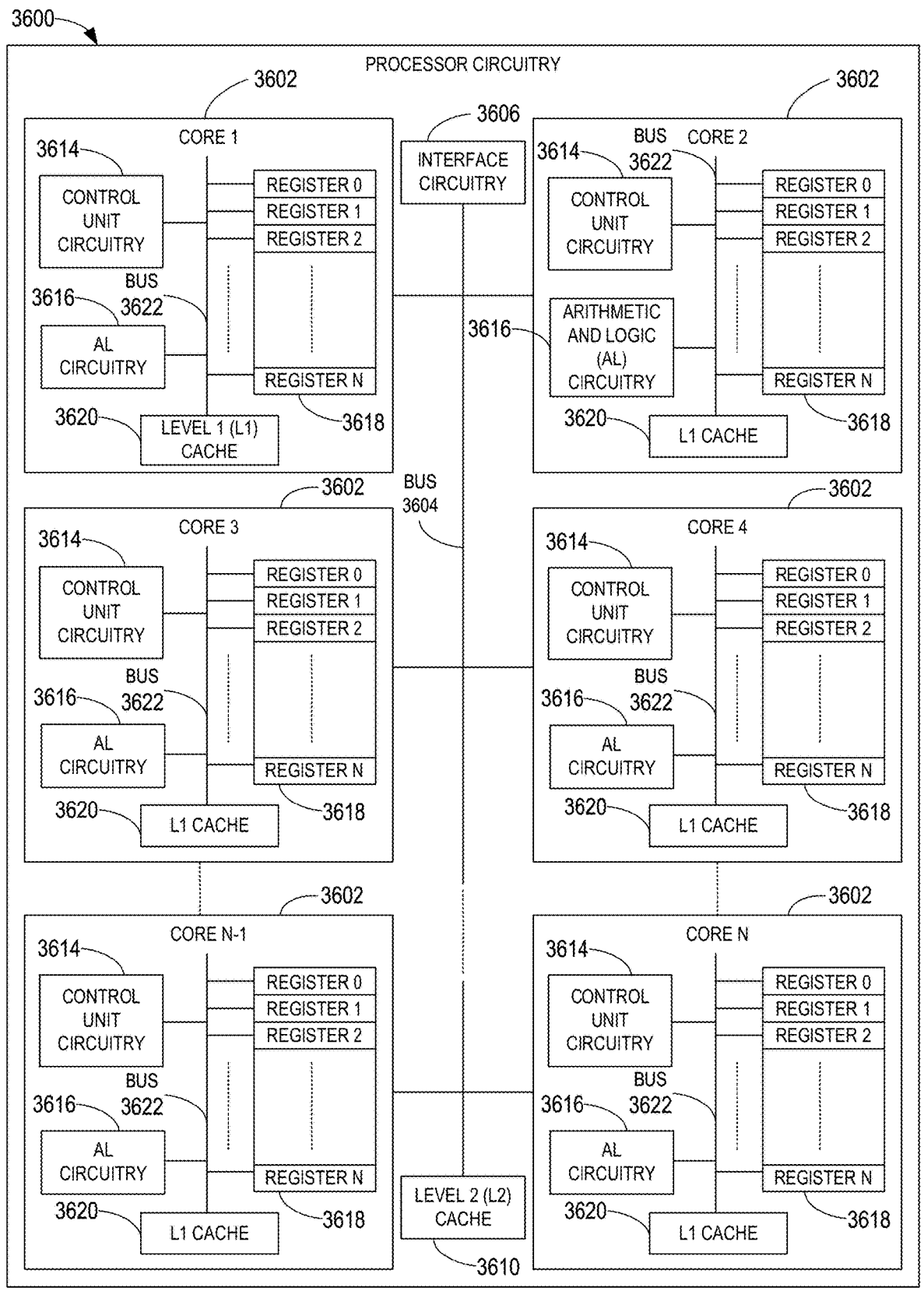
FIG. 36 is a block diagram of an example implementation of the processor circuitry of FIG. 35.

FIG. 36 is a block diagram of an example implementation of the processor circuitry 3512 of FIG. 35. In this example, the processor circuitry 3512 of FIG. 35 is implemented by a general purpose microprocessor 3600. The general purpose microprocessor circuitry 3600 execute some or all of the machine-readable instructions of the data flow diagrams and/or the flowcharts of FIGS. 13, 14, 30, 31, 32, 33, and/or 34 to effectively instantiate the request handler circuitry 104 of FIGS. 1, 2, and/or 4, the example DLB circuitry 106 of FIGS. 1, 3, and/or 4, the example DLB circuitry 502, 504 of FIG. 5, the example accelerators 616 of FIG. 6, the example accelerators 716 of FIG. 7, and/or the example DLB circuitry 1008 of FIG. 10 as logic circuits to perform the operations corresponding to those machine-readable instructions. For example, the microprocessor 3600 may implement multi-core hardware circuitry such as a CPU, a DSP, a GPU, an XPU, etc. Although it may include any number of example cores 3602 (e.g., 1 core), the microprocessor 3600 of this example is a multi-core semiconductor device including N cores. The cores 3602 of the microprocessor 3600 may operate independently or may cooperate to execute machine-readable instructions. For example, machine code corresponding to a firmware program, an embedded software program, or a software program may be executed by one of the cores 3602 or may be executed by multiple ones of the cores 3602 at the same or different times. In some examples, the machine code corresponding to the firmware program, the embedded software program, or the software program is split into threads and executed in parallel by two or more of the cores 3602. The software program may correspond to a portion or all of the machine-readable instructions and/or the operations represented by the data flow diagrams and/or the flowcharts of FIGS. 13, 14, 30, 31, 32, 33, and/or 34.

The cores 3602 may communicate by a first example bus 3604. In some examples, the first bus 3604 may implement a communication bus to effectuate communication associated with one(s) of the cores 3602. For example, the first bus 3604 may implement at least one of an Inter-Integrated Circuit (I2C) bus, a Serial Peripheral Interface (SPI) bus, a PCI bus, or a PCIe bus. Additionally or alternatively, the first bus 3604 may implement any other type of computing or electrical bus. The cores 3602 may obtain data, instructions, and/or signals from one or more external devices by example interface circuitry 3606. The cores 3602 may output data, instructions, and/or signals to the one or more external devices by the interface circuitry 3606. Although the cores 3602 of this example include example local memory 3620 (e.g., Level 1 (L1) cache that may be split into an L1 data cache and an L1 instruction cache), the microprocessor 3600 also includes example shared memory 3610 that may be shared by the cores (e.g., Level 2 (L2_cache)) for high-speed access to data and/or instructions. Data and/or instructions may be transferred (e.g., shared) by writing to and/or reading from the shared memory 3610. The local memory 3620 of each of the cores 3602 and the shared memory 3610 may be part of a hierarchy of storage devices including multiple levels of cache memory and the main memory (e.g., the main memory 3514, 3516 of FIG. 35). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 3602 may be referred to as a CPU, DSP, GPU, etc., or any other type of hardware circuitry. Each core 3602 includes control unit circuitry 3614, arithmetic and logic (AL) circuitry (sometimes referred to as an ALU) 3616, a plurality of registers 3618, the L1 cache 3620, and a second example bus 3622. Other structures may be present. For example, each core 3602 may include vector unit circuitry, single instruction multiple data (SIMD) unit circuitry, load/store unit (LSU) circuitry, branch/jump unit circuitry, floating-point unit (FPU) circuitry, etc. The control unit circuitry 3614 includes semiconductor-based circuits structured to control (e.g., coordinate) data movement within the corresponding core 3602. The AL circuitry 3616 includes semiconductor-based circuits structured to perform one or more mathematic and/or logic operations on the data within the corresponding core 3602. The AL circuitry 3616 of some examples performs integer based operations. In other examples, the AL circuitry 3616 also performs floating point operations. In yet other examples, the AL circuitry 3616 may include first AL circuitry that performs integer based operations and second AL circuitry that performs floating point operations. In some examples, the AL circuitry 3616 may be referred to as an Arithmetic Logic Unit (ALU). The registers 3618 are semiconductor-based structures to store data and/or instructions such as results of one or more of the operations performed by the AL circuitry 3616 of the corresponding core 3602. For example, the registers 3618 may include vector register(s), SIMD register(s), general purpose register(s), flag register(s), segment register(s), machine specific register(s), instruction pointer register(s), control register(s), debug register(s), memory management register(s), machine check register(s), etc. The registers 3618 may be arranged in a bank as shown in FIG. 36. Alternatively, the registers 3618 may be organized in any other arrangement, format, or structure including distributed throughout the core 3602 to shorten access time. The second bus 3622 may implement at least one of an I2C bus, a SPI bus, a PCI bus, or a PCIe bus Each core 3602 and/or, more generally, the microprocessor 3600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 3600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 37:
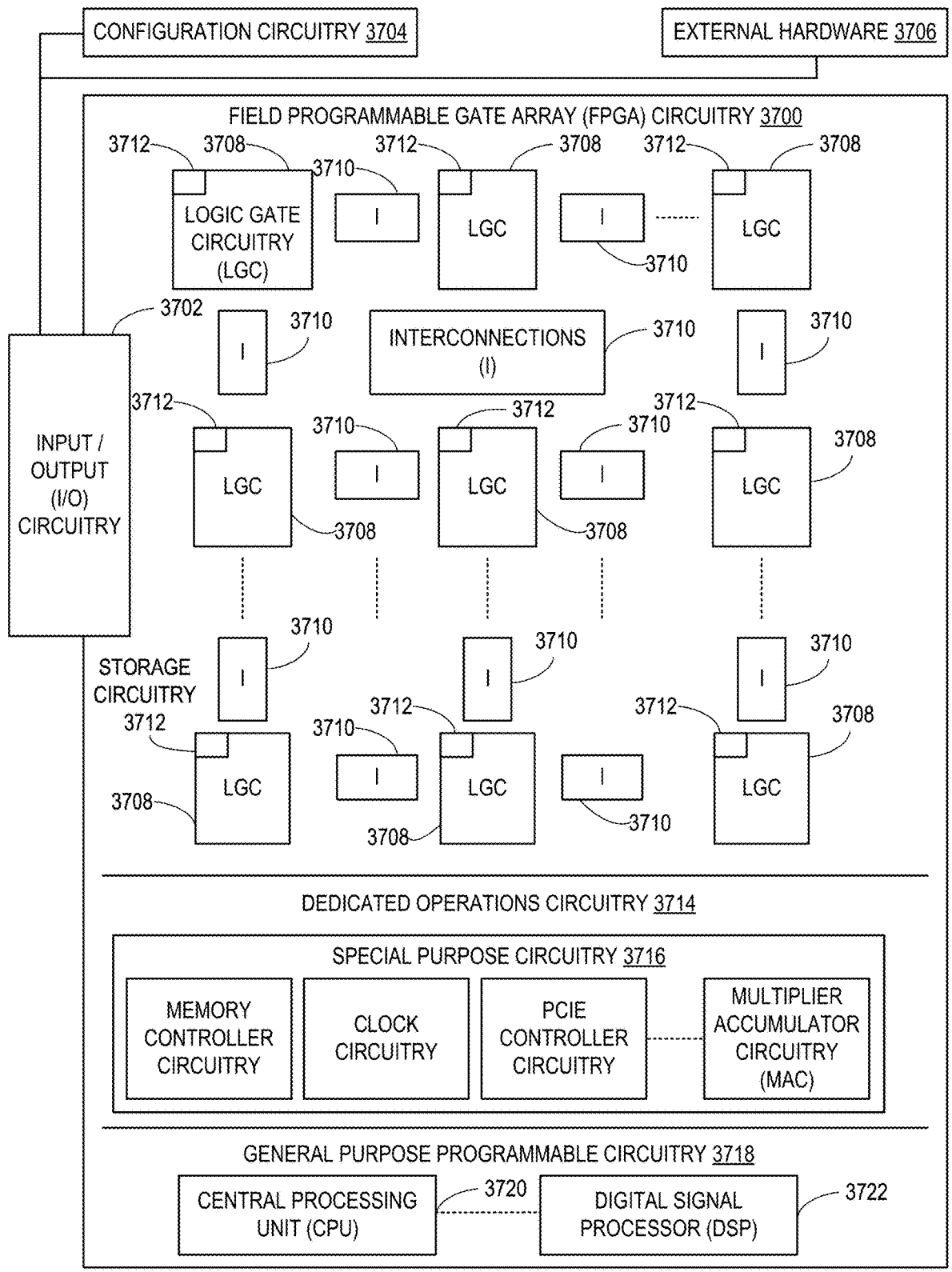
FIG. 37 is a block diagram of another example implementation of the processor circuitry of FIG. 35.

FIG. 37 is a block diagram of another example implementation of the processor circuitry 3512 of FIG. 35. In this example, the processor circuitry 3512 is implemented by FPGA circuitry 3700. The FPGA circuitry 3700 can be used, for example, to perform operations that could otherwise be performed by the example microprocessor 3600 of FIG. 36 executing corresponding machine-readable instructions. However, once configured, the FPGA circuitry 3700 instantiates the machine-readable instructions in hardware and, thus, can often execute the operations faster than they could be performed by a general purpose microprocessor executing the corresponding software.

More specifically, in contrast to the microprocessor 3600 of FIG. 36 described above (which is a general purpose device that may be programmed to execute some or all of the machine-readable instructions represented by the data flow diagrams and/or the flowcharts of FIGS. 13, 14, 30, 31, 32, 33, and/or 34 but whose interconnections and logic circuitry are fixed once fabricated), the FPGA circuitry 3700 of the example of FIG. 37 includes interconnections and logic circuitry that may be configured and/or interconnected in different ways after fabrication to instantiate, for example, some or all of the machine-readable instructions represented by the data flow diagrams and/or the flowcharts of FIGS. 13, 14, 30, 31, 32, 33, and/or 34. In particular, the FPGA 3700 may be thought of as an array of logic gates, interconnections, and switches. The switches can be programmed to change how the logic gates are interconnected by the interconnections, effectively forming one or more dedicated logic circuits (unless and until the FPGA circuitry 3700 is reprogrammed). The configured logic circuits enable the logic gates to cooperate in different ways to perform different operations on data received by input circuitry. Those operations may correspond to some or all of the software represented by the data flow diagrams and/or the flowcharts of FIGS. 13, 14, 30, 31, 32, 33, and/or 34. As such, the FPGA circuitry 3700 may be structured to effectively instantiate some or all of the machine-readable instructions of the data flow diagrams and/or the flowcharts of FIGS. 13, 14, 30, 31, 32, 33, and/or 34 as dedicated logic circuits to perform the operations corresponding to those software instructions in a dedicated manner analogous to an ASIC. Therefore, the FPGA circuitry 3700 may perform the operations corresponding to the some or all of the machine-readable instructions of FIGS. 13, 14, 30, 31, 32, 33, and/or 34 faster than the general purpose microprocessor can execute the same.

In the example of FIG. 37, the FPGA circuitry 3700 is structured to be programmed (and/or reprogrammed one or more times) by an end user by a hardware description language (HDL) such as Verilog. The FPGA circuitry 3700 of FIG. 37, includes example input/output (I/O) circuitry 3702 to obtain and/or output data to/from example configuration circuitry 3704 and/or external hardware (e.g., external hardware circuitry) 3706. For example, the configuration circuitry 3704 may implement interface circuitry that may obtain machine-readable instructions to configure the FPGA circuitry 3700, or portion(s) thereof. In some such examples, the configuration circuitry 3704 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 3706 may implement the microprocessor 3600 of FIG. 36. The FPGA circuitry 3700 also includes an array of example logic gate circuitry 3708, a plurality of example configurable interconnections 3710, and example storage circuitry 3712. The logic gate circuitry 3708 and interconnections 3710 are configurable to instantiate one or more operations that may correspond to at least some of the machine-readable instructions of FIGS. 13, 14, 30, 31, 32, 33, and/or 34 and/or other desired operations. The logic gate circuitry 3708 shown in FIG. 37 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 3708 to enable configuration of the electrical structures and/or the logic gates to form circuits to perform desired operations. The logic gate circuitry 3708 may include other electrical structures such as look-up tables (LUTs), registers (e.g., flip-flops or latches), multiplexers, etc.

The interconnections 3710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 3708 to program desired logic circuits.

The storage circuitry 3712 of the illustrated example is structured to store result(s) of the one or more of the operations performed by corresponding logic gates. The storage circuitry 3712 may be implemented by registers or the like. In the illustrated example, the storage circuitry 3712 is distributed amongst the logic gate circuitry 3708 to facilitate access and increase execution speed.

The example FPGA circuitry 3700 of FIG. 37 also includes example Dedicated Operations Circuitry 3714. In this example, the Dedicated Operations Circuitry 3714 includes special purpose circuitry 3716 that may be invoked to implement commonly used functions to avoid the need to program those functions in the field. Examples of such special purpose circuitry 3716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 3700 may also include example general purpose programmable circuitry 3718 such as an example CPU 3720 and/or an example DSP 3722. Other general purpose programmable circuitry 3718 may additionally or alternatively be present such as a GPU, an XPU, etc., that can be programmed to perform other operations.

Although FIGS. 36 and 37 illustrate two example implementations of the processor circuitry 3512 of FIG. 35, many other approaches are contemplated. For example, as mentioned above, modern FPGA circuitry may include an on-board CPU, such as one or more of the example CPU 3720 of FIG. 37. Therefore, the processor circuitry 3512 of FIG. 35 may additionally be implemented by combining the example microprocessor 3600 of FIG. 36 and the example FPGA circuitry 3700 of FIG. 37. In some such hybrid examples, a first portion of the machine-readable instructions represented by the data flow diagrams and/or the flowcharts of FIGS. 13, 14, 30, 31, 32, 33, and/or 34 may be executed by one or more of the cores 3602 of FIG. 36 and a second portion of the machine-readable instructions represented by the data flow diagrams and/or the flowcharts of FIGS. 13, 14, 30, 31, 32, 33, and/or 34 may be executed by the FPGA circuitry 3700 of FIG. 37.

In some examples, the processor circuitry 3512 of FIG. 35 may be in one or more packages. For example, the processor circuitry 3600 of FIG. 36 and/or the FPGA circuitry 3700 of FIG. 37 may be in one or more packages. In some examples, an XPU may be implemented by the processor circuitry 3512 of FIG. 35, which may be in one or more packages. For example, the XPU may include a CPU in one package, a DSP in another package, a GPU in yet another package, and an FPGA in still yet another package.

Different examples of IPUs disclosed herein enable improved performance, management, security and coordination functions between entities (e.g., cloud service providers), and enable infrastructure offload and/or communications coordination functions. As disclosed in further detail below, IPUs may be integrated with smart NICs and storage or memory (e.g., on a same die, system on chip (SoC), or connected dies) that are located at on-premises systems, base stations, gateways, neighborhood central offices, and so forth. Different examples of one or more IPUs disclosed herein can perform an application including any number of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Furthermore, one or more IPUs can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks. For instance, an IPU exposes XPU, storage, memory, and CPU resources and capabilities as a service that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an xPU, storage, memory, or CPU.

Figure 38:
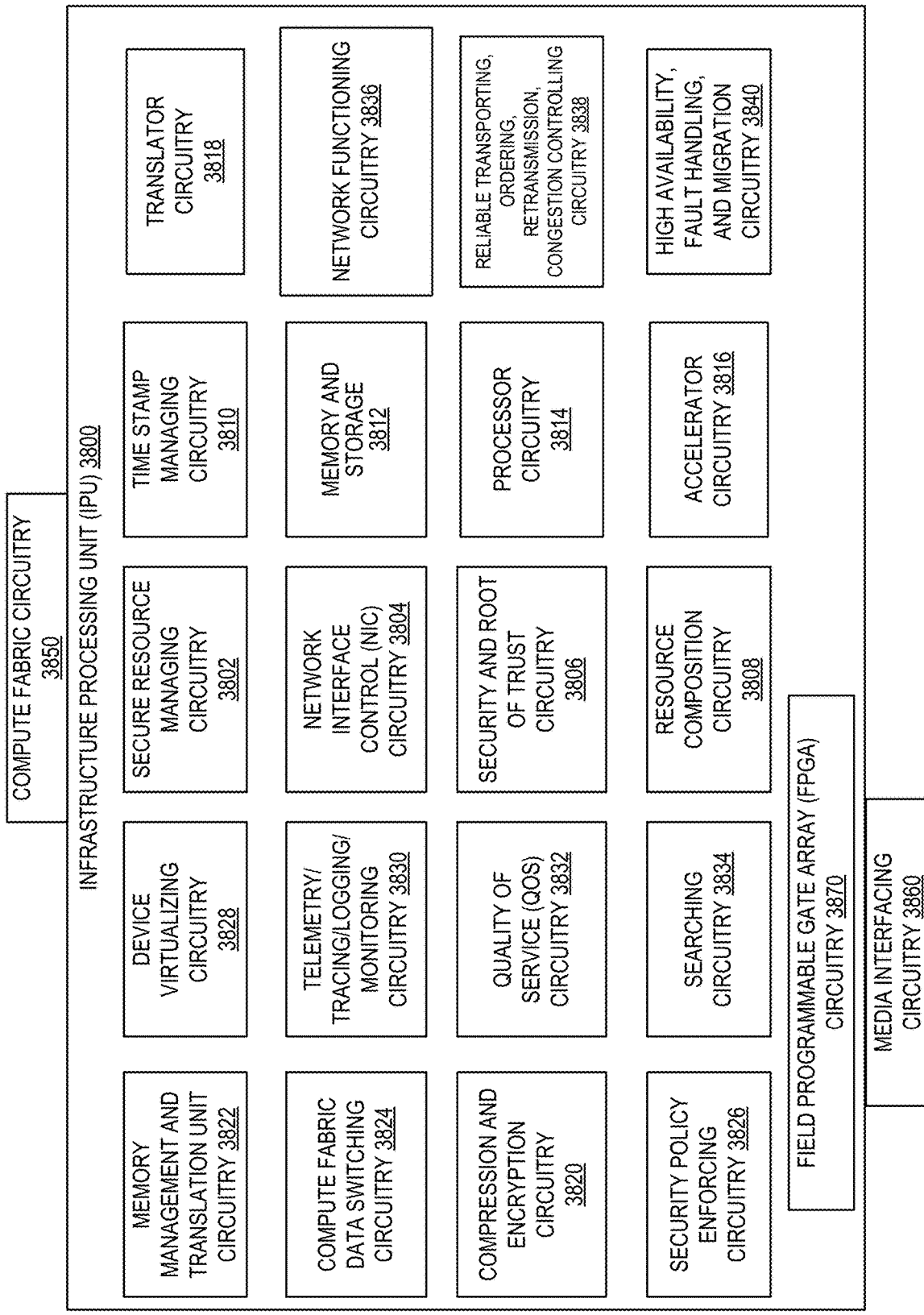
FIG. 38 is a schematic diagram of an example infrastructure processing unit (IPU).

The illustrated example of FIG. 38 depicts an example of an infrastructure processing unit (IPU) 3800. In some examples, the IPU 3800 is structured to execute and/or instantiate the example machine-readable instructions and/or the example operations of FIGS. 13, 14, 30, 31, 32, 33, and/or 34 to implement the example request handler circuitry 104 of FIGS. 1, 2, and/or 4, the example DLB circuitry 106 of FIGS. 1, 3, and/or 4, the example DLB circuitry 502, 504 of FIG. 5, the example accelerators 616 of FIG. 6, the example accelerators 716 of FIG. 7, and/or the example DLB circuitry 1008 of FIG. 10.

In the illustrated example of FIG. 38, the IPU 3800 includes or otherwise accesses secure resource managing circuitry 3802, network interface controller (NIC) circuitry 3804, security and root of trust circuitry 3806, resource composition circuitry 3808, time stamp managing circuitry 3810, memory and storage 3812, processing circuitry 3814, accelerator circuitry 3816, and/or translator circuitry 3818. Any number and/or combination of other structure(s) can be used such as but not limited to compression and encryption circuitry 3820, memory management and translation unit circuitry 3822, compute fabric data switching circuitry 3824, security policy enforcing circuitry 3826, device virtualizing circuitry 3828, telemetry, tracing, logging and monitoring circuitry 3830, quality of service circuitry 3832, searching circuitry 3834, network functioning circuitry (e.g., routing, firewall, load balancing, network address translating (NAT), etc.) 3836, reliable transporting, ordering, retransmission, congestion controlling circuitry 3838, and high availability, fault handling and migration circuitry 3840 shown in FIG. 38. Different examples can use one or more structures (components) of the example IPU 3800 together or separately. For example, compression and encryption circuitry 3820 can be used as a separate service or chained as part of a data flow with vSwitch and packet encryption.

In some examples, IPU 3800 includes a field programmable gate array (FPGA) 3870 structured to receive commands from an CPU, XPU, or application via an API and perform commands/tasks on behalf of the CPU, including workload management and offload or accelerator operations. The illustrated example of FIG. 38 may include any number of FPGAs configured and/or otherwise structured to perform any operations of any IPU described herein.

Example compute fabric circuitry 3850 provides connectivity to a local host or device (e.g., server or device (e.g., xPU, memory, or storage device)). Connectivity with a local host or device or smartNIC or another IPU is, in some examples, provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Different examples of the host connectivity provide symmetric memory and caching to enable equal peering between CPU, XPU, and IPU (e.g., via CXL.cache and CXL.mem).

Example media interfacing circuitry 3860 provides connectivity to a remote smartNIC or another IPU or service via a network medium or fabric. This can be provided over any type of network medium (e.g., wired or wireless) and using any protocol (e.g., Ethernet, InfiniBand, Fiber channel, ATM, to name a few).

In some examples, instead of the server/CPU being the primary component managing IPU 3800, IPU 3800 is a root of a system (e.g., rack of servers or data center) and manages compute resources (e.g., CPU, xPU, storage, memory, other IPUs, and so forth) in the IPU 3800 and outside of the IPU 3800. Different operations of an IPU are described below.

In some examples, the IPU 3800 performs orchestration to decide which hardware or software is to execute a workload based on available resources (e.g., services and devices) and considers service level agreements and latencies, to determine whether resources (e.g., CPU, xPU, storage, memory, etc.) are to be allocated from the local host or from a remote host or pooled resource. In examples when the IPU 3800 is selected to perform a workload, secure resource managing circuitry 3802 offloads work to a CPU, xPU, or other device and the IPU 3800 accelerates connectivity of distributed runtimes, reduce latency, CPU and increases reliability.

In some examples, secure resource managing circuitry 3802 runs a service mesh to decide what resource is to execute workload, and provide for L7 (application layer) and remote procedure call (RPC) traffic to bypass kernel altogether so that a user space application can communicate directly with the example IPU 3800 (e.g., IPU 3800 and application can share a memory space). In some examples, a service mesh is a configurable, low-latency infrastructure layer designed to handle communication among application microservices using application programming interfaces (APIs) (e.g., over remote procedure calls (RPCs)). The example service mesh provides fast, reliable, and secure communication among containerized or virtualized application infrastructure services. The service mesh can provide critical capabilities including, but not limited to service discovery, load balancing, encryption, observability, traceability, authentication and authorization, and support for the circuit breaker pattern.

In some examples, infrastructure services include a composite node created by an IPU at or after a workload from an application is received. In some cases, the composite node includes access to hardware devices, software using APIs, RPCs, gRPCs, or communications protocols with instructions such as, but not limited to, iSCSI, NVMe-oF, or CXL.

In some cases, the example IPU 3800 dynamically selects itself to run a given workload (e.g., microservice) within a composable infrastructure including an IPU, xPU, CPU, storage, memory, and other devices in a node.

In some examples, communications transit through media interfacing circuitry 3860 of the example IPU 3800 through a NIC/smartNIC (for cross node communications) or loopback back to a local service on the same host. Communications through the example media interfacing circuitry 3860 of the example IPU 3800 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, the example IPU 3800 prioritizes its processing to minimize the stalling of the requesting application. In some examples, the IPU 3800 schedules the prioritized message request issuing the event to execute a SQL query database and the example IPU constructs microservices that issue SQL queries and the queries are sent to the appropriate devices or services.

Figure 39:
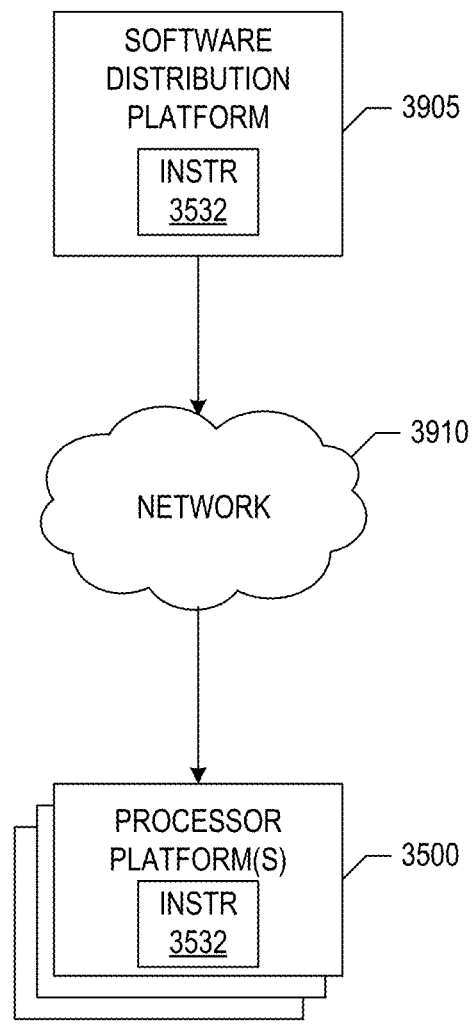
FIG. 39 is a block diagram of an example software distribution platform (e.g., one or more servers) to distribute software (e.g., software corresponding to the example machine-readable instructions of FIGS. 30, 31, 32, 33, and/or 34) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2605 to distribute software such as the example machine-readable instructions 3532 of FIG. 35 to hardware devices owned and/or operated by third parties is illustrated in FIG. 39. The example software distribution platform 3905 may be implemented by any computer server, data facility, cloud service, etc., capable of storing and transmitting software to other computing devices. The third parties may be customers of the entity owning and/or operating the software distribution platform 3905. For example, the entity that owns and/or operates the software distribution platform 3905 may be a developer, a seller, and/or a licensor of software such as the example machine-readable instructions 3532 of FIG. 35. The third parties may be consumers, users, retailers, OEMs, etc., who purchase and/or license the software for use and/or re-sale and/or sub-licensing. In the illustrated example, the software distribution platform 3905 includes one or more servers and one or more storage devices. The storage devices store the machine-readable instructions 3532, which may correspond to the example machine-readable instructions 1300, 1400, 3000, 3100, 3200, 3300, 3400 of FIGS. 13, 14, 30, 31, 32, 33, and/or 34, as described above. The one or more servers of the example software distribution platform 3905 are in communication with a network 3910, which may correspond to any one or more of the Internet and/or any of the example networks 122, 136, 3526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine-readable instructions 3532 from the software distribution platform 3905. For example, the software, which may correspond to the example machine-readable instructions 1300, 1400, 3000, 3100, 3200, 3300, 3400 of FIGS. 13, 14, 30, 31, 32, 33, and/or 34, may be downloaded to the example processor platform 3500, which is to execute the machine-readable instructions 3532 to implement the request handler circuitry 104, the DLB circuitry 106, and/or, more generally, the electronic system 102 of FIG. 1. In some example, one or more servers of the software distribution platform 3905 periodically offer, transmit, and/or force updates to the software (e.g., the example machine-readable instructions 3532 of FIG. 35) to ensure improvements, patches, updates, etc., are distributed and applied to the software at the end user devices.

From the foregoing, it will be appreciated that example systems, methods, apparatus, and articles of manufacture have been disclosed that improve execution of HTTP requests among cores of multi-core processor circuitry. Disclosed systems, methods, apparatus, and articles of manufacture improve the efficiency of using a computing device by improving HTTP server performance (e.g., improving by 30%, 35%, 40%, etc.) while at the same time reducing processor circuitry utilization (e.g., reducing by 20%, 25%, 30%, etc.). Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to improve webserver requests using dynamic load balancers are disclosed herein. Further examples and combinations thereof include the following:

Example 1 includes a method for servicing a request for media, the method comprising identifying a first data object type and a second data object type associated with media, the first data object type associated with a first data object of the media, the second data object type associated with a second data object of the media, enqueuing first event data associated with the first data object in a first queue in first circuitry of programmable circuitry and second event data associated with the second data object in a second queue in the first circuitry, dequeuing the first event data into a third queue and the second event data into a fourth queue, the third queue associated with a first core of the programmable circuitry, the fourth queue associated with a second core of the programmable circuitry, the first circuitry separate from the first core and the second core, and causing the first core to execute a first computing operation based on the first event data in the third queue and the second core to execute a second computing operation based on the second event data in the fourth queue.

In Example 2, the subject matter of Example 1 can optionally include that the request is a Hypertext Transfer Protocol request, the programmable circuitry includes a third core, and the method further including extracting, with the third core, at least one of a data header or a data payload from the Hypertext Transfer Protocol request.

In Example 3, the subject matter of any of Examples 1-2 can optionally include that the first data object type is an audio object type, a text object type, or a video object type.

In Example 4, the subject matter of any of Examples 1-3 can optionally include that the first data object type is a video object type and the second data object is an audio object type or a text object type.

In Example 5, the subject matter of any of Examples 1-4 can optionally include that the programmable circuitry includes a third core, and the method further includes determining, with the third core, that the first data object type is a video object type, an audio object type, or a text object type based on at least one of a header or a payload of the request.

In Example 6, the subject matter of any of Examples 1-5 can optionally include that the programmable circuitry includes a third core, the first data object type is a video object type and the second data object is an audio object type, the media includes a text object type, and the method further includes enqueuing third event data associated with the text object type in a fifth queue in the first circuitry, dequeuing the third event data into a sixth queue associated with the third core, and causing the third core to execute a third computing operation based on the third event data in the sixth queue.

In Example 7, the subject matter of any of Examples 1-6 can optionally include that the first event data includes a first data pointer, the first data pointer corresponding to a portion of the media stored at an address in memory.

In Example 8, the subject matter of Example 1-7 can optionally include that the programmable circuitry includes a third core, and the method further including selecting, with the third core, the first circuitry based on a proximity of the first circuitry to at least one of the first core or the second core.

In Example 9, the subject matter of any of Examples 1-8 can optionally include that the programmable circuitry includes a third core and second circuitry, the first circuitry is on a first die of the programmable circuitry and the second circuitry is on a second die of the programmable circuitry, and the method further includes querying, with the third core, the second circuitry for availability to enqueue the first event data and the second event data, and selecting, with the third core, the first circuitry to enqueue the first event data and the second event data after a determination that the second circuitry is unavailable based on a response from the second circuitry to the query.

In Example 10, the subject matter of any of Examples 1-9 can optionally include that the first circuitry is on a first socket of the programmable circuitry, the first core and the second core on the first socket, the programmable circuitry includes a third core and second circuitry, the third core and the second circuitry on a second socket of the programmable circuitry, the first socket different from the second socket, and the method further includes querying, with the third core, the second circuitry for availability to enqueue the first event data and the second event data, and selecting, with the third core, the first circuitry to enqueue the first event data and the second event data after a determination that the second circuitry is unavailable based on a response from the second circuitry to the query.

In Example 11, the subject matter of any of Examples 1-10 can optionally include determining that the media is an elephant flow based on a determination that the media is associated with a single session associated with a network connection that runs for a time period that satisfies a threshold.

In Example 12, the subject matter of any of Examples 1-11 can optionally include determining that the media is an elephant flow based on a determination that a bandwidth associated with the programmable circuitry decreases below a threshold.

In Example 13, the subject matter of any of Examples 1-12 can optionally include determining that the media is an elephant flow based on a determination that the media has a number of bytes that satisfies a threshold.

In Example 14, the subject matter of any of Examples 1-13 can optionally include that the first core and the second core are associated with a satellite.

In Example 15, the subject matter of any of Examples 1-14 can optionally include that the first core and the second core are associated with an in-orbit system.

In Example 16, the subject matter of any of Examples 1-15 can optionally include that the first core and the second core are associated with an on-ground system.

In Example 17, the subject matter of any of Examples 1-16 can optionally include that the first core is associated with a terrestrial system and the second core is associated with a non-terrestrial system.

In Example 18, the subject matter of any of Examples 1-17 can optionally include that the media is associated with at least one of sustained terrestrial contact or sustained non-terrestrial contact.

In Example 19, the subject matter of any of Examples 1-18 can optionally include that the media is at least one of sustained terrestrial data or sustained non-terrestrial data.

In Example 20, the subject matter of any of Examples 1-19 can optionally include that the media is associated with at least one of short burst terrestrial contact or short burst non-terrestrial contact.

In Example 21, the subject matter of any of Examples 1-20 can optionally include that the media is an elephant flow, and the first data object type is a Hypertext Transfer Protocol Secure (HTTPS) data object.

In Example 22, the subject matter of any of Examples 1-21 can optionally include that at least one of the first data object type or the second data object type is based on a Hypertext Transfer Protocol Secure (HTTPS) format.

In Example 23, the subject matter of any of Examples 1-22 can optionally include that the first data object type is a JavaScript Object Notation (JSON) data object.

In Example 24, the subject matter of any of Examples 1-23 can optionally include that the first data object type is a JavaScript Object Notation (JSON) data object to be transmitted via Hypertext Transfer Protocol Secure (HTTPS).

In Example 25, the subject matter of any of Examples 1-24 can optionally include that at least one of the first data object type or the second data object type is based on a JavaScript Object Notation (JSON) format.

In Example 26, the subject matter of any of Examples 1-25 can optionally include that the first data object type is an Abstract Syntax Notation One (ASN.1) data object.

In Example 27, the subject matter of any of Examples 1-26 can optionally include that at least one of the first data object type or the second data object type is based on an Abstract Syntax Notation One (ASN.1) format.

In Example 28, the subject matter of any of Examples 1-27 can optionally include that the first data object type is an eXtensible Markup Language (XML) data object.

In Example 29, the subject matter of any of Examples 1-28 can optionally include that at least one of the first data object type or the second data object type is based on an eXtensible Markup Language (XML) format.

In Example 30, the subject matter of any of Examples 1-29 can optionally include that the media is multimedia.

Example 31 is at least one computer-readable medium comprising instructions to perform the method of any of Examples 1-30.

Example 32 is edge server processor circuitry to perform the method of any of Examples 1-30.

Example 33 is an edge cloud processor circuitry to perform the method of any of Examples 1-30.

Example 34 is edge node processor circuitry to perform the method of any of Examples 1-30.

Example 35 is webserver processor circuitry to perform the method of any of Examples 1-30.

Example 36 is an apparatus comprising processor circuitry to perform the method of any of Examples 1-30.

Example 37 is an apparatus comprising one or more edge gateways to perform the method of any of Examples 1-30.

Example 38 is an apparatus comprising one or more edge switches to perform the method of any of Examples 1-30.

Example 39 is an apparatus comprising at least one of one or more edge gateways or one or more edge switches to perform the method of any of Examples 1-30.

Example 40 is an apparatus comprising accelerator circuitry to perform the method of any of Examples 1-30.

Example 41 is an apparatus comprising one or more graphics processor units to perform the method of any of Examples 1-30.

Example 42 is an apparatus comprising one or more Artificial Intelligence processors to perform the method of any of Examples 1-30.

Example 43 is an apparatus comprising one or more machine learning processors to perform the method of any of Examples 1-30.

Example 44 is an apparatus comprising one or more neural network processors to perform the method of any of Examples 1-30.

Example 45 is an apparatus comprising one or more digital signal processors to perform the method of any of Examples 1-30.

Example 46 is an apparatus comprising one or more general purpose processors to perform the method of any of Examples 1-30.

Example 47 is an apparatus comprising network interface circuitry to perform the method of any of Examples 1-30.

Example 48 is an Infrastructure Processor Unit to perform the method of any of Examples 1-30.

Example 49 is Dynamic Load Balancer circuitry to perform the method of any of Examples 1-30.

Example 50 is at least one of satellite vehicle or satellite vehicle circuitry to perform the method of any of Examples 1-30.

Example 51 is at least one of a base station or base station circuitry to perform the method of any of Examples 1-30.

Example 52 is at least one of a radio access network or radio access network circuitry to perform the method of any of Examples 1-30.

Example 53 is at least one of edge appliance or edge appliance circuitry to perform the method of any of Examples 1-30.

Example 54 is at least one of terrestrial radio access network or terrestrial radio access network circuitry to perform the method of any of Examples 1-30.

Example 55 is at least one of non-terrestrial radio access network or non-terrestrial radio access network circuitry to perform the method of any of Examples 1-30.

Example 56 is at least one of a ground station or ground station circuitry to perform the method of any of Examples 1-30.

Example 57 is at least one of a satellite-connected hub or satellite-connected hub circuitry to perform the method of any of Examples 1-30.

Example 58 is at least one of a satellite-enabled edge ground station or satellite-enabled edge ground station circuitry to perform the method of any of Examples 1-30.

Example 59 is at least one of a satellite-enabled edge computing node or satellite-enabled edge computing node circuitry to perform the method of any of Examples 1-30.

Example 60 is at least one of a virtual radio access network distributed unit or virtual radio access network distributed unit circuitry to perform the method of any of Examples 1-30.

Example 61 is at least one of a virtual radio access network control unit or virtual radio access network control unit circuitry to perform the method of any of Examples 1-30.

Example 62 is at least one of a core server or core server circuitry to perform the method of any of Examples 1-30.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A method comprising:
   selecting first circuitry of programmable circuitry based on a proximity order of the first circuitry to at least one of a first core or a second core of the programmable circuitry, the first circuitry separate from the first core and the second core;
   enqueueing first event data associated with a first data object in a first queue in the first circuitry and enqueueing second event data associated with a second data object in a second queue in the first circuitry, the first data object and the second data object associated with a request for media;
   dequeuing the first event data into a third queue and dequeuing the second event data into a fourth queue, the third queue associated with the first core, the fourth queue associated with the second core; and
   causing the first core to execute a first computing operation based on the first event data in the third queue and causing the second core to execute a second computing operation based on the second event data in the fourth queue.

2. The method of claim 1, wherein the media is associated with a Hypertext Transfer Protocol request, the programmable circuitry includes a third core, and including extracting, with the third core, at least one of a data header or a data payload from the Hypertext Transfer Protocol request.

3. The method of claim 1, wherein the programmable circuitry includes a third core, the first data object is a video object and the second data object is an audio object, the media includes a text object, and including:
   enqueueing third event data associated with the text object in a fifth queue in the first circuitry;
   dequeuing the third event data into a sixth queue associated with the third core; and
   causing the third core to execute a third computing operation based on the third event data in the sixth queue.

4. The method of claim 1, wherein the programmable circuitry includes a third core, and including selecting the first circuitry with the third core.

5. The method of claim 1, wherein the programmable circuitry includes a third core and second circuitry, the first circuitry is on a first die of the programmable circuitry and the second circuitry is on a second die of the programmable circuitry, and including:
   querying, with the third core, the second circuitry for availability to enqueue the first event data and the second event data; and
   selecting, with the third core, the first circuitry to enqueue the first event data and the second event data after a determination that the second circuitry is unavailable based on a response from the second circuitry to the query.

6. The method of claim 1, wherein the first circuitry is on a first socket of the programmable circuitry, the first core and the second core are on the first socket, the programmable circuitry includes a third core and second circuitry, the third core and the second circuitry are on a second socket of the programmable circuitry, the first socket is different from the second socket, and including:

querying, with the third core, the second circuitry for availability to enqueue the first event data and the second event data; and selecting, with the third core, the first circuitry to enqueue the first event data and the second event data after a determination that the second circuitry is unavailable based on a response from the second circuitry to the query.

7. An apparatus comprising:

interface circuitry;

instructions; and programmable circuitry to operate based on the instructions to:

select first circuitry of the programmable circuitry based on a proximity order of the first circuitry to at least one of a first core or a second core of the programmable circuitry, the first circuitry separate from the first core and the second core;

enqueue first event data associated with a first data object in a first queue in the first circuitry and enqueue second event data associated with a second data object in a second queue in the first circuitry, the first data object and the second data object associated with a request for media;

dequeue the first event data into a third queue and dequeue the second event data into a fourth queue, the third queue associated with the first core, the fourth queue associated with the second core; and cause the first core to execute a first computing operation based on the first event data in the third queue and cause the second core to execute a second computing operation based on the second event data in the fourth queue.

8. The apparatus of claim 7, wherein the media is associated with a Hypertext Transfer Protocol request, the programmable circuitry includes a third core to extract at least one of a data header or a data payload from the Hypertext Transfer Protocol request.

9. The apparatus of claim 7, wherein the programmable circuitry includes a third core, the first data object is a video object and the second data object is an audio object, the media includes a text object, and the programmable circuitry is to:

enqueue third event data associated with the text object in a fifth queue in the first circuitry;

dequeue the third event data into a sixth queue associated with the third core; and cause the third core to execute a third computing operation based on the third event data in the sixth queue.

10. The apparatus of claim 7, wherein the programmable circuitry includes a third core to select the first circuitry.

11. The apparatus of claim 7, wherein the programmable circuitry includes a third core and second circuitry, the first circuitry is on a first die of the programmable circuitry and the second circuitry is on a second die of the programmable circuitry, and the programmable circuitry is to:

query, with the third core, the second circuitry for availability to enqueue the first event data and the second event data; and select, with the third core, the first circuitry to enqueue the first event data and the second event data after a determination that the second circuitry is unavailable based on a response from the second circuitry to the query.

12. The apparatus of claim 7, wherein the first circuitry is on a first socket of the programmable circuitry, the first core and the second core are on the first socket, the programmable circuitry includes a third core and second circuitry, the third core and the second circuitry are on a second socket of the programmable circuitry, the first socket is different from the second socket, and the programmable circuitry is to:

query, with the third core, the second circuitry for availability to enqueue the first event data and the second event data; and select, with the third core, the first circuitry to enqueue the first event data and the second event data after a determination that the second circuitry is unavailable based on a response from the second circuitry to the query.

13. The apparatus of claim 7, wherein the programmable circuitry is to determine that the media is an elephant flow based on a determination that the media is associated with a single session and the single session is associated with a network connection that has run for a time period that satisfies a threshold.

14. At least one non-transitory computer readable medium comprising instructions to cause programmable circuitry to at least:

select first circuitry of the programmable circuitry based on a proximity order of the first circuitry to at least one of a first core or a second core of the programmable circuitry, the first circuitry separate from the first core and the second core;

enqueue first event data associated with a first data object in a first queue in the first circuitry and enqueue second event data associated with a second data object in a second queue in the first circuitry, the first data object and the second data object associated with a request for media;

dequeue the first event data into a third queue and dequeue the second event data into a fourth queue, the third queue associated with the first core, the fourth queue associated with the second core; and cause the first core to execute a first computing operation based on the first event data in the third queue and cause the second core to execute a second computing operation based on the second event data in the fourth queue.

15. The at least one non-transitory computer readable medium of claim 14, wherein the media is associated with a Hypertext Transfer Protocol request, the programmable circuitry includes a third core, and the instructions are to cause the third core to extract at least one of a data header or a data payload from the Hypertext Transfer Protocol request.

16. The at least one non-transitory computer readable medium of claim 14, wherein the programmable circuitry includes a third core, the first data object is a video object and the second data object is an audio object, the media includes a text object, and the instructions are to cause the programmable circuitry to:

enqueue third event data associated with the text object in a fifth queue in the first circuitry;

dequeue the third event data into a sixth queue associated with the third core; and cause the third core to execute a third computing operation based on the third event data in the sixth queue.

17. The at least one non-transitory computer readable medium of claim 14, wherein the programmable circuitry includes a third core, and the instructions are to cause the third core to select the first circuitry.

18. The at least one non-transitory computer readable medium of claim 14, wherein the programmable circuitry includes a third core and second circuitry, the first circuitry is on a first die of the programmable circuitry and the second circuitry is on a second die of the programmable circuitry, and the instructions are to cause the programmable circuitry to:

query, with the third core, the second circuitry for availability to enqueue the first event data and the second event data; and select, with the third core, the first circuitry to enqueue the first event data and the second event data after a determination that the second circuitry is unavailable based on a response from the second circuitry to the query.

19. The at least one non-transitory computer readable medium of claim 14, wherein the first circuitry is on a first socket of the programmable circuitry, the first core and the second core are on the first socket, the programmable circuitry includes a third core and second circuitry, the third core and the second circuitry are on a second socket of the programmable circuitry, the first socket is different from the second socket, and the instructions are to cause the programmable circuitry to:

query, with the third core, the second circuitry for availability to enqueue the first event data and the second event data; and select, with the third core, the first circuitry to enqueue the first event data and the second event data after a determination that the second circuitry is unavailable based on a response from the second circuitry to the query.

20. The at least one non-transitory computer readable medium of claim 14, wherein the instructions are to cause the programmable circuitry to determine that the media is an elephant flow based on a determination that a bandwidth associated with the programmable circuitry decreases below a threshold.

* * * * *